(12) United States Patent
Principe et al.

(10) Patent No.: US 11,492,834 B2
(45) Date of Patent: Nov. 8, 2022

(54) APPARATUS, SYSTEM AND METHOD FOR POWERED DOORS OF AN AUTONOMOUS DELIVERY VEHICLE

(71) Applicant: DEKA Products Limited Partnership, Manchester, NH (US)

(72) Inventors: Christopher Joseph Principe, Nahant, MA (US); Christopher Charles Langenfeld, Nashua, NH (US); Michael J. Slate, Merrimack, NH (US)

(73) Assignee: Amoskeag ADV LLC, Manchester, NH (US)

( * ) Notice: Subject to any disclaimer, the term of this patent is extended or adjusted under 35 U.S.C. 154(b) by 0 days.

(21) Appl. No.: 16/800,591

(22) Filed: Feb. 25, 2020

(65) Prior Publication Data
US 2020/0270924 A1    Aug. 27, 2020

Related U.S. Application Data

(60) Provisional application No. 62/872,052, filed on Jul. 9, 2019, provisional application No. 62/809,950, filed on Feb. 25, 2019.

(51) Int. Cl.
*E05D 7/08*   (2006.01)
*E05F 1/12*   (2006.01)
*B60W 60/00*  (2020.01)

(52) U.S. Cl.
CPC ..... *E05F 1/1253* (2013.01); *B60W 60/00256* (2020.02); *E05Y 2201/41* (2013.01);
(Continued)

(58) Field of Classification Search
CPC . E05F 1/1253; E05F 1/12; E05F 1/00; B60W 60/00256; F25C 1/10;
(Continued)

(56) References Cited

U.S. PATENT DOCUMENTS

| 4,268,076 A | 5/1981 | Itoi |
| 4,667,990 A | 5/1987 | Quantz |

(Continued)

FOREIGN PATENT DOCUMENTS

| DE | 20 2017 107 026 U1 | 12/2018 |
| WO | WO 2005/026475 | 3/2005 |

OTHER PUBLICATIONS

International Search Report and Written Opinion dated Aug. 6, 2020 received in counterpart international patent application PCT/US2020/019703 from European Patent Office as International Searching Authority, European Patent Office, P.B. 5818 Patentlaan 2 NL—2280 HV Rijswijk (16 pgs).

*Primary Examiner* — Chi Q Nguyen
(74) *Attorney, Agent, or Firm* — Toohey Law Group LLC

(57) ABSTRACT

An example retention assembly has a motor assembly and a self-locking worm drive coupled thereto. A cam is fixed to a worm gear of the worm drive. The retention assembly has an actuation shaft including a follower. The actuation shaft is displaceable over a displacement range via rotation of the cam. The retention assembly has a securement member with a securement member follower, the securement member coupled to a portion of the actuator shaft. The retention assembly has a housing cam included as part of the retention assembly housing and against which the securement member follower is biased. The securement member are in an open state when the actuation shaft is in a first position. The securement member swings outward to a retaining position as the actuation shaft is moved to a second position.

30 Claims, 41 Drawing Sheets

(52) U.S. Cl.
CPC ..... *E05Y 2201/43* (2013.01); *E05Y 2201/704* (2013.01); *E05Y 2900/531* (2013.01)

(58) Field of Classification Search
CPC ...... F25D 31/007; F25D 31/006; F25D 29/00; F25D 29/005; F25D 2331/805; F25D 2700/16; F25D 2400/28; F25D 2331/803; F25D 63/00; E05B 63/0052; E05B 47/0012; E05B 47/00; E05B 17/0029; E05B 2047/0024; E05B 2047/0094; E05B 2047/0017; E05B 15/0006; E05B 15/0013; E05B 15/00; Y10T 292/699; E05Y 2201/41; E05Y 2201/43; E05Y 2900/531
USPC ......... 49/24, 388, 381, 394; 312/321.5, 129, 312/215, 220, 116; 221/154; 292/341.17, 341.16, DIG. 16
See application file for complete search history.

(56) References Cited

U.S. PATENT DOCUMENTS

| | | | |
|---|---|---|---|
| 4,796,932 A | 1/1989 | Tame | |
| 5,007,261 A | 4/1991 | Quantz | |
| 5,241,801 A * | 9/1993 | Nelson | B65B 7/2878 53/313 |
| 5,437,173 A | 8/1995 | Spinar | |
| 5,575,515 A | 11/1996 | Iwamoto et al. | |
| 6,068,305 A * | 5/2000 | Myers | E05B 17/0029 292/201 |
| 6,216,980 B1 | 4/2001 | Baudu et al. | |
| 6,550,825 B2 | 4/2003 | Ostrowski et al. | |
| 6,581,986 B2 * | 6/2003 | Roatis | E05B 17/0029 292/199 |
| 6,886,869 B2 | 5/2005 | Martinez et al. | |
| 7,137,387 B2 * | 11/2006 | Edwards | F24C 15/022 126/190 |
| 9,523,215 B2 * | 12/2016 | Denison | E05B 17/0029 |
| 2002/0060458 A1 * | 5/2002 | Roatis | E05B 47/023 292/199 |
| 2007/0010036 A1 * | 1/2007 | Endo | G03F 7/0007 438/22 |
| 2008/0061564 A1 * | 3/2008 | Hapke | E05B 63/127 292/201 |
| 2011/0084506 A1 * | 4/2011 | Roatis | E05B 63/0052 292/240 |
| 2015/0231012 A1 * | 8/2015 | Rapoport | A61G 11/006 600/22 |
| 2018/0106533 A1 * | 4/2018 | Lauchnor | F25C 1/00 |
| 2019/0046373 A1 * | 2/2019 | Coulter | A61G 5/063 |

* cited by examiner

APPARATUS, SYSTEM AND METHOD FOR POWERED DOORS OF AN AUTONOMOUS DELIVERY VEHICLE

CROSS-REFERENCE TO RELATED APPLICATIONS

The present application claims the benefit of U.S. Provisional Application Ser. No. 62/809,950 filed Feb. 25, 2019 and entitled LINKAGE APPARATUS, which is hereby incorporated herein by reference in its entirety.

The present application also claims the benefit of U.S. Provisional Application Ser. No. 62/872,052 filed Jul. 9, 2019 and entitled APPARATUS FOR LATCHING DOORS ON AN AUTONOMOUS DELIVERY DEVICE, which is hereby incorporated herein by reference in its entirety.

BACKGROUND

Field of Disclosure

This disclosure relates to an autonomous delivery vehicle. More specifically, this disclosure relates to the opening, closing, and latching of one or more doors of an autonomous delivery vehicle.

Description of Related Art

Traditionally, most storage spaces are secured by at least one closure device such as a door. The door is coupled to the threshold of a room or storage space via a conventional hinge. As a result, the door requires substantial clearance to open and close about the conventional hinge.

FIG. 1 depicts a traditional configuration of a door 2 used to secure a storage space 4. As shown, door 2 is attached to a housing 6 of a storage space 4 by hinges 8 and 10. The door 2 swings in an arc 12 about the hinges 8 and 10, requiring an opening radius 14 equal to at least the width 16 of the door 2. This required opening radius 14 requires front space 18 equal to at least the width 16 of the door 2. In addition, for doors 2 that swing beyond 90 degrees, a side space 20 may also be required. For example, for a door 2 which may swing up to approximately 180 degrees (as shown in FIG. 1,) a side space 20 approximately equal to the width 16 of the door 2 must also be available.

SUMMARY

In accordance with an embodiment of the present disclosure a storage container may comprise a frame defining part of the storage container. The frame may be stationary relative to the storage container. The storage container may further comprise at least one four-bar linkage. Each of the at least one four-bar linkage may connect a closure member to the frame. Each four-bar linkage may include a follower. The storage container may further comprise a weather seal coupled to the at least one door. The storage container may further comprise a latch assembly coupled to the frame. The latch assembly may comprise a cam pivotally coupled within the latch assembly. The cam may have a pressure angle no greater than 15°. The latch assembly may further comprise a first gear fixedly attached to the cam. The latch assembly may further comprise a worm drive mechanically coupled to the first gear. The latch assembly may further comprise a motor assembly configured to power the worm drive. Pivotal displacement of the cam in a first direction may pull the follower toward the frame compressing the weather seal. A mechanical advantage between the motor assembly and the follower may lock the closure member against the frame.

In some embodiments, the cam may further have a profile angle of greater than 90°. In some embodiments, the cam may include a groove extending therethrough. The groove may have an opening for receiving the follower. In some embodiments, the mechanical advantage may be greater 400:1. In some embodiments, the mechanical advantage may be greater 800:1. In some embodiments, the storage container may further comprise a planetary gear stage between the electric motor and the worm drive. In some embodiments, the motor assembly may be a stepper motor. In some embodiments, the follower may comprise a roller. The roller may include a contact face for contacting the cam. In some embodiments, the storage container may further comprise a rotary position sensor mechanically coupled to the first gear. In some embodiments, the storage container may further comprise a controller. The controller may be configured to receive an output signal from the rotary position sensor and govern operation of the motor assembly based in part on the output signal. In some embodiments, the frame may comprise a stop pin mounted in the frame. The stop pin may be displaced in a displacement path of the cam and limit a rotational displacement range of the cam. In some embodiments, the storage container may further comprise a guide block aligned with the worm. The guide block may include a guide recess having a tool entry end which tapers to a smaller latch interface end at which a tool interface is disposed. The tool interface may be for accepting a tool to manually operate the latch assembly. In some embodiments, the storage container may further comprise a second closure member coupled to the frame with a second four-bar linkage which includes a second follower. The storage container may further comprise a second cam mounted on the frame. The storage container may further comprise a second gear attached to the second cam. The second gear may be mechanically coupled to the first gear. Pivotal displacement of the second cam in a first direction may pull the follower toward the frame. In some embodiments, the storage container may further comprise a second closure member coupled to the frame with a second four-bar linkage which includes a second follower. The storage container may further comprise a second cam pivotally coupled within the latch assembly. The storage container may further comprise a second gear attached to the second cam. The second gear may be mechanically coupled to the worm drive independently from the first gear. In some embodiments, the cam may include a groove extending therethrough. The groove may be defined by a radius from a center point of the cam which varies over the length of the groove. In some embodiments, the radius may gradually increase from a smallest distance to a greatest distance in a substantially constant manner over the length of the groove. In some embodiments, the radius may be smallest at an interior terminus of the groove and largest at an opening to the groove at a periphery of the cam.

In accordance with another embodiment of the present disclosure an enclosure for holding cargo may comprise a frame defining a part of the enclosure and being stationary relative to the enclosure. The enclosure may further comprise a first and a second door each connected to the frame respectively with a first four-bar linkage and a second four-bar linkage. Each four-bar linkage may include a follower. The enclosure may further comprise a first and second compliant member coupled to respectively to the first door and second door. The enclosure may further comprise a locking assembly coupled to the frame. The locking assembly may comprise a first and second cam each rotatably coupled within the locking assembly. The locking assembly may further comprise a first and second gear attached respectively to the first cam and second cam. The first and second gear may be mechanically coupled to one another and turn in opposite directions. The locking assembly may further comprise a worm drive mechanically coupled to the two gears. The locking assembly may further comprise a motor assembly configured to power the worm drive. Rotational displacement of the first cam in a first direction may pull the first door toward the frame, via the follower of the first four-bar linkage, compressing the first compliant member. Rotational displacement of the second cam in a second direction opposite the first direction may pull the first door toward the frame, via the follower of the second four-bar linkage, compressing the second compliant member. A mechanical advantage between the motor assembly and the followers may be sufficient to lock the doors against the frame.

In some embodiments, the worm drive may be self-locking. In some embodiments, at least one of the doors may comprise an additional compliant member. The additional compliant member may be compressed against the other of the doors when the doors are locked against the frame.

In accordance with an embodiment of the present disclosure a container system may comprise a frame defining a part of an enclosure. The container system may further comprise at least one door connected to the frame with a four-bar linkage which includes a follower. The container system may further comprise a weather seal coupled to the at least one door. The container system may further comprise a latch assembly. The latch assembly may comprise a cam for each of the at least one door. Each cam may be pivotably coupled within the latch assembly. The latch assembly may further comprise a gear fixedly attached to each cam. The latch assembly may further comprise a self-locking worm drive coupled to each gear. The latch assembly may further comprise a motor assembly including an output shaft upon which a worm of the worm drive is disposed. Pivotal displacement of each cam may pull the associated door of the at least one door toward the frame, via the follower of the four-bar linkage coupled to that door, compressing the weather seal against the frame.

In some embodiments, a mechanical advantage between the motor assembly and each follower may be at least 400:1. In some embodiments, a mechanical advantage between the motor assembly and each follower may be at least 800:1. In some embodiments, each cam and its associated follower may form a pressure angle no greater than 15°. In some embodiments, each cam and its associated follower may form a pressure angle no greater than 30°. In some embodiments, each cam may include a rotation axis. In some embodiments, each cam may also include a channel extending therethrough. The channel may be spaced from the rotation axis by a radius from a rotation axis which varies over the length of the channel. In some embodiments, the channel may have an open end to accept the follower. In some embodiments, the radius may be greatest at an open end of the channel and smallest at an interior terminus of the channel. In some embodiments, the system may further comprise a rotary position sensor mechanically coupled into the latch assembly at a point downstream of the worm drive. In some embodiments, the frame may comprise at least one rigid projection. Each of the at least one rigid projection positioned to limit the pivotal displacement of a cam. In some embodiments, the frame may be stationary relative to the enclosure.

In accordance with another embodiment of the present disclosure a motorized containment system may comprise a frame defining a stationary part of an enclosure. The system may further comprise at least one door coupled to the frame with a four-bar linkage which includes a follower pin. The system may further comprise a door retention assembly. The door retention assembly may comprise at least one cam mounted with the door retention assembly and including a channel extending therethrough. The location of the channel defined by a radius from a rotation axis of the cam which varies over a length of the channel. The door retention assembly may further comprise at least one gear rigidly mounted to the at least one cam. The door retention assembly may further comprise a self-locking worm drive coupled to the at least one gear. The door retention assembly may further comprise a motor assembly for driving the worm drive.

In some embodiments, the at least one cam has a profile angle of at least 90°. In some embodiments, the at least one cam and follower may form a pressure angle no more than 15°.

In accordance with another embodiment of the present disclosure a method of closing a door may comprise displacing a door along a first portion of a door displacement path. A follower coupled to the door may contact a cam upon completion of displacement along the first portion of the displacement path. The method may further comprise rotating the cam by powering a motor assembly to rotate a worm drive mechanically coupled to the cam. The method may further comprise pulling the follower toward a frame. The method may further comprise pulling the door along a second portion of the door displacement path. The door may be against the frame upon completion of displacement along the second portion of displacement path. The method may further comprise compressing a complaint member between the frame and the door. The method may further comprise determining a rotational position of the cam with a rotational position sensor. The method may further comprise receiving, with a controller, an output signal from the rotational position sensor. The method may further comprise stopping the rotation of the cam when the output signal indicates the cam has been rotated a predefined amount.

In some embodiments, the second portion of the door displacement path may be a portion of the displacement path over which the door displaces in a substantially translational manner. In some embodiments, the first portion of the door displacement path may be a portion of the displacement path over which the door rotationally displaces. In some embodiments, displacing the door along the first portion of the displacement path may comprise powering, via a command from the controller, a second motor assembly. In some embodiments, displacing the door along the first portion of the displacement path may comprise monitoring a door position sensor with the controller. In some embodiments, the method further may comprise cutting power to the second motor assembly upon determining, with the controller, that the door has reached an end of the first displacement path based on a door position sensor output signal.

In accordance with an embodiment of the present disclosure a retention assembly may comprise a motor assembly. The retention assembly may further comprise a self-locking worm drive coupled to the motor assembly. The retention assembly may further comprise a cam fixed to a worm gear of the worm drive. The retention assembly may further comprise an actuation shaft including a follower. The actuation shaft may be displaceable over a displacement range between a first position and a second position via rotation of the cam. The retention assembly may further comprise a securement member coupled to a portion of the actuator shaft which is exterior to the housing. The securement member may have a securement member follower. The retention assembly may further comprise a housing cam included as part of the retention assembly housing. The securement member follower may be biased against the housing cam. The securement member may be in an open state when the actuation shaft is in the first position. The securement member may swing outward to a retaining position as the actuation shaft is moved to the second position due to the securement member follower being displaced along the housing cam.

In some embodiments, a worm of the worm drive may be disposed on an output shaft of the motor assembly. In some embodiments, the worm gear and cam may be mounted on a shared axle. In some embodiments, the actuation shaft may include a slot therethrough. The slot may accommodate the shared axle over the displacement range of the actuation shaft. In some embodiments, the retention assembly may further comprise a rotational position sensor. In some embodiments, the retention assembly may further comprise a first gear. The first gear may transmit rotational motion from the worm drive to the rotational position sensor. In some embodiments, the rotational position sensor may be selected from the group consisting of a magnetic sensor, optical sensor, potentiometer, and a conductive mechanical encoder. In some embodiments, the securement member may include a first arm and a second arm which are separated by a trough. In some embodiments, the first arm may extend from a first face of the securement member and the second arm extend from a second opposing face of the securement member. In some embodiments, the securement member may be coupled to the output shaft via a mounting body upon which the securement member may be mounted. In some embodiments, the mounting body may include a stop projection extending therefrom. In some embodiments, the motor assembly may include a planetary gear stage.

In accordance with another embodiment of the present disclosure an enclosure may comprise a frame. The enclosure may further comprise a first door and a second door. The first and second door may be respectively coupled to the frame via a first four-bar linkage and a second four-bar linkage. The enclosure may further comprise a latch pin coupled to each of the first and second four-linkage. Each latch pin may include a terminal flange. The enclosure may further comprise a retention assembly. the retention assembly may comprise a motor assembly. The retention assembly may further comprise a first securement member and second securement member. The retention assembly may further comprise a transmission assembly intermediate the motor assembly and the securement members. The retention assembly may further comprise a mounting body to which the securement members are coupled. The mounting body may include first and second latch pin stop projections on opposing sides of the mounting body. The retention assembly may be configured to displace the securement members from an open position to a retaining position in which the terminal flange of each latch pin is captured by a portion of a respective securement member.

In some embodiments, the transmission assembly may comprise a worm drive. In some embodiments, the worm drive may be self-locking. In some embodiments, the retention assembly may include a sensor configured to generate an output signal indicative of the position of the securement members. In some embodiments, the enclosure further may comprise a first door motor assembly and a second door motor assembly. In some embodiments, the enclosure may further comprise a first door position sensor and a second door position sensor. In some embodiments, the enclosure may further comprise a controller. The controller may be configured to power the first and second door motor assembly to displace the doors from an open state toward a closed state. The controller may be configured to cut power to the first and second door motor upon an output signal from each door position sensor indicating that the latch pin associated with each door has contacted the respective latch pin stop projection of the mounting body. In some embodiments, each securement member may include a first arm and a second arm which are separated by a trough. In some embodiments, the first arm of each securement member may extend from a first face of that securement member and the second arm of each securement member extend from a second opposing face of that securement member. In some embodiments, each latch pin may be disposed in a guide bearing of its respective four-bar linkage and may be partially surrounded by a bias member positioned between a face of a protuberance in which the guide bearing is disposed and a retainer clip coupled to the latch pin. In some embodiments, the retention assembly may further comprise a housing. The securement members may be configured to translationally displace from a distal position with respect to the housing to a position proximal with respect to the housing when in the retaining position. In some embodiments, a first complaint member and second compliant member coupled respectively to the first and second door may be compressed against the frame upon displacement of the securement members from the distal position to the proximal position.

In accordance with another embodiment of the present disclosure a method of locking an enclosure may comprise displacing a closure member along a first portion of a displacement path. A terminal flange of a latch pin coupled to the closure member may contact a stop projection of a retention assembly upon completion of displacement along the first portion of the displacement path. The method may further comprise rotating a securement member of the retention assembly from an open position to a retaining position and translating the securement member toward a housing of the retention assembly by powering a motor assembly mechanically coupled to the securement member via a transmission assembly including a self-locking worm drive. The method may further comprise pulling the latch pin towards the housing. The method may further comprise pulling the closure member along a second portion of the displacement path. The closure member may be against the enclosure upon completion of displacement along the second portion of displacement path. The method may further comprise measuring a rotational position of the securement member with a position sensor of the retention assembly. The method may further comprise receiving, with a controller, an output signal from the position sensor. The method may further comprise cutting power to the motor assembly, via a command from the controller, when the output signal indicates the securement member has been translated to a predefined point proximal the housing.

In some embodiments, the method may further comprise compressing a complaint member between the closure member and the enclosure. In some embodiments, rotating the securement member may comprise displacing a follower of the securement member over a cam surface forming part of the housing. In some embodiments, pulling the closure member along a second portion of the displacement path may comprise displacing the closure member translationally toward the enclosure. In some embodiments, displacing the closure member along the first portion of the displacement path may comprise rotationally displacing the closure member. In some embodiments, displacing the closure member along the first portion of the displacement path may comprise commanding power to a closure member motor assembly coupled to the closure member with a controller. In some embodiments, the method may further comprise monitoring an output signal of a door position sensor with a controller and cutting power to the closure member motor assembly upon the output signal indicating that the terminal flange of the latch pin has contacted the stop projection.

BRIEF DESCRIPTION OF THE DRAWINGS

These and other aspects will become more apparent from the following detailed description of the various embodiments of the present disclosure with reference to the drawings wherein.

DETAILED DESCRIPTION

The present disclosure describes several embodiments of linkages 1100 that facilitate the opening and closing of a closure device such as a door 2. Advantageously, certain embodiments discussed herein do not require the clearance, front space, and/or side space needed to utilize a conventional hinge, thereby permitting door opening and/or closing within close proximity to objects in the surrounding environment. In addition, embodiments discussed herein may provide an attractive opening or closing process that is visually desirable to the users thereof.

Figure 1:
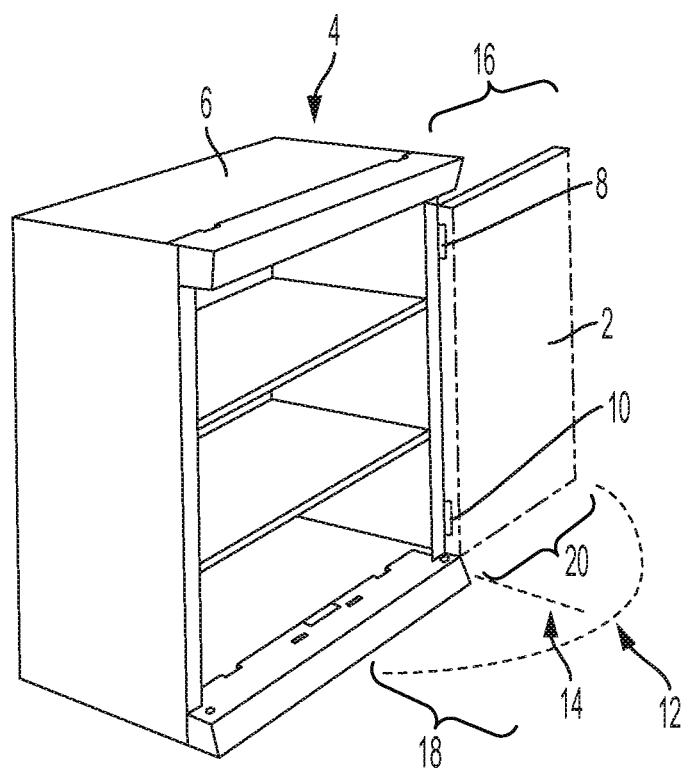
FIG. 1 depicts a traditional configuration of a door on a storage space.

Hinged doors 2 like those shown in FIG. 1 are undesirable and sometimes unusable in close interior quarters, such as within kitchens, bathrooms, garages, dorm rooms, entryways, hallways, and office cubicles. Some previous solutions have been proposed, but they still suffer from one or more of the disadvantages of the conventional hinged door 2 shown in FIG. 1. For example, sliding doors 2 may reduce the needed front space 18, but require open side space 20 equal to the width 16 of the door 2 to permit sliding of the door 2. Additionally, many doors 2 are typically installed in a static location which does not change. Thus a particular door 2 suited to that location may be chosen without worry that the door 2 may be moved to another environment in which the door 2 may not be usable.

It is advantageous that doors 2 on some storage spaces (e.g. cabinets, desks, mini-fridges, wardrobes, hutches, cargo containers, vehicles, movable carts, etc.) require a minimal opening radius, minimal front space 18 and/or minimal side space 20 to enable convenient use of these storage spaces in close quarters. Various novel linkage apparatuses described herein may enable desired door 2 movement and permit door 2 opening and closing in tight spaces.

Figure 2:
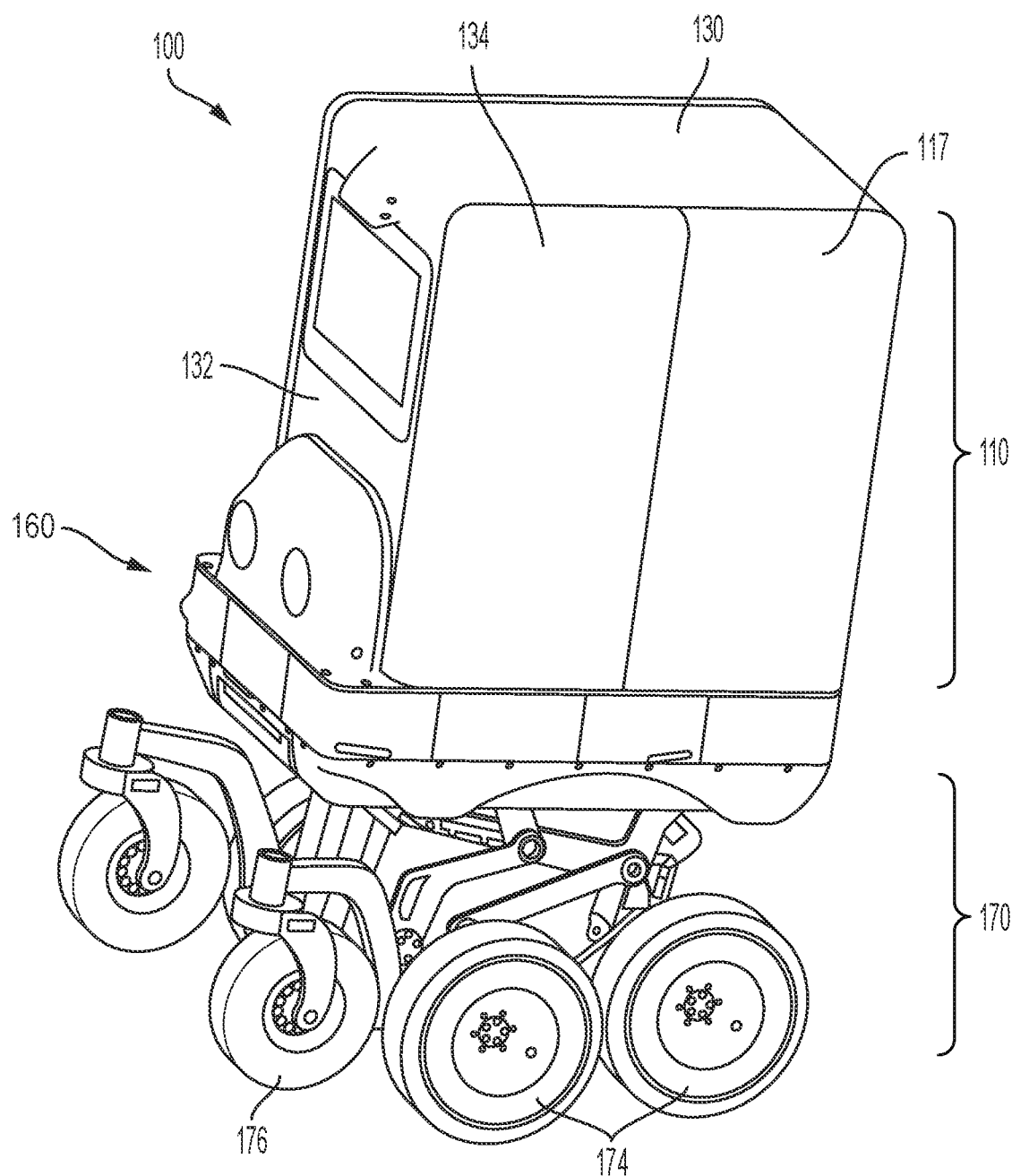
FIG. 2 is a perspective view of an autonomous vehicle.

An example autonomous delivery vehicle (ADV) 100 is shown in FIG. 2. Autonomous delivery vehicles 100 may comprise a cargo container 110. In some embodiments, the cargo container 110 may be mounted on a cargo platform 160. The cargo platform 160 may in turn be mechanically connected to a power base 170. An example power base 170 may include four powered wheels 174 and two caster wheels 176 that provide mobility to the cargo container 110 via speed and directional control. Greater or lesser numbers of powered wheels 174 or caster wheels 176 may be included in alternative embodiments. The cargo container 110 may include a body 117. The body 117 may include a number of different portions. The body 117 may include a roof 130, front portion 132, side portion 134 (which may be constructed of acutatable doors), and an opposing side portion 138 (which may also be constructed of doors, see, e.g., FIG. 19), and a rear portion 136 (opposite the front, see, e.g., FIG. 19).

Referring now to FIG. 1, in some particular embodiments, a movable cargo container 110 (which may be included on an autonomous delivery vehicle 100) may utilize a linkage apparatus 1110 such as one of those discussed herein. The movable cargo container 110 may be manually and/or autonomously navigated between an origination location and a destination to deliver documents, packages, or other items. The final destination may be an entry way, porch, hallway, cubicle, or other tight space. Additionally, this final destination may be in a non-standard configuration which is perhaps unique for each destination. The configuration of the final destination may moreover be unknown beforehand. A movable cargo container 110 can advantageously include a linkage apparatus (such as any of those discussed herein) to facilitate opening and closing of one or more door 150 (see, e.g. FIG. 13A) of the cargo container 110 to permit a recipient to access his or her deliveries in such spaces.

Figure 3:
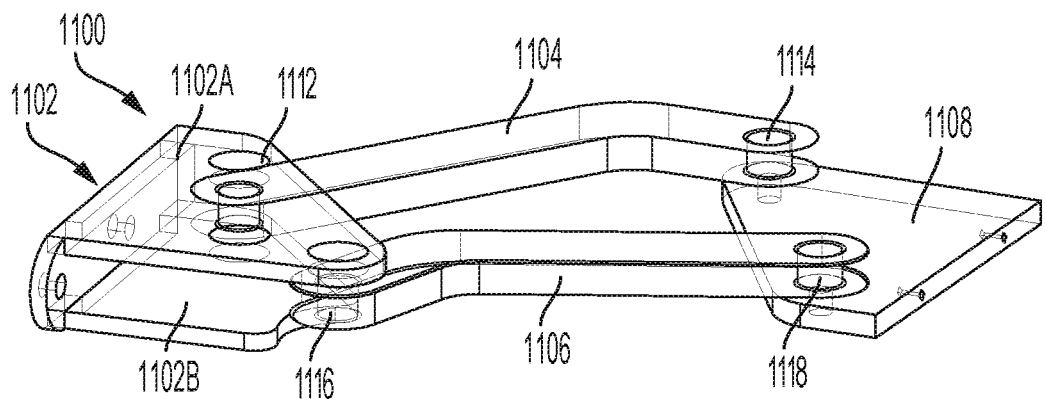
FIG. 3 depicts a perspective view of an embodiment of a linkage apparatus.

FIG. 3 depicts a perspective view of an embodiment of a linkage apparatus 1100 that includes four linkages 1102, 1104, 1106, and 1108 coupled together via four pivot points 1112, 1114, 1116, and 1118. These four linkages 1102, 1104, 1106, 1108 can be coupled together at pivot points 1112, 1114, 1116, 1118 via any suitable fastener. For example, the linkages 1102, 1104, 1106, 1108 may be coupled via bolts, pins, bushings, and other means known in the field.

Certain linkages 1102, 1104, 1106, 1108 may be disposed coplanar to one another while remaining linkages 1102, 1104, 1106, 1108 may be disposed on one or more adjacent plane. Referring to the embodiment shown in FIG. 3, linkages 1104 and 1106 can be configured coplanar to one another. Linkages 1102 and 1108 may be disposed in a plane above and/or below linkages 1104 and 1106. Thus, linkages 1104 and 1106 may be sandwiched by linkages 1102 and 1108 in some embodiments.

While various embodiments of the linkage apparatus 1100 may only include four linkages 1102, 1104, 1106, 1108, additional linkages may be included in other embodiments. For instance, one or more of the linkages 1102, 1104, 1106, 1108 may comprised of two or more sub-linkages. Division of one or more linkage 1102, 1104, 1106, 1108, into sub-linkages may help provide stability or increase ease of use. For example, as shown in FIG. 3, a linkage apparatus 1100 can include a first sub-linkage 1102A and a second sub-linkage 1102B which may work in concert as linkage 1102. As shown, sub-linkages 1102A and 1102B are disposed on opposing sides of linkages 1104 and 1106 disposed at and end of linkages 1104 and 1106. This end of linkages 1104 and 1106 may be disposed between the sub-linkages 1102A and 1102B. In the example embodiment, only a single undivided linkage 1108 is disposed at the other end of linkages 1104 and 1106. Alternatively, linkage 1108 may be comprised of two or more sub-linkages in a manner similar to that shown and described above with respect to linkage 1102. In embodiments where multiple sub-linkages (e.g. 1102A and 1102B) are used in place of a single monolithic linkage (e.g. 1102), certain linkages or sub-linkages may not be directly attached to one another via pivot points 1112, 1114, 1116, and 1118 so long as they are coupled in some manner. For example, FIG. 3 depicts linkage 1102B not directly attached to linkage 1106 at pivot point 1116.

Figure 4:
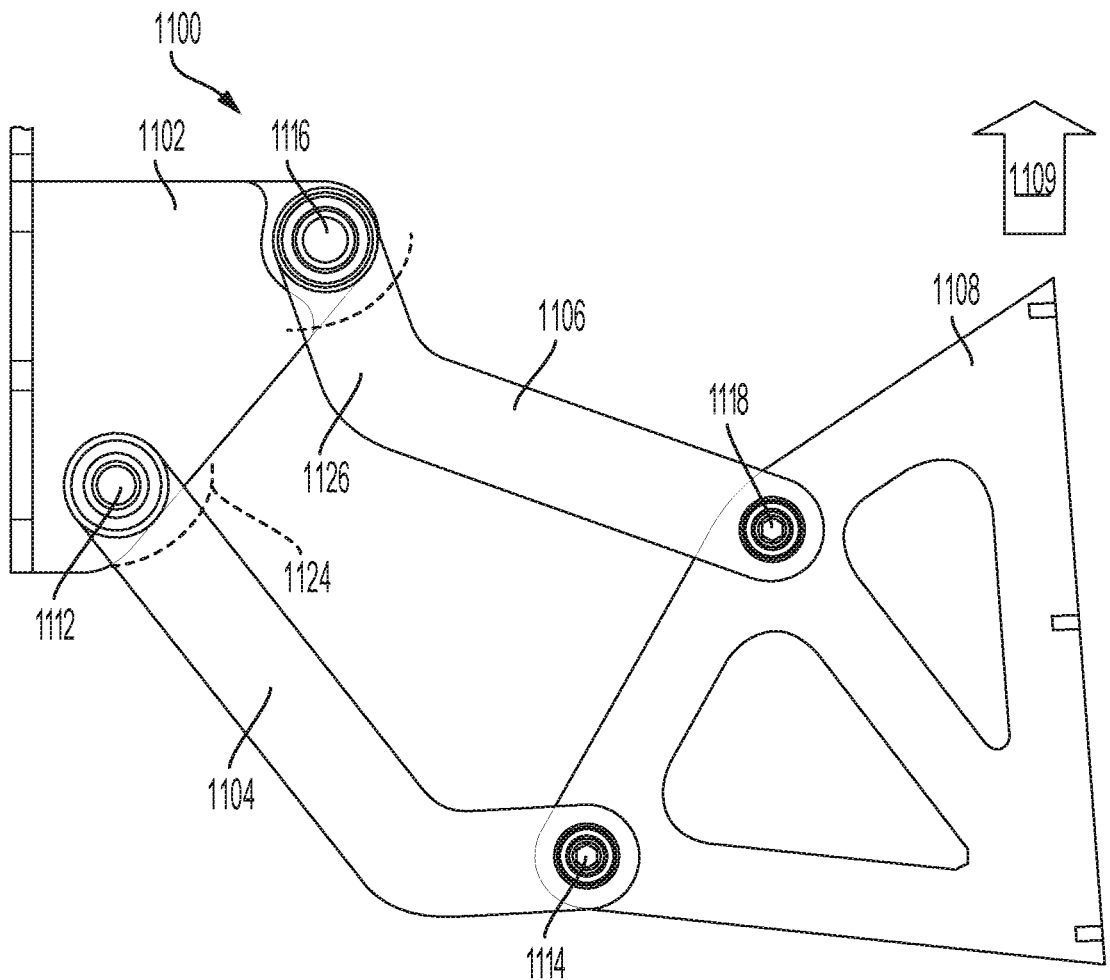
FIG. 4 depicts a perspective view of an embodiment of the linkage apparatus.

FIG. 4 depicts a top plan view of an embodiment of a linkage apparatus 1100 that includes four linkages 1102, 1104, 1106, 1108 connected together via four pivot points 1112, 1114, 1116, and 1118. In various embodiments, one or more of the linkages 1102, 1104, 1106, 1108 may be fixed relative to the storage space. One or more linkage 1102, 1104, 1106, 1108 may attach to the closure member (e.g. a door 150 of FIG. 13A) and may be fixed relative to the closure member. The remaining linkages 1102, 1104, 1106, 1108 may be rotating linkages. In the embodiment depicted in FIG. 4, these four linkages 1102, 1104, 1106, 1108 can be referred to as: fixed linkage 1102, first rotating linkage 1104, second rotating linkage 1106, and door linkage 1108. In operation, the door linkage 1108 is coupled to a door 150 (see, e.g., FIG. 13A), and the linkage apparatus 1100 operates such that the door linkage moves 1108 generally in along a displacement path 1109 to permit access to the storage space. Though described as a door linkage 1108, any closure member (e.g. panel, cap, cover) may be used. The first rotating linkage 1104 may be referred to as an "inner" rotating linkage 1104 and the second rotating linkage 1106 may be referred to as an "outer" rotating linkage 1106.

Referring now to both FIGS. 3 and 4, each of the rotating linkages 1104 and 1106 can be coupled to each of the fixed linkage 1102 and the door linkage 1108 via a pivot point 1112, 1114, 1116, 1118. For example, in FIG. 4, the first rotating linkage 1104 is coupled to the fixed linkage 1102 via pivot point 1112 and coupled to the door linkage 1108 via pivot point 1114. Similarly, the second rotating linkage 1106 is coupled to the fixed linkage 1102 via pivot point 1116 and coupled to the door linkage 1108 via pivot point 1118. With rotation noted generally by reference numerals 1124 and 1126 in FIG. 4, the rotating linkages 1104 and 1106 can be configured to rotate about the pivot points 1112 and 1116 respectively. In an embodiment, the first and second rotating linkages 1104, 1106 are configured to rotate approximately the same amount of degrees.

Figure 5:
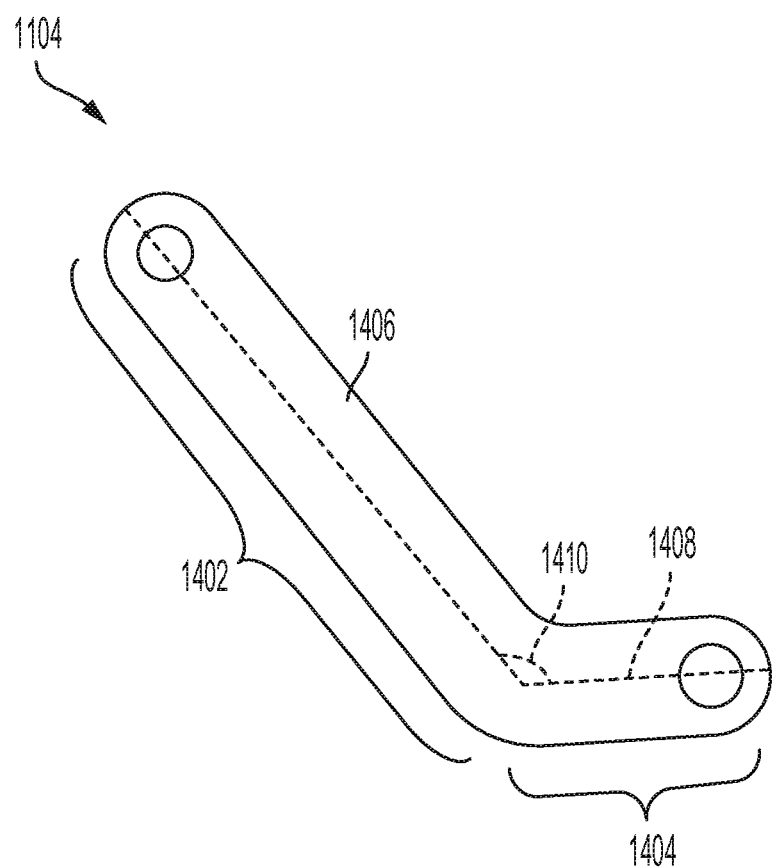
FIG. 5 depicts an embodiment of a rotating linkage used in the linkage apparatus.
Figure 6:
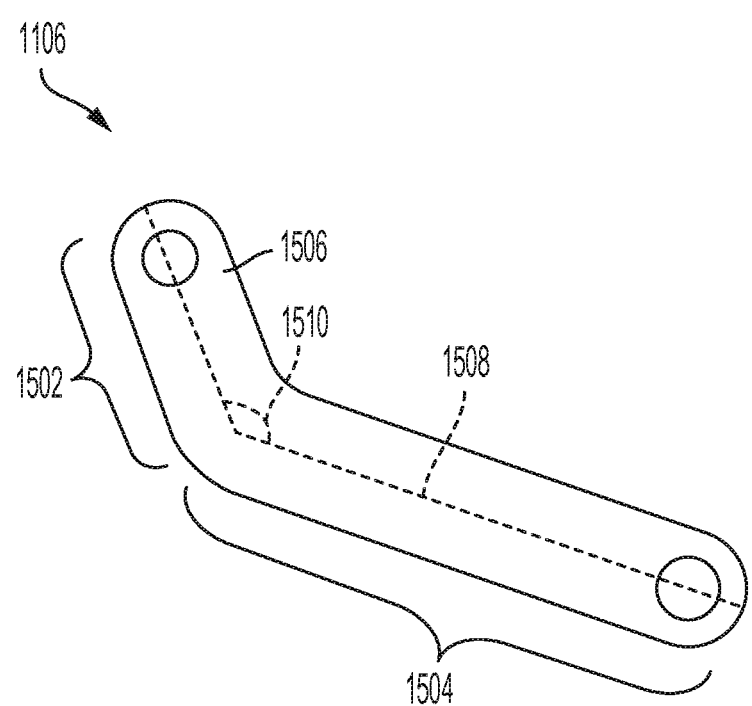
FIG. 6 depicts an embodiment of a rotating linkage used in the linkage apparatus.
Figure 45:
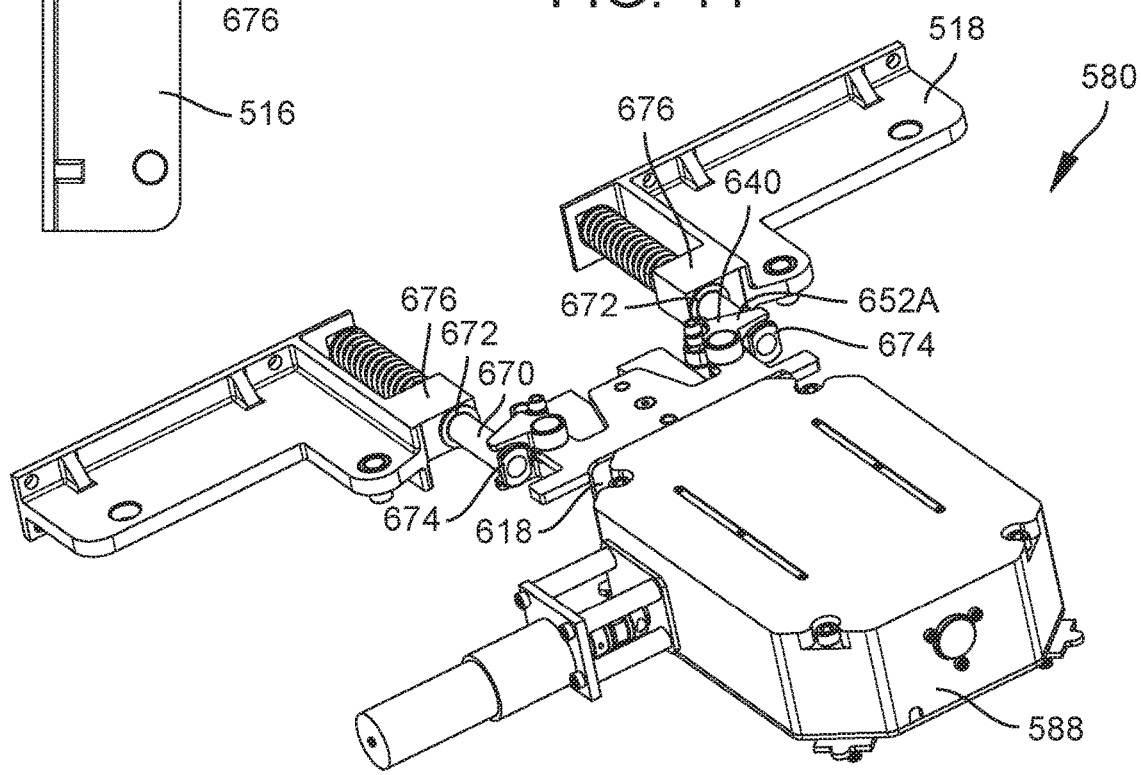
FIG. 45 depicts a perspective view of an example retention assembly.

FIGS. 5-12 depict various embodiments of linkage components of various linkage apparatuses 1100. FIGS. 45 and 6 depict embodiments of non-linear rotating linkages. FIGS. 7-12 depict various embodiments of door linkages 1108 and fixed linkages 1102 that can be coupled to the rotating linkages 1104, 1106.

Referring now to FIG. 5, a top plan view of one embodiment of a first rotating linkage 1104 is depicted. In this embodiment, the first rotating linkage 1104 can have a generally non-linear or bent profile. For example, the first rotating linkage 1104 can be characterized as having two portions 1402 and 1404, with the length of the first rotating linkage 1104 defined, in one embodiment, as the length 1406 of the first portion 1402 added to the length 1408 of the second portion 1404.

In the embodiment shown in FIG. 5, the two portions 1402 and 1404 are arranged in relationship to one another such as to form an obtuse angle 1410. In an embodiment, the obtuse angle 1410 is approximately 125°. In an embodiment, the portions 1402 and 1404 are sized differently. In one embodiment, the portion 1402 is shorter than portion 1404. With reference to FIGS. 3, 4, and 5, the first portion 1402 may be coupled to the fixed linkage 1102, while second portion 1404 may be coupled to the door linkage 1108.

FIG. 6 depicts a top plan view of one embodiment of a second rotating linkage 1106. In this embodiment, the second rotating linkage 1106 can have a generally non-linear or bent profile. For example, the second rotating linkage 1106 can be characterized as having two portions 1502 and 1504, with the length of the second rotating linkage 1106 defined, in one embodiment, as the length 1506 of the first portion 1502 added to the length 1508 of the second portion 1504. In an embodiment, the second rotating linkage 1106 can have a length, as defined above, that is less than the length of the first rotating linkage 1104.

In the embodiment shown in FIG. 6, the two portions 1502 and 1504 are arranged in relationship to one another such as to form an obtuse angle 1510. The angle 1510 may be slightly greater than the angle 1410 (see FIG. 5). In some examples the angle 1510 may be up to 105% (e.g. 104%) or 110% greater than the angle 1410. In an embodiment, the obtuse angle 1510 is approximately 130°. In an embodiment, the portions 1502 and 1504 are sized differently. In one embodiment, the portion 1502 is smaller than portion 1504. With reference to FIGS. 3, 4 and 4, the first portion 1502 may be directly coupled to the fixed linkage 1102, while the second portion 1504 may be directly coupled to the door linkage 1108.

Figure 7:
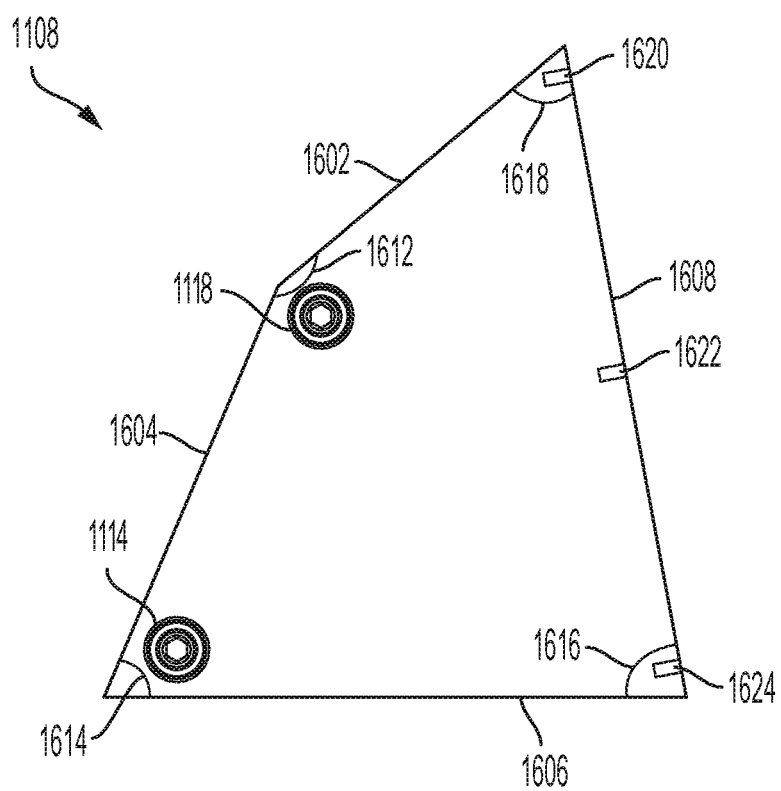
FIG. 7 depicts an embodiment of a door linkage used in the linkage apparatus.

FIG. 7 depicts a top plan view of one embodiment of a door linkage 1108. The door linkage 1108 may be defined by four sides 1602, 1604, 1606, 1608 and may have a quadrilateral profile. In the specific embodiment illustrated FIG. 7, the shape of the door linkage 1108 is also defined by angles 1612, 1614, 1616, and 1618. In particular embodiments, sides 1602 and 1604 form an obtuse angle 1612 of e.g. approximately 155°; sides 1604 and 1606 form an acute angle 1614 of e.g. approximately 65°; sides 1606 and 1608 form an acute angle 1616 of e.g. approximately 80°; and sides 1608 and 1602 form an acute angle 1620 of e.g. approximately 60°. As discussed above, the door linkage 1108 can be coupled to a door 150 (see, e.g., FIG. 13A). Coupling may be achieved via coupling interfaces 1620, 1622, and 1624. Any suitable fastener such as bolts, screws, welds, etc. may be used. The door linkage 1108 may also be coupled to the first rotating linkage 1104 and/or the second rotating linkage 1106 via pivot points 1114 and/or 1118.

Figure 8:
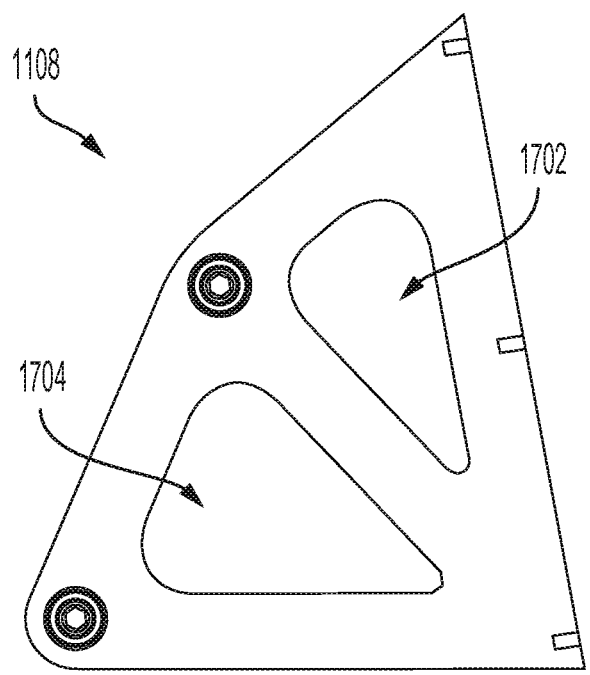
FIG. 8 depicts an embodiment of a door linkage used in the linkage apparatus.

FIG. 8 depicts an alternative to the door linkage 1108 shown in FIG. 7. As shown in this embodiment, one or more of the intersections between two sides of the door linkage 1108 may be rounded, without deviating from the approximate angles between those sides mentioned above regarding FIG. 7. Additionally, as shown in FIG. 8, the door linkage 1108 may define one or more apertures 1702 and 1704. These apertures 1702, 1704 may extend completely through the door linkage 1108. This may limit material needed to construct the door linkage 1108 and may help lower the weight of a linkage apparatus 1100. Any other linkage 1102, 1104, 1106, described herein may include similar apertures.

Figure 9:
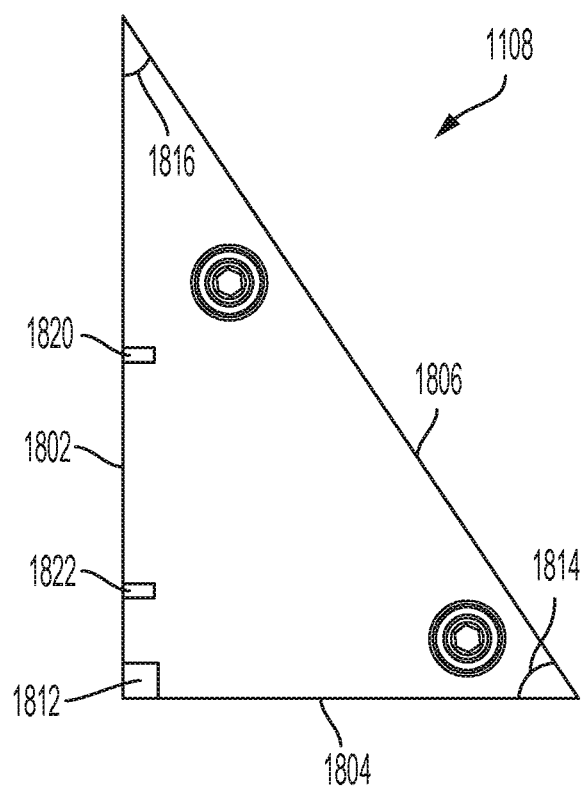
FIG. 9 depicts an embodiment of a door linkage used in the linkage apparatus.

FIG. 9 depicts a top plan view of another embodiment of a door linkage 1108. The example door linkage 1108 shown in FIG. 9 is defined by three sides 1802, 1804, and 1806. The shape of the exemplary door linkage 1108 is defined by angles 1812, 1814, and 1816. In particular embodiments, sides 1802 and 1804 form an angle 1812 of approximately 90°; sides 1804 and 1806 form an acute angle 1814 of e.g. approximately 55°; and sides 1806 and 1802 form an acute angle of e.g. approximately 35°. As discussed above, the door linkage 1108 may be coupled to a door 150 (see, e.g. FIG. 13A). Coupling may be achieved via coupling interfaces 1820, 1822. Any suitable fastener such as bolts, screws, welds, etc. may be used. The door linkage 1108 may also be coupled to the first rotating linkage 1104 and/or the second rotating linkage 1106.

Figure 10:
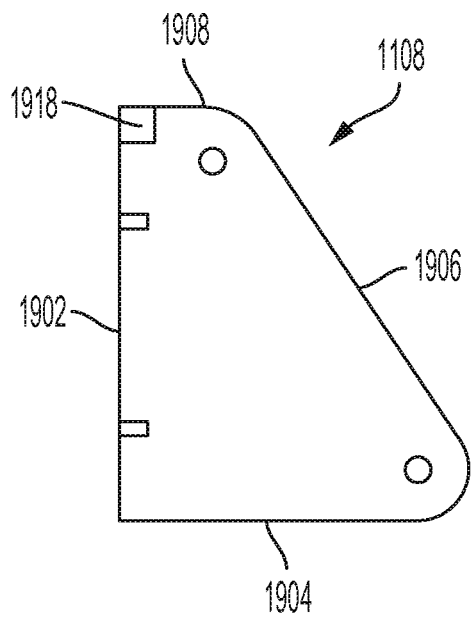
FIG. 10 depicts an embodiment of a door linkage used in the linkage apparatus.

FIG. 10 depicts another door linkage 1108 embodiment. The example door linkage 1108 shown in FIG. 10, exhibits a shape having four sides 1902, 1904, 1906, 1908. As shown, the shape of the door linkage 1108 in FIG. 10 may resemble a right triangle with a tip of the triangle being removed. As shown in this embodiment, one or more of the intersections between two sides of the door linkage 1108 may be rounded, without deviating from the approximate angles between those sides mentioned above regarding FIG. 9. In an embodiment, the sides 1906 and 1908 may be generally parallel to one another, so as to form a right angle 1918 between sides 1902 and 1908.

Figure 11:
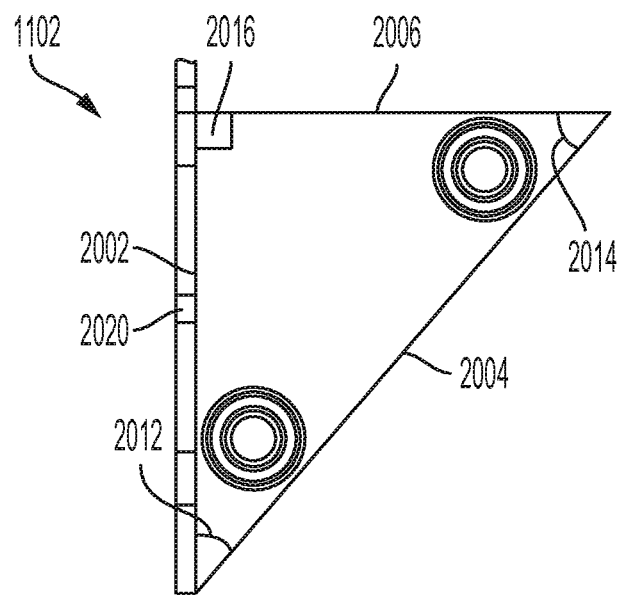
FIG. 11 depicts an embodiment of a fixed linkage used in the linkage apparatus.

FIG. 11 depicts a top plan view of one embodiment of the fixed linkage 1102. The example fixed linkage 1102 exhibits a triangular shape and includes sides 2002, 2004, and 2006. The arrangement of sides 2002, 2004 and 2006 can be defined by angles 2012, 2014, and 2016. In one embodiment, sides 2002, 2004, and 2006 are arranged such that sides 2002 and 2004 form an acute angle 2012 of approximately 40°; sides 2004 and 2006 form an acute angle 2014 of approximately 50°; and sides 2006 and 2002 form an angle 2016 of approximately 90°. The example fixed linkage 1102 can be fixedly attached to a storage space e.g. via coupling interfaces 2020, 2022. Any suitable fastener such as a bolt, pin, screw, etc. may be used. The fixed linkage 1102 may also be coupled to the first rotating linkage 1104 and/or the second rotating linkage 1106.

Figure 12:
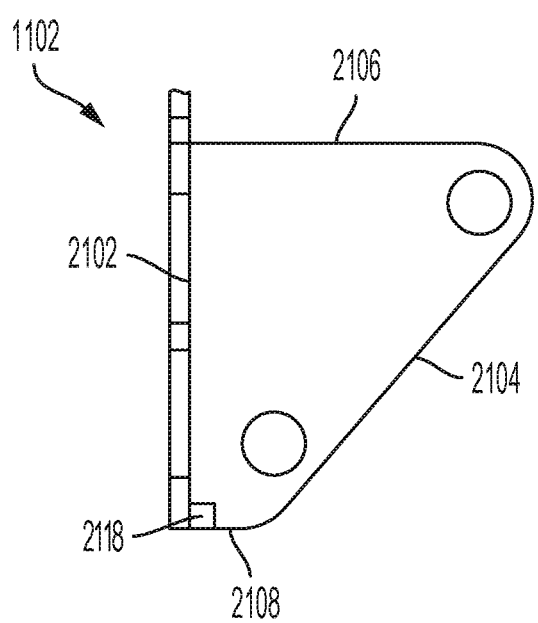
FIG. 12 depicts an embodiment of a fixed linkage used in the linkage apparatus.

FIG. 12 depicts an alternative embodiment of a fixed linkage 1102. The example fixed linkage 1102 in FIG. 12 exhibits a shape having sides 2102, 2104, 2106, and 2108. As shown, the shape of the fixed linkage 1102 in FIG. 12 may resemble a right triangle with a bottom "tip" of the triangle being removed. As shown in this embodiment, one or more of the intersections between two sides of the door linkage 1108 may be rounded, without deviating from the approximate angles between those sides mentioned above regarding FIG. 11. In an embodiment, sides 2106 and 2108 may be generally parallel to one another so as to form a right angle 2118 between sides 2102 and 2108. Although not shown in FIG. 11 or 12, the fixed linkage 1102 may have one or more apertures defined therein.

As a result of the coupling of the first rotating linkage 1104, door linkage 1108, and second rotating linkage 1106 via pivot points 1114, 1118, motion or rotation of one or more of these three linkages 1104, 1106, 1108 will cause motion or rotation of the remaining linkages 1104, 1106, 1108. For example, movement of the door linkage 1108 transfers motion and/or rotation to the first rotating linkage 1104 and the second rotating linkage 1106. Similarly, movement of the rotating linkages 1104 and 1106 will cause the door linkage 1108 and door 150 (see, e.g., FIG. 13A) attached thereto to move and/or rotate. Additional structures and/or features may also be added to facilitate movement of the rotating linkages 1104, 1106. For example, although not shown, some embodiments may include a handle on the door 150 (see. e.g. FIG. 13A) to facilitate manual movement.

FIGS. 13A-D, and FIGS. 14-18 provide various views of an example linkage assembly 1100 to exemplarily explain the structure, function, and operation of the example linkage assembly 1100 as a whole.

FIGS. 13A-D depict various stages of a door 150 opening/closing process using an embodiment of the linkage apparatus 100 described herein. During opening of the door 150 to reveal an interior storage space 2206 of the container 110, the linkage apparatus 1100 may constrain the door 150 such that the door 150 opens in a space efficient manner. In certain examples, the door 150 may open in one or more phases. A during a first opening phase, the door 150 may displace in a first manner. For example, the door 150 may substantially only displace translationally. In a second opening phase, the door 150 may displace in a second manner. For example, displacement of the door 150 in the second phase may be primarily rotational. Alternatively, the door 150 may both rotationally displace and translationally displace in the second opening phase.

Figure 13A:
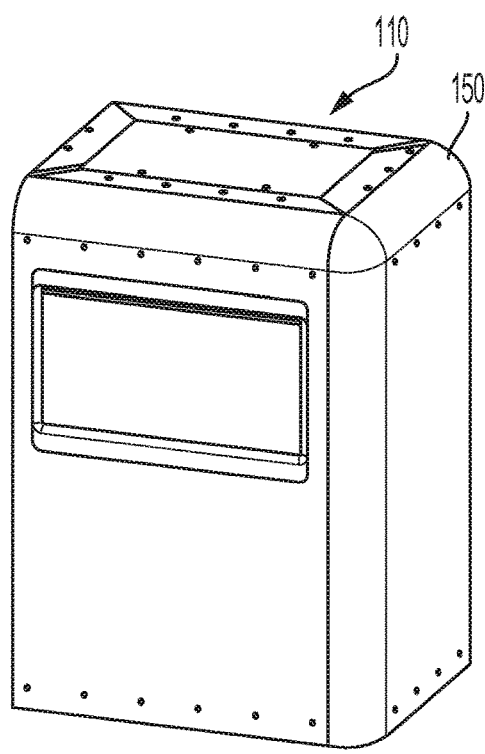
FIGS. 13A, 13B, 13C, and 13D depict various stages of the door opening/closing process using an embodiment of the linkage apparatus.
Figure 13B:
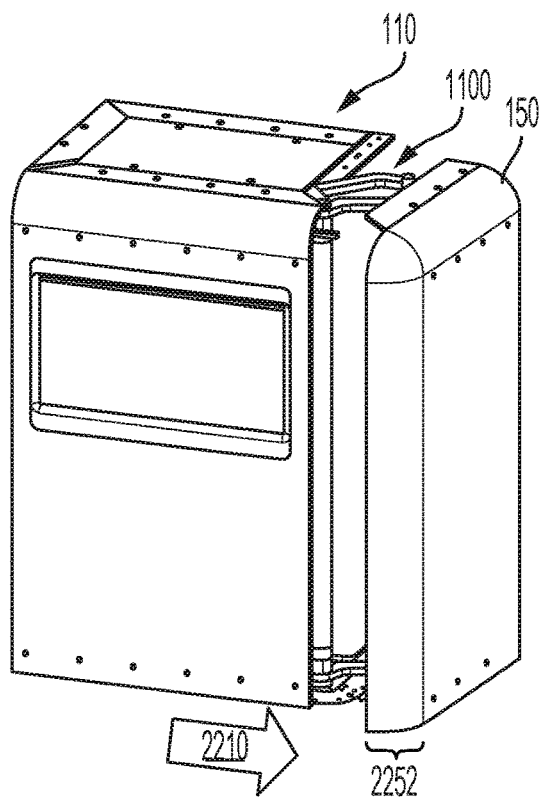

FIG. 13A depicts the linkage apparatus 1100 and therefore door 150 in a closed state. FIG. 13B depicts the linkage apparatus 1100 and door 150 in a partially open state. The first opening phase may be at least partially completed in FIG. 13B. As the rotating linkages 1102 and 1104 of the linkage apparatus 1100 begin to rotate from their closed state (see FIG. 13A) to the partially open state in the first opening phase, the door 150 may generally translate in the direction of reference numeral 2210.

Figure 13C:
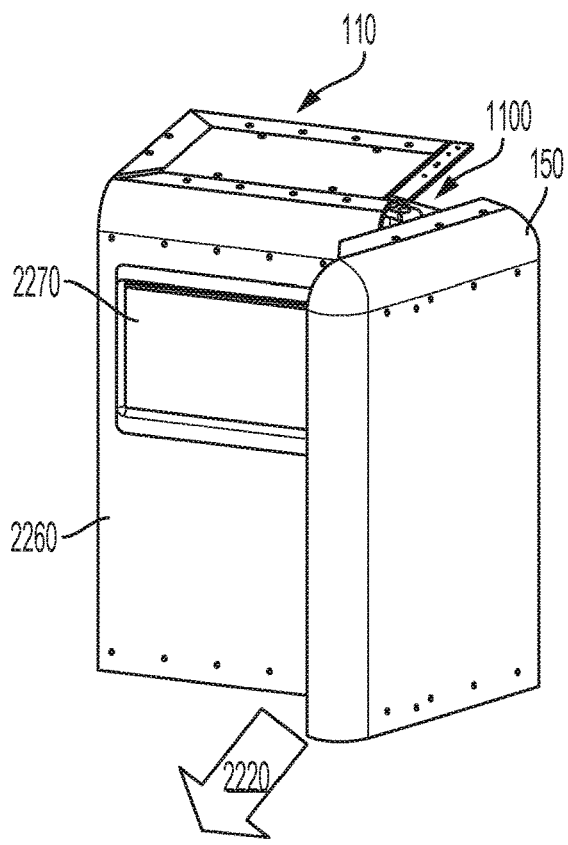
Figure 13D:
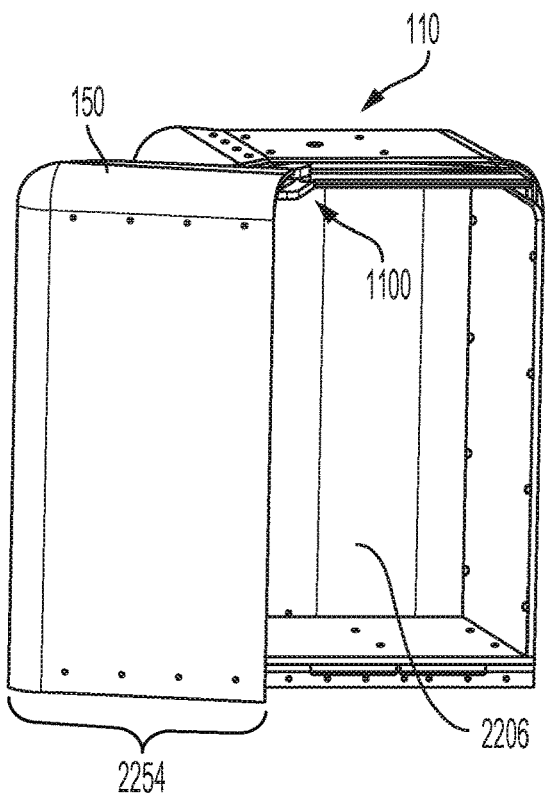

FIG. 13C depicts the door 150 and linkage apparatus 1100 in an open state. As the rotating linkages 1102, 1104 of the linkage apparatus 1100 continue to rotate in the second opening phase, the door 150 may transition from the position in FIG. 13B to the position shown in FIG. 13C. While making this transition, the door 150 may rotate relative about a vertical axis while it translates generally in the direction of reference numeral 2220. In an embodiment, the direction 2220 is approximately perpendicular to direction 2210. When in the open state (shown from the side in FIG. 13D), the storage space 2206 of the cargo container 110 may be accessed. When a user is finished accessing the storage space 2204, the door 150 may be closed by transitioning the linkage apparatus 1100, components thereof, and door 150 in reverse through the progression of FIGS. 13A-C.

As can be seen from FIGS. 13A, 13B, and 13C, an example linkage apparatus 1100 may permit door 150 opening with a front space approximately equal to about the depth 2252 of the door 150. Additionally, an example linkage apparatus 1100 may permit door 150 opening with a side space equal to a fraction of the width 2254 of the door 150. In certain example, the door 150 may open with a side space equal to about 60% of the width 2254 of the door 150. With this configuration, minimal side and front space is needed for door 150 opening/closing. Moreover, opening and closing of the door 150 may be conducted without obscuring components or features disposed on a side surface 2260 of the cargo container 110 (e.g. a screen 2270, logos, branding, instructions, indicia, sensors, etc.).

Figure 14:
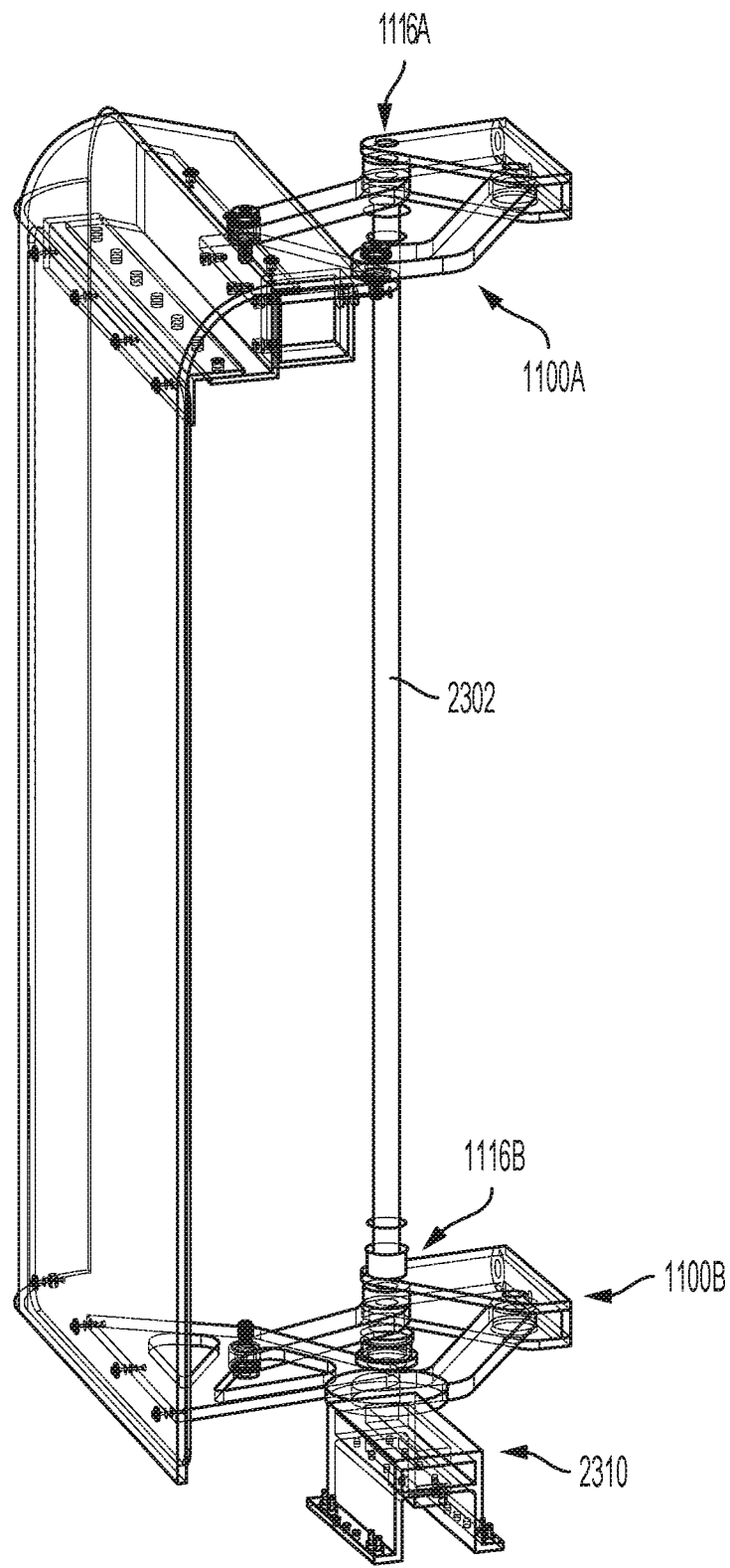
FIG. 14 depicts a system including two embodiments of the linkage apparatus.

As shown in FIG. 14, more than one of the linkage apparatus 1100 may be utilized in certain embodiments. Multiple linking apparatuses 1100 may, for example, help to accommodate larger housing and door geometries. FIG. 14 depicts an assembly with two linkage apparatuses 1100A and 1100B disposed spaced apart from one another. Some embodiments may also include a support rod 2302 coupling the linkage apparatuses 1100A and 1100B to one another. In such embodiments, the support rod 2302 can be coupled to the linkage apparatuses via a pivot point (e.g. pivot point 1116 in the exemplary embodiment depicted in FIG. 14) of each linkage apparatus 1100A and 1100B.

As discussed above, the rotation of the rotating linkages can be easily initiated without manual interaction with the door 150 or door linkage 1108. Various embodiments may include one or more actuator which may be operatively connected to the door 150 to allow for powered door 150 actuation. A controller such as a microprocessor may be included to orchestrate door 150 actuation. Specifically, as shown in FIG. 14, a motor assembly 2310 can be configured to communicate with one or more of the pivot points 1112, 1116 to cause rotation of one or more of the rotating linkages 1104 and 1106. Any suitable motor may be used in the motor assembly 2310. In some specific embodiments, a stepper motor may be used. In embodiments including more than one linkage assembly 1100A, B, the motor assembly 2310 can be configured to efficiently communicate with more than one linkage apparatus 1100A, B at a time. Such a configuration is exemplarily shown in FIG. 14, where motor assembly 2310 is configured to communicate with the first pivot point 1116A of a first linkage apparatus 1100A and, via rod 2302, with the first pivot point 1116B of a second linkage apparatus 1100B. As a result of the motor assembly 2310 mechanically communicating with one or more pivot point 1116, 1112, the rotating linkages 1104, 1106 will rotate as a result of the rotation of the generated by the motor assembly 2310, thereby causing the door linkage 1108 and door 150 attached thereto to also move as a result of the rotation of the servo 2310. The servo 2310 may be programmed to only permit a desired amount of rotation, thereby prohibiting over-extension of the door 150 and/or linkage apparatus 1100 and/or components thereof.

Figure 15:
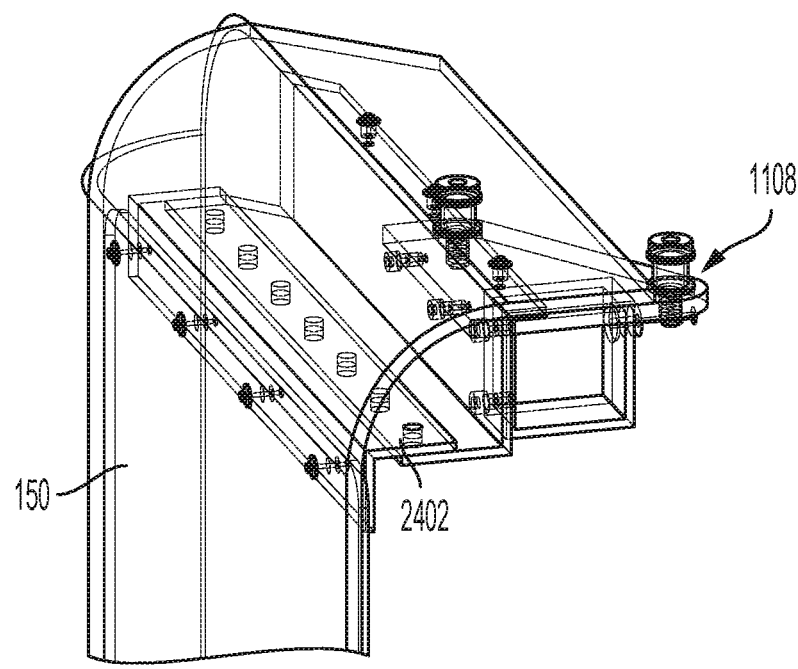
FIG. 15 depicts a close-up view of a portion of one embodiment of the linkage apparatus.
Figure 16:
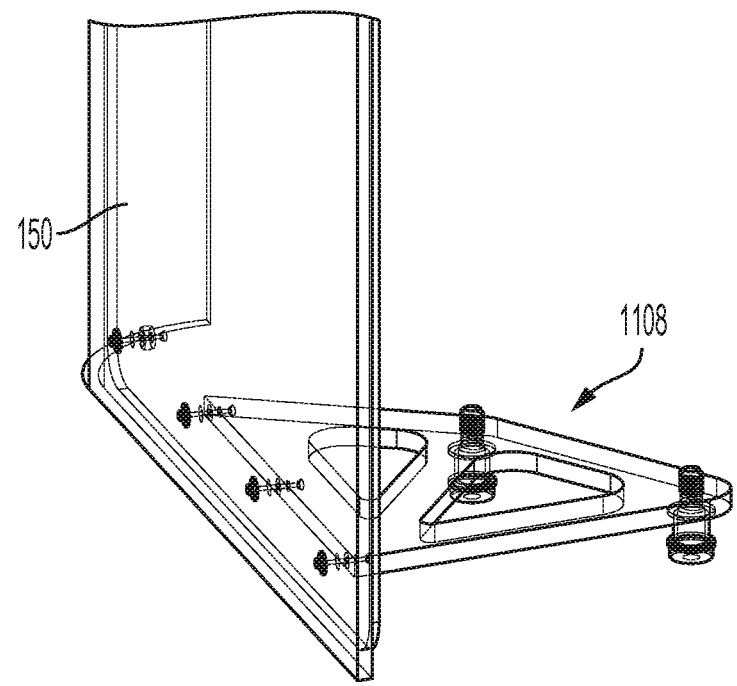
FIG. 16 depicts a close-up view of a portion of one embodiment of the linkage apparatus.

FIG. 15 shows a close-up view of a portion of a "top" linkage apparatus 1100A coupled to a door 150. In some embodiments, such as that shown in FIG. 15, the door linkage 1100A may be indirectly coupled to the door via other structures, for example bracket 2402. As shown in the close-up view of a portion of a "bottom" linkage apparatus 1100B in FIG. 16, a door linkage 1108 may also be directly coupled to the door 150. Embodiments utilizing two door linkages 1100A, 1100B can include both door linkages 1108 directly coupled to the door 150, both indirectly coupled to the door 150, or can include one door linkage 1108 directly coupled to the door 150 and one door linkage 1108 indirectly coupled to the door 150 (as exemplarily shown in FIGS. 15 and 16).

Figure 17:
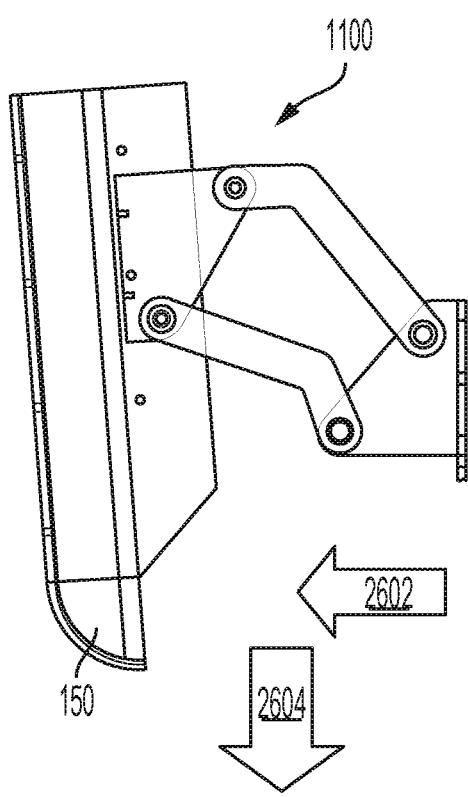
FIG. 17 depicts a top plan view of an embodiment of the linkage apparatus attached to a door.
Figure 18:
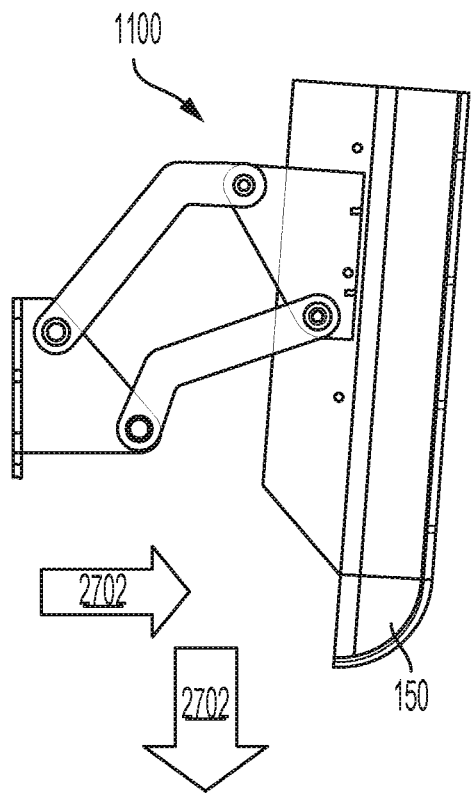
FIG. 18 depicts a top plan view of an embodiment of the linkage apparatus attached to a door.

In addition to providing desired door 150 movement and facilitating ease of use in a wide variety of potential close quarters arrangements, exemplary linkage apparatuses 1100 may also be configured to facilitate easy manufacturing and usability. For example, a linkage apparatus 1100 may be interchangeable between right-opening and left-opening door 150 arrangements. An example linkage apparatus 1100 be may be flipped 180° prior to installation to accommodate the other opening direction. FIGS. 17 and 18 depict top plan views of an exemplary embodiment of a linkage apparatus 1100 attached to a door 150 in a rightward opening (FIG. 17) and leftward opening (FIG. 18) configuration. As drawn, the linkage apparatus 1100 in each figure facilitates general movement of the door 150 in the direction 2602 or 2702, then in the general direction of 2604 or 2704. The linkage apparatuses 1100 in each of FIGS. 17 and 18 only differ in that one has been flipped in relation to the other. This quick interchangeability and utility prevents the need to make dedicated "left-sided" and "right-sided" embodiments, permitting manufacture of one type of linkage apparatus 1100 that can be easily used in both left-opening and right-opening situations.

For illustrative purposes, discussions herein have been primarily made with reference to the opening of doors 150 in the left and/or right direction. The embodiments of the linkage apparatus 1100 discussed herein can be rotated and accordingly attached to a door 150 such as to facilitate opening of a door 150 in the upward and/or downward direction, such as commonly used in connection with a hutch door on a desk. Discussions herein may be accordingly correlated to such upward/downward opening.

Figure 19:
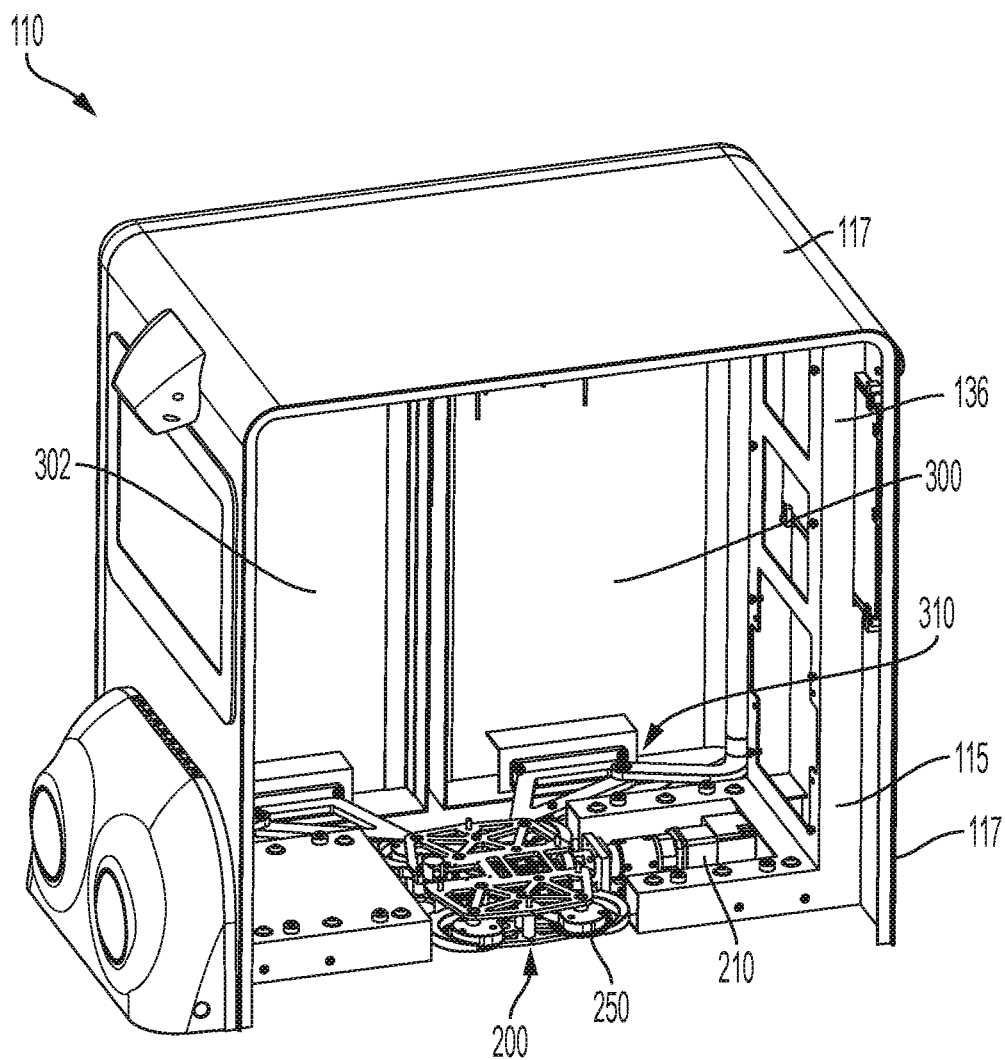
FIG. 19 is a perspective view of a cargo container.

FIG. 19 illustrates a view showing the interior of an example cargo container 110. A portion (side portion 134 of FIG. 2) of the cargo container 110 has been removed for in FIG. 19 for sake of illustration. The example cargo container 110 may include a frame 115 and the body 117. The body 117 may be attached to the frame 115. The body 117 may form part of the exterior of the cargo container 110. An autonomous delivery vehicle 100 may include one or more closure members (e.g. doors 300 and 302). An autonomous delivery vehicle 100 may include at least one retention assembly which may be operated to lock a closure member of the autonomous delivery vehicle 100 in place (e.g. in a closed state) and/or pull a closure member against a portion of the frame 115 to, for example, ensure robust sealing and inhibit opening or other displacement of the closure members.

Exemplary retention assemblies described herein are primarily located at the bottom of the cargo container 110 (see, e.g., the latch assembly 200 of FIG. 19), however, a retention assembly 200 may additionally or alternatively be located at the top of the cargo container 110. Such a retention assembly may be attached directly or indirectly to the top of a closure member (e.g. door 300, 302) of the cargo container 110. In certain embodiments, the cargo container 110 may contain plurality of retention assemblies which may be located in a variety of locations within the cargo container 110. For instance, separate retention assemblies may be disposed at both the top and bottom of the cargo container 110. A first retention assembly may secure a portion of the top of at least one associated door 300, 302 while a second retention assembly may secure a portion of the bottom of at least one associated door 300, 302. In certain embodiments, the top and bottom of each door 300, 302 may include a follower pin which may cooperate with its respective retention assembly and may be the portion of the door 300, 302 which is secured by that retention assembly.

As shown in FIG. 19, the retention assembly may be a latch assembly 200. A closure member (such as a door 300, 302) may be securely closed against the frame 115 and/or body 117 via a latch assembly 200. In certain embodiments, the latch assembly 200 may include at least one cam 250 that secures a portion of the door 300 therein. For example, a cam 250 of the latch assembly 200 may be actuated to secure a portion of a follower included as part of a door 300, 302 within the cam 250. The cams 250 may also pull doors 300 of the autonomous delivery vehicle closed against the frame 115 or body 117 of the cargo container 110. One or more latch motor 210 may be included and may be powered to actuate any of the one or more cams 250.

Figure 20A:
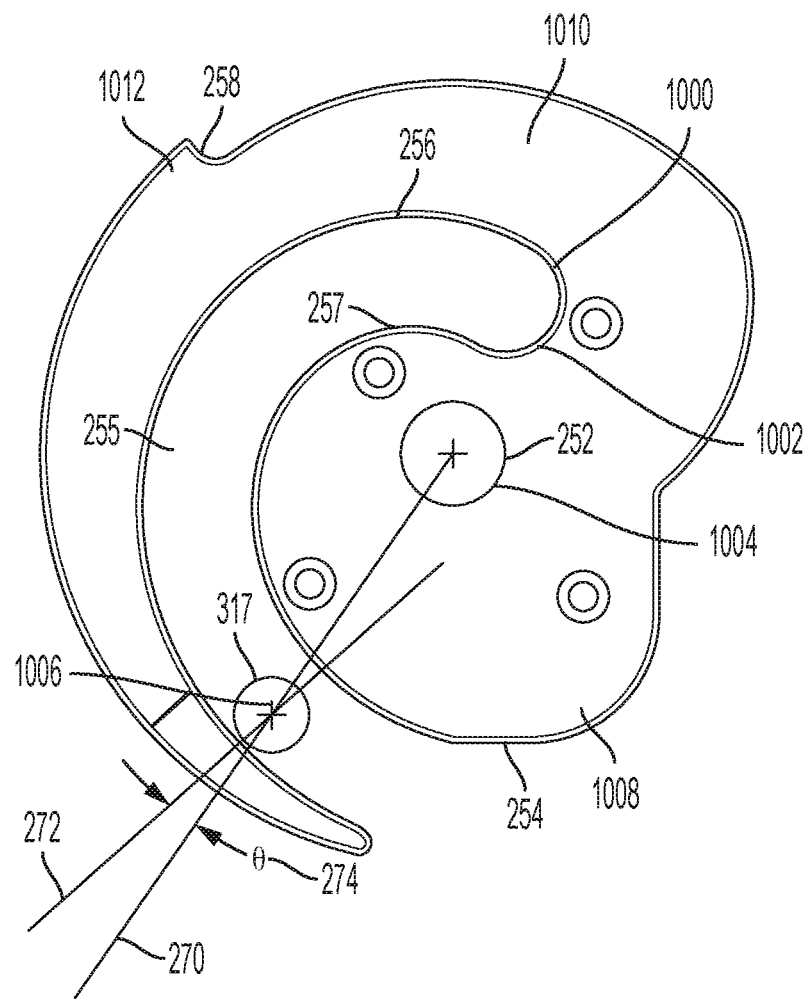
FIG. 20A is a top view of a cam.
Figure 20B:
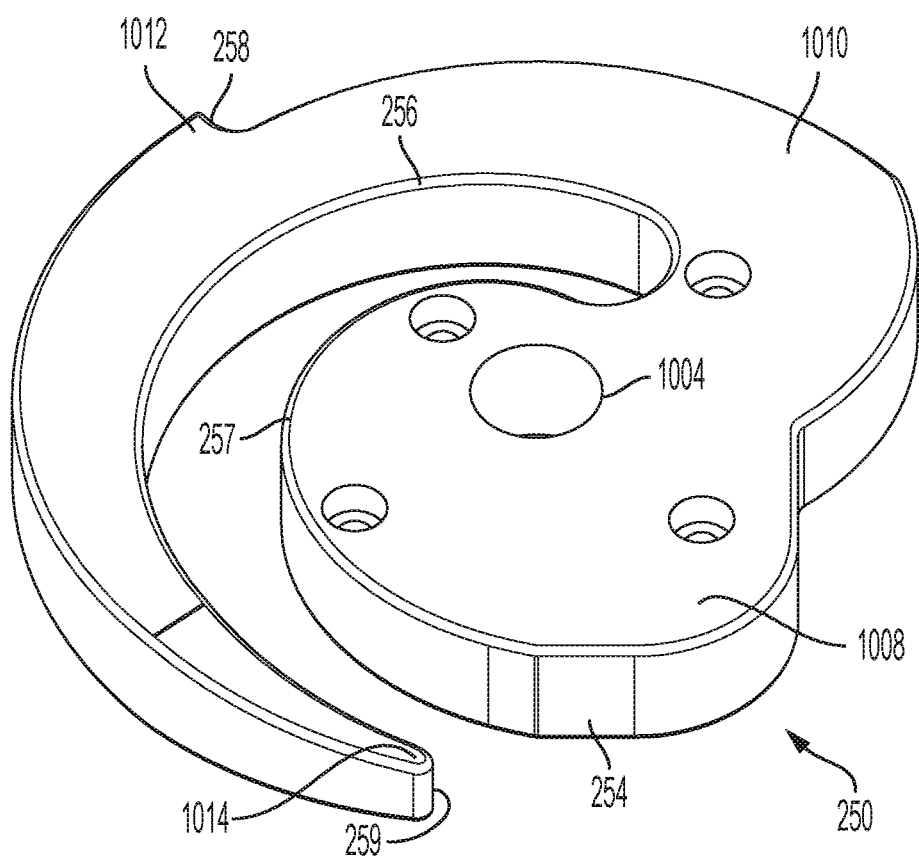
FIG. 20B is perspective view of a cam.

FIGS. 20A and 20B illustrate one exemplary cam 250 which may be included in a latch assembly 200. FIG. 20A further depicts an exemplary interaction between a follower 317 (which may be included as part of a closure member such as a door 300, 302) and the cam 250. The cam 250 may include a groove or channel 255 extending therethrough. The groove 255 may be defined as a planar profile cut from a solid with an axis of rotation which extends through the center point 252. The plane of the planar profile is perpendicular to the axis of rotation. The groove 255 may be characterized by the outer surface 256 and inner surface 257. The groove 255 may also include an interior terminus 1000 defined by a terminus surface 1002 which connects the outer surface 256 and inner surface 257. The groove 255 may be defined by a radius from the center point 252 which varies over the length of the groove 255. The radius may gradually increase from a smallest distance to a greatest distance in a substantially constant manner over the length of the groove 255. In the example embodiment, the radius is smallest at the interior terminus 1000 of the groove 255.

The groove 255 may divide the cam into a hub portion 1008 and an arm portion 1010. The hub portion 1010 may include the hole 1004 of the cam 250. The inner surface 257 may define a groove facing edge of the hub portion 1008. The arm portion 1010 may extend from the hub portion 1008. The arm portion 1010 may be curved or hook-like in certain embodiments. The outer surface 256 of the groove 255 may define a groove facing edge of the arm portion 1010. The arm portion 1010 may generally decrease in width as distance to the attachment point to the hub portion 1008 increases. In the example embodiment, the arm portion 1010 may include a bump portion 1012 where the width of the arm portion 1010 changes in a substantially stepwise fashion. A stop surface 258 may be formed by the step caused by the change in width the bump portion 1012. The terminal end 1014 of the arm portion 1010 may also define a stop surface 259 in some examples. In certain embodiment An exemplary cam 250 may include several features which, during actuation, may pull a follower 317 toward a mid-line 323 (see, e.g. FIG. 21A) or some other reference line or plane of the cargo container 110 and provide additional mechanical advantage between the latch motor 210 and any structure attached to the follower 317 (e.g. door 300, 302). A cam 250 may rotate about a shaft (e.g. elongate cylinder) or bolt that passes through a hole 1004 included in the cam 250. The cam 250 may include a flat face 254 at the entrance to the groove 255 where the follower 317 may contact the cam 250 as the latching process is initiated. The follower 317 may contact the outer surface 256 during the latching process. In certain embodiments, the follower 317 may include a roller 631 (see, e.g. FIG. 42) attached thereto to facilitate movement of the follower 317 along the cam 250. The roller 631 may include a contact face which may be the portion of the follower 317 which contacts the cam 250.

The geometry of the cam 250 may be selected to facilitate the latching process. For example, the pressure angle $\Theta$ defines the mechanical advantage that the cam 250 may apply to the follower 317. In FIG. 20A, the pressure angle Θ is defined as the angle between a line 270 from the center point 252 of the cam 250 and a line 272 from a center point 1006 of the follower 317 through a contact point of the follower 317 on the outer surface 256. In short, the pressure angle Θ is the angle between lines 270 and 272.

Referring now to FIG. 19 in addition to FIGS. 20A and 3B, in certain examples, a latch motor 210 may be included. During closing of a door 300, 302, once the door 300, 302 is displaced to a cam contacting state, the follower 317 may contact the cam 250. Once the door 300, 302 reaches the cam contacting state, the latch motor 210 can be powered to complete the latching process. The latch motor 210 can be powered to rotate the cam 250 about its center point 252. Any suitable coupling may be used to operatively couple the cam 250 to the latch motor 210. In certain examples, the latch motor 210 may be coupled to the cam 250 via one or more gears. As the cam 250 is rotationally displaced about its center point, the cam 250 engage and draw the follower 317 and the attached door 300, 302 inward (e.g. toward the centerline of the cargo container 110).

Figure 21A:
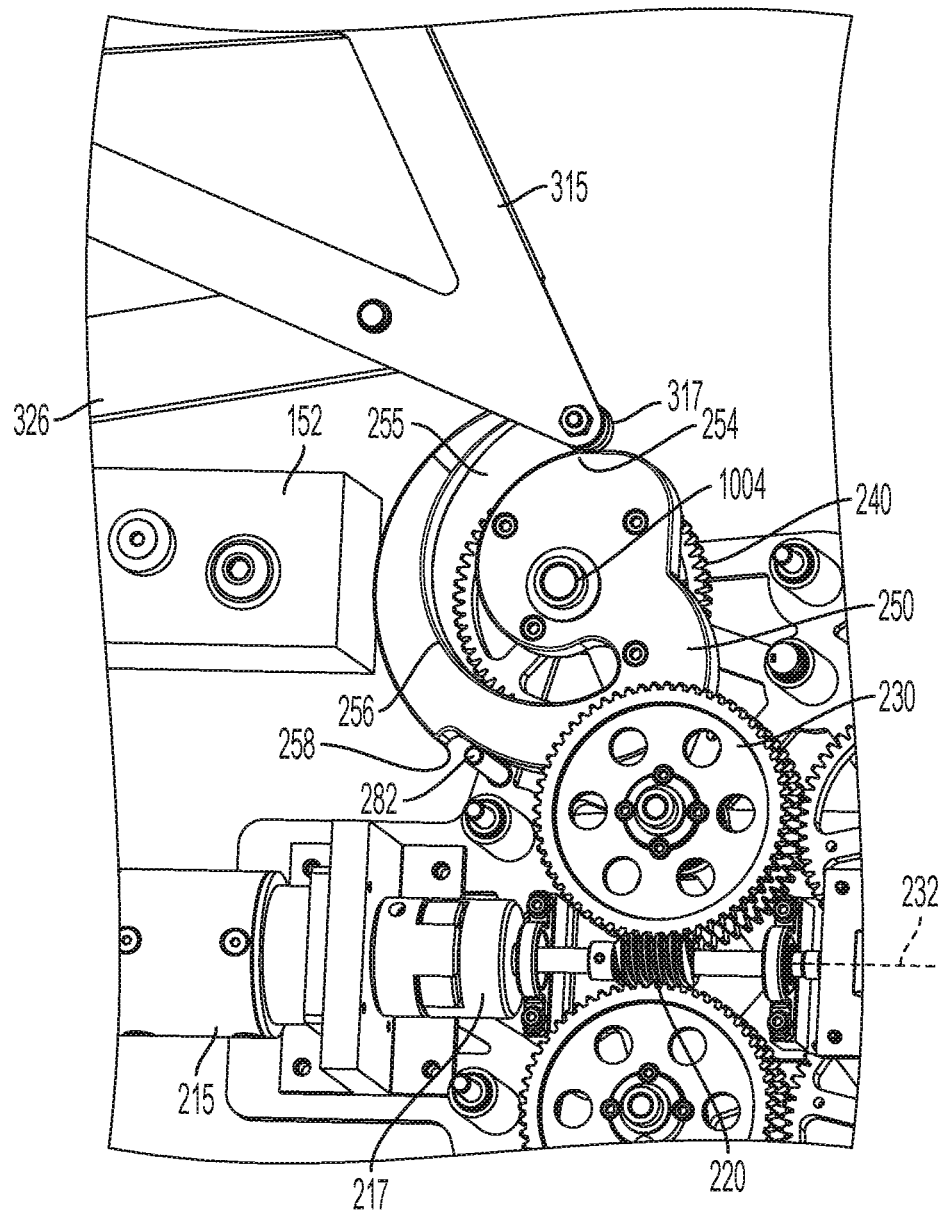
FIG. 21A is a top view of a cam interacting with a follower pin in a first position.

FIGS. 21A, 4B, and 4C each illustrate engagement of the follower 317 with the cam 250 at different rotation positions of the cam 250. The cam 250 may pass through these rotational positions during the drawing of the follower 317 (and door 300, 302 to which is attached) toward the centerline of the cargo container 110.

FIG. 21A depicts the engagement of the follower 317 with cam 250 when a door 300, 302 including the follower 317 has been displaced to a cam contacting state. As shown, the follower 317 may contact the flat face 254 in when the associated door 300, 302 has been displaced to the cam contacting state. Zero cam 250 rotation has been effected by the latch motor 210 (see, e.g., FIG. 19) in FIG. 21A. The cam 250 may be considered in an open state in FIG. 21A.

Figure 21B:
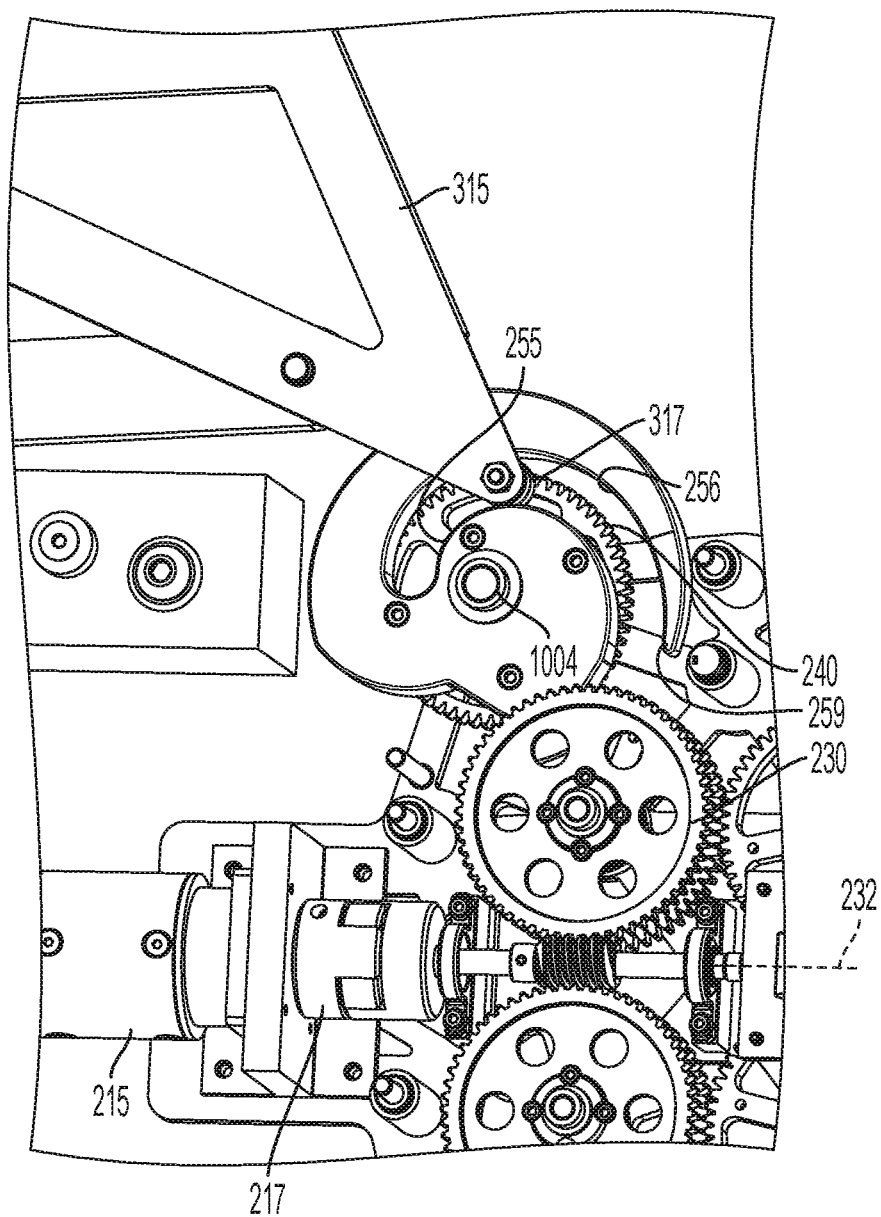
FIG. 21B is a top view of a cam interacting with a follower pin in a second position.

In FIG. 21B, the cam 250 has begun rotational displacement and the follower 317 has been pulled toward the midline 232 of the container 110. In FIG. 21B the cam 250 has been driven>90° from its position in FIG. 21A.

Figure 21C:
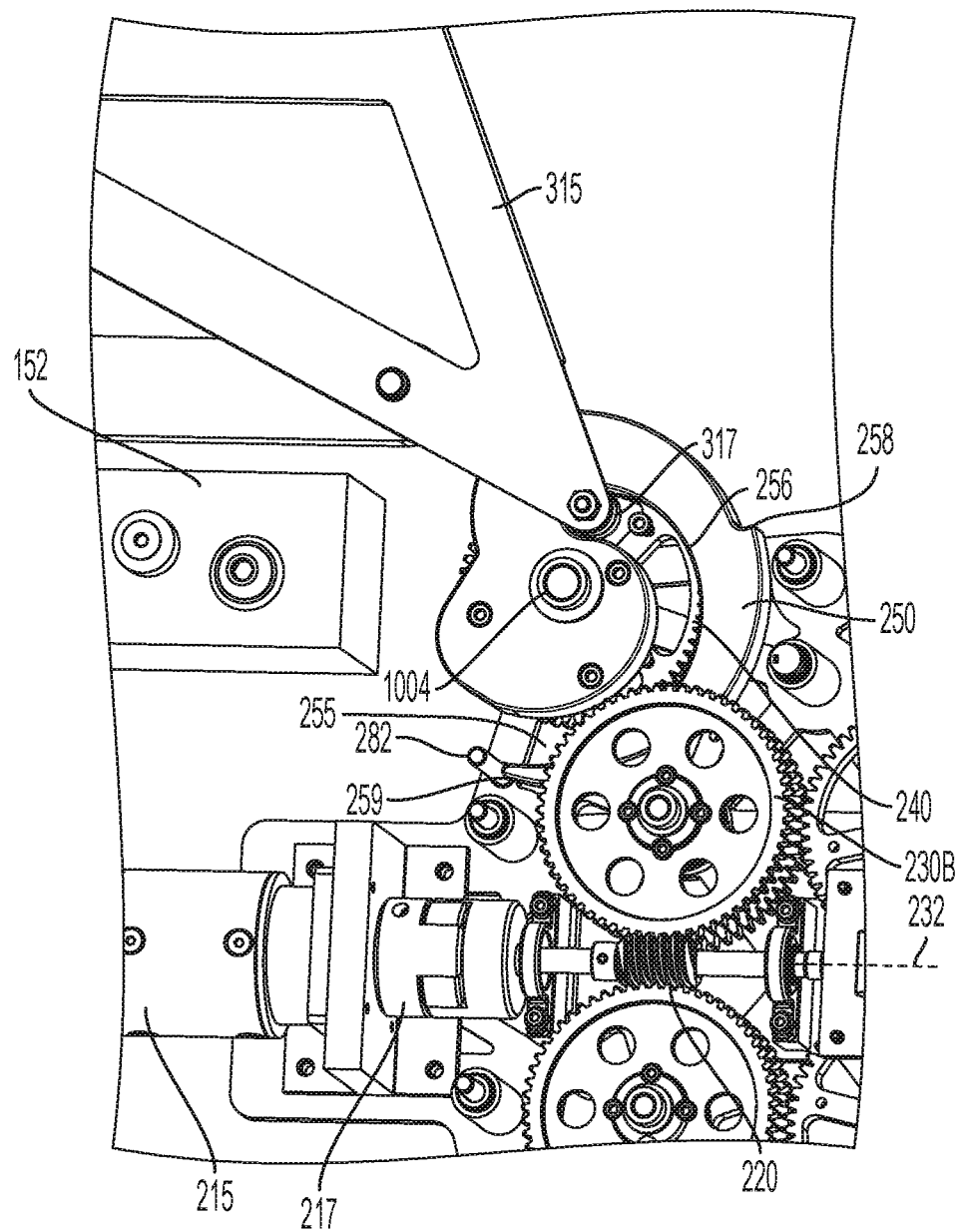
FIG. 21C is a top view of a cam interacting with a follower pin in a third position.

FIG. 21C depicts a follower 317 at the interior terminus 1000 (see, e.g., FIG. 20A) of the groove 255 after the cam 250 has been rotationally displaced approximately 180°. The cam 250 may be considered in a closed state in FIG. 21C. For reference, similar components or features discussed elsewhere are also noted in FIGS. 21A, 21B, and 21C.

With continued reference to FIGS. 21A-C, and as mentioned above with respect to FIGS. 20A and 20B, the cam 250 may include one or more stop surfaces 258, 259. Such stop surfaces 258, 259 may cooperate with a fixed body in the latch assembly 200 and may be included to limit the rotational freedom of the cam 250. In some examples, the rotational movement of the cam 250 may be limited by a projection 282 (see, e.g. FIG. 21A) rigidly attached to one plate 270, 275 of latch assembly 200. The projection 282 may, for example, be a pin which is fixed in place via its attachment to one of the plates 270, 275. A stop surface 258 of the cam 250 may contact the projection 282 when the cam 250 is fully open and ready to receive the follower 317. The interaction of the projection 282 and stop surface 258 may prevent the cam 250 from being rotated open beyond a prescribed point as the projection 282 may present a mechanical interference. A fixed body may also be included to limit the rotational freedom of the cam 250 as the cam 250 is rotated toward a closed state. In some examples, the same projection 282 may also limit how far the cam 250 may rotate as it is displaced toward closed position, as stop 259 has the same radial location as stop 258 with respect to the center point 252. The projection 282 and stop(s) 258, 259 may prevent the cam 250 from rotating past a desired range of rotation.

Figure 22:
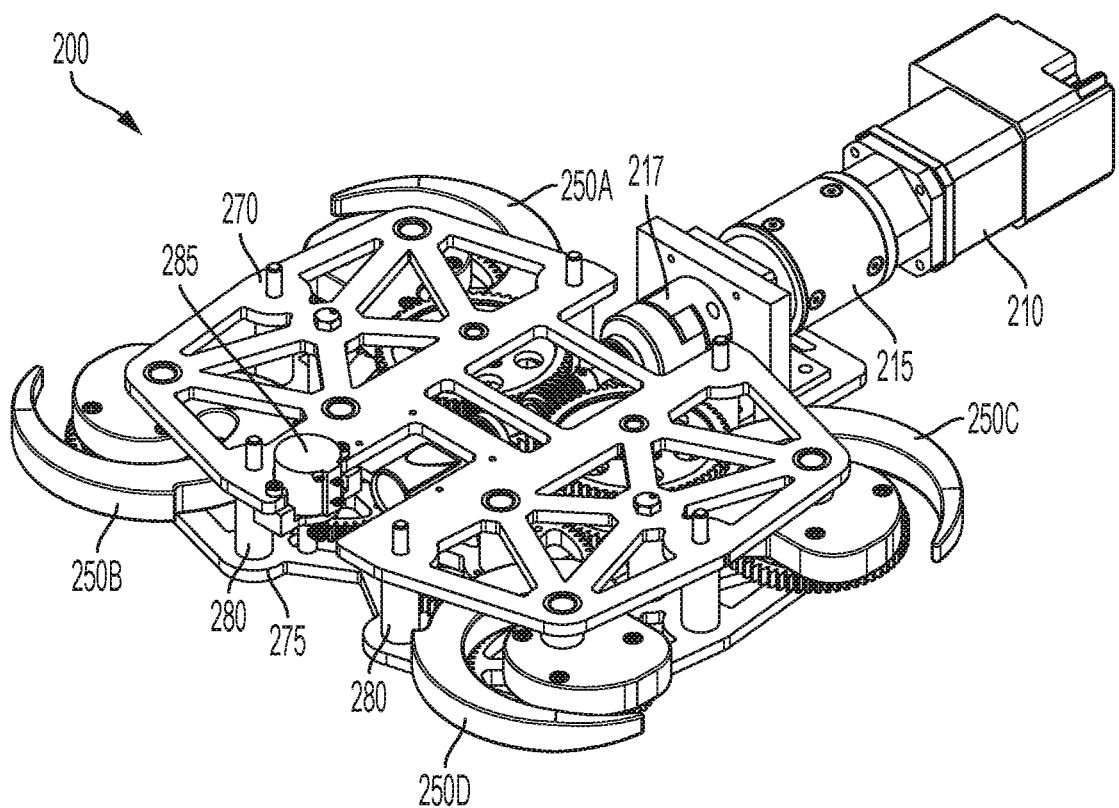
FIG. 22 is a perspective view of a latch apparatus.
Figure 23:
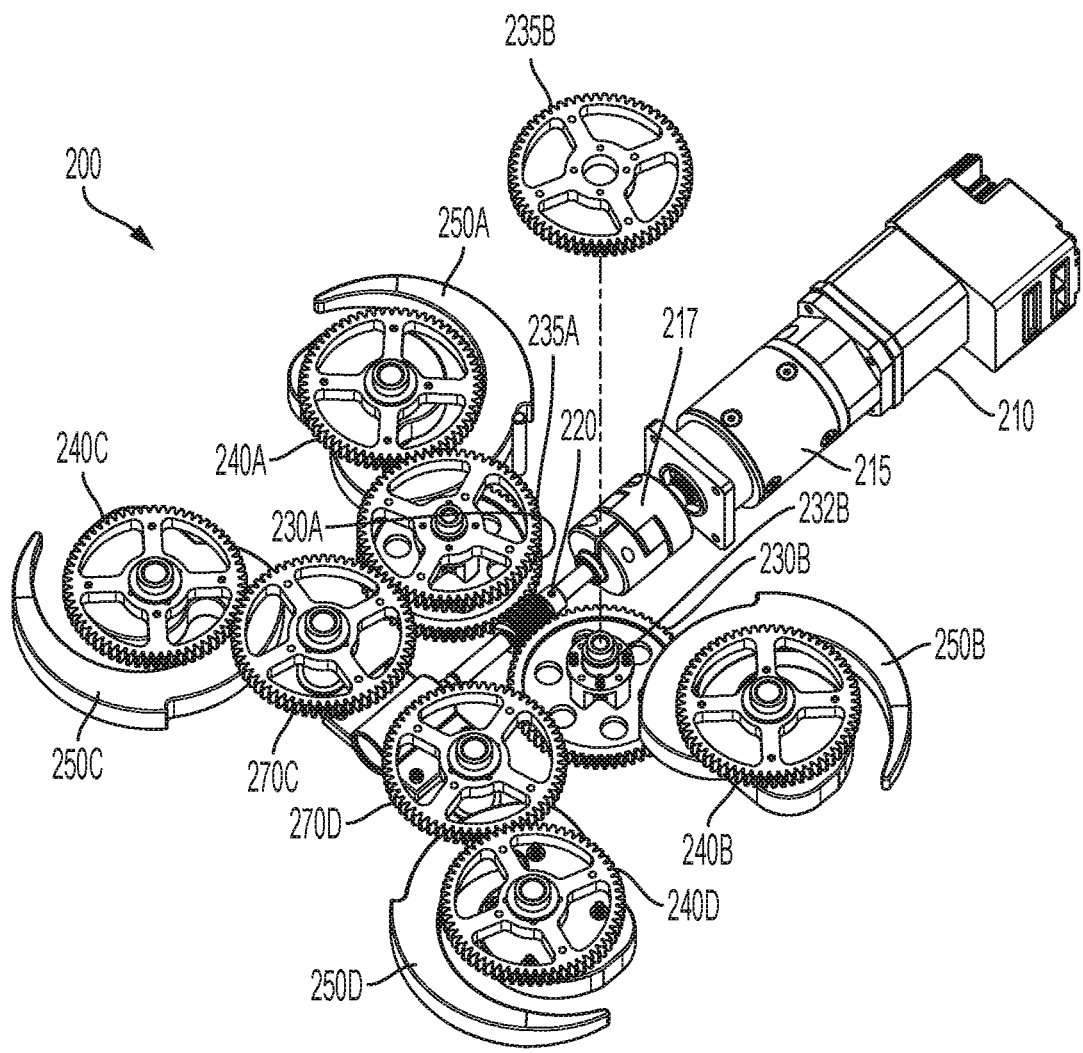
FIG. 23 is a perspective view of a latch apparatus.

Referring now primarily to FIGS. 22 and 23, an exemplary latch assembly 200 including cams 250A-D is shown in isolation. It should be noted that reference numerals suffixed with an alphabetic designation in FIGS. 22 and 23 correspond to a first, second, third, or fourth example of like components within the FIGS. For example, cam 250A may be referred to as a first cam, while cam 250C may be referred to as a third cam. Certain components of the latch assembly 200 are removed in FIG. 23 to illustrate exemplary internal components of a latch assembly 200. An example mechanical coupling arrangement between an example electric latch motor 210 and a plurality of cams 250A-D is also depicted in FIG. 23.

As shown best in FIG. 22, the components of the latch assembly 200 (e.g. gears, etc., discussed below) may be mounted to and retained between a first plate 270 and a second plate 275. The first and second plate 270, 275 may be held apart with spacers 280. The spacers 280 may be selected to ensure the first and second plate 270, 275 are disposed an appropriate distance from one another to allow for the components of the latch assembly 200 to be mounted therebetween. As described elsewhere herein, example latch apparatuses 200 such as that shown in FIG. 22 may be coupled to the frame 115 of the cargo container 110.

Still referring to FIGS. 22-23, the rotational position of a cam 250 may be controlled based on positional data from a rotation sensor 285 (see, e.g., FIG. 22). Any suitable rotational sensor 285 may be used. The rotational sensor may be a potentiometer, an optical encoder, a hall sensor or other sensor technology that reports a signal related to the rotational state of the sensor 285. In certain examples, a rotational sensor 285 may be mechanically coupled to a cam 250 via one or more cylindrical gears.

Still referring to FIGS. 22-23, a latch assembly 200 may include a worm drive. The worm drive may include a worm 220 and worm gear(s) 230A, 230B. The worm 220 may be rotated about its longitudinal axis to drive worm gear(s) 230A, 230B. The example worm drive may provide a very large gear reduction ranging from 10:1 to more than 100:1. In one example, the worm drive may have a gear reduction of approximately 30:1. Additionally, the example worm drive may have an initial axis of rotation about the longitudinal axis of the worm 220. The axis of rotation downstream of the worm 220 may be changed to an axis of rotation which is perpendicular to the initial axis of rotation.

Furthermore, the worm drive may be "self-locking" in that worm 220 may not be back-driven by worm gear(s) 230A, 230B. The self-locking feature may be realized because the coefficient of friction between the worm 220 and worm gear(s) 230A, 230B may be greater than the tangent of the worm's lead angle. The coefficient of friction may depend on the material of the worm 220 and worm gear(s) 230A and/or 230B, as well as the lubrication and condition of the worm 220 and worm gear(s) 230A, 230B surfaces.

While some embodiments may utilize a worm drive (such as those exemplarily discussed herein) in other embodiments, the worm 220 can be replaced by a pinion gear, and each worm gear (e.g. 230A, 230B) can be replaced by a face gear. In such an embodiment, the two face gears can be arranged opposite each other about the pinion gear. These alternative gears can be similarly driven by one or more components discussed herein.

As mention elsewhere herein, a latch apparatus 200 may also include an electric motor 210 to directly or indirectly drive the worm 220 and ultimately cause rotation of one or more cam 250A-D. A controller of the autonomous delivery vehicle 100 may direct electric power to the electric latch motor 210. In an example, the powered electric latch motor 210 drives a reduction gear set 215 (e.g. 5:1 planetary gear set) that gears down the motor speed and produces higher torque. The electric latch motor 210 may turn the worm 220 via such a gear reduction set 215 and/or a coupler 217. A coupler 217 may be included in some example embodiments to accommodate for misalignment between the worm 220 and the electric motor 210. In other embodiments, an electric latch motor 210 can directly drive the worm 220.

A controller may selectively power the electric latch motor 210 to achieve a desired rotational position of the cam 250 based on an output of a motor rotation sensor attached to the latch motor 210. In another example, the position of cam 250 can be based on the output of a rotational sensor 285 in the electric motor 210. In an embodiment employing one or more stops 258, 259, the limited range of rotation promulgated by the stops 258, 259 may alleviate rotational accuracy considerations related to the latch motor 210. This may also or instead prevent a positional sensor 285 from being driven past its range of motion.

Still referring to FIGS. 22-23, the example latch assembly 200 includes cam gears 240A-D. Each cam gear 240A may be rigidly attached to a respective cam 250A-D. Thus, rotation of the cam gear 240A-D may engender rotation of the cam 250A-D to which it is coupled. Cam gears 240A-D may each be driven by a train of one or more gears coupled directly or indirectly to a respective worm gear 230A, B. In some alternative embodiments, cam gears 240A-D could be directly driven by one or more worm 220.

As described above, rotation may be transferred from the worm 220 to worm gears 230A, B. In some examples, intermediary gears 235A may be rigidly attached to worm gears 230A, B such that the intermediary gears 235A and worm gears 230A, B rotate about the same axis. Rotation of a worm gear 230A, B may induce rotation of the intermediary gear 235A coupled thereto. It should be noted that an intermediary gear (what would be intermediary gear 235B) is not depicted in FIG. 23 in order to better depict worm gear 230B. Intermediary gear 235B (not shown) may be structurally the same as intermediary gear 235A and may be coupled to worm gear 230B in the same manner that intermediary gear 235A is coupled to worm gear 230A.

Certain cam gears 240A-D may be driven directly by one of intermediary gears 235A, B. Other of the cam gears 240A-D may be driven through one or more additional intermediary gear. In the example embodiment shown cam gear 240C is driven by additionally intermediate gear 270C and cam gear 240 D is driven by additional intermediate gear 270D. The additional intermediate gears 270C, 270D can be driven via their interaction with intermediary gears 235A, 235B. The example intermediate gears 270C, 270D serve to transfer power to cams 250C, 250D. In some embodiments, use of one or more shared intermediate gears 270C, 270D or shared worm 220 can assure that the cams 250C and 250D rotate in a coordinated relationship (e.g. in a mirrored manner) to the rotation of cams 250A, 250B.

A latch assembly 200 may include four cams 250A-D with one cam 250A-D for each of four doors (see, e.g., 300, 302 of FIG. 19) on an exemplary cargo container 110. It is, however, contemplated that the latch assembly 200 can have any number of cams 250A-D. In some exemplary embodiments, a latch assembly 200 may include only one or two cams 250. In a configuration having more than one cam 250, the cams 250 can be positioned on the same side to accommodate an autonomous delivery vehicle 100 with two doors (see, e.g., 300, 302 of FIG. 19) on the same side of the autonomous delivery vehicle 100. Alternatively, the cams 250 may be disposed on opposite sides to accommodate an autonomous delivery vehicle 100 with doors (see, e.g., 300, 302 of FIG. 19) on opposite sides. Similar to the various configurations of latch assemblies 200 including four cams 250 described above, embodiments with only two cams 250 can be configured such that the cams 250 operate simultaneous to one another or independently to one another. For example, an embodiment having two cams 250 that operate simultaneous to one another can be simultaneously driven by a shared gear (e.g. a shared intermediary gear 235).

In some examples, the number of gears in a latch mechanism 200 may be reduced by removing one or more of the intermediary gears 235A, B, 270C, D. Gear 235A may be removed by arranging cam gear 240A to mesh with worm gear 230A. Gear 235B (not shown) may be removed by arranging cam gear 240B to mesh with worm gear 230B. Gear 270C could be removed by arranging cam gear 240C to mesh with cam gear 240A. Gear 270D could be removed by arranging cam gear 240D to mesh with cam gear 240B. Such an arrangements or combinations thereof may require larger cam gears 240A, 240C and/or a larger gear reduction in the worm drive or planetary gear 215 to maintain the same overall gear-reduction between the electric motor 210 and the cams 250A-D.

The example latch assembly 200 provides a large mechanical advantage between the electric motor 210 and any actuated doors (see, e.g. 300, 302 of FIG. 19). In one embodiment, the large mechanical advantage can be greater than 100:1, 400:1 or 800:1. The large mechanical advantage allows an electric motor 210 to apply a significant force on a door (see, e.g. 300, 302 of FIG. 19) and compress a gasket, if present. A gasket may be attached to a door 300, 302, the frame 115, or the body 117. The large mechanical advantage also has the effect of making it very difficult to forcibly open a door 300, 302. The resistance caused by frictional forces between the mesh gears, the rotary elements, and the stationary components, as well as the electromagnetic holding forces in the electric motor 210, are amplified by the mechanical advantage. The force required must overcome the friction of the latch assembly 200 and the holding torque of the motor 210 multiplied by the mechanical advantage. Thus, the large mechanical advantage between the electric motor 210 and the door 300, 302 requires an enormous force to be applied at the door 300, 302 in order to overcome the latch apparatus 200. Such force may be great enough to cause material failure of the door 300, 302 and/or door mechanism before the door 300 can be moved. Therefore, such a large mechanical advantage has the same effect as locking the door 300 and the latch assembly 200 may be referred to as a lock assembly. In addition, as explained elsewhere, the latch apparatus 200 may include a self-locking worm drive that cannot be back-driven by applying force on the doors.

After being latched, the rotation of the cams 250A-D may be reversed to unlatch the doors (see, e.g. 300, 302 of FIG. 19). The doors (see, e.g. 300, 302 of FIG. 19) can be unlatched by rotating the respective cam 250A-D from the position shown in FIG. 21C to the position FIG. 21A where the follower 317 is at the opening of the cam 250A-D and may be positioned at the flat face 254. The follower 317 may contact either the outer surface 256 or the inner surface 257 as the door (see, e.g. 300, 302 of FIG. 19) is transitioned to the unlatched position. Once the follower 317 is positioned at the flat face 254, the door (see, e.g. 300, 302 of FIG. 19) may be opened.

Figure 24:
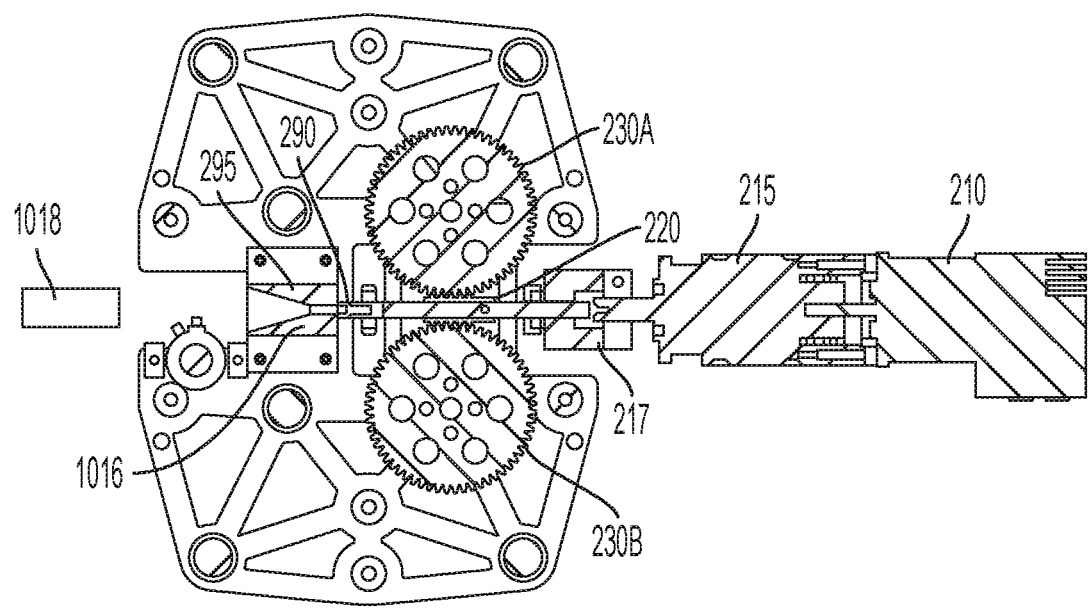
FIG. 24 is a top view of a latch apparatus.

Referring now to FIG. 24, in certain embodiments, the doors (see, e.g. 300, 302 of FIG. 19) may be latched and/or unlatched manually. In some examples, this may be accomplished by driving the worm 220 via a tool receptacle 290. The tool receptacle 290 may be mechanically coupled to the worm 220. The worm 220 may be turned by inserting a manual tool 1018 such as a long allen key, torx driver, Philips/flat head screw-driver or other tool into the tool receptacle 290. A user can turn such a tool 1018 to rotate the worm 220. As explained elsewhere, rotating the worm 220 will rotate the cams 250A-D via one or more gears. This will cause the door(s) 300, 302 to latch or unlatch. A guide 295 may be included adjacent the tool receptacle 290 to guide the tip of the manual tool 1018 into the tool receptacle 290. The guide 295 may be shaped as a conic frustum shaped depression in a guide body 1016. Such a guide 295 may be advantageous in various situations. For example, where the latch assembly 200 is mounted in such a way that the user cannot see the tool receptacle 290 the guide 295 may aid a user in blindly mating the tool 1018 into the tool receptacle 290. A guide 295 may also be advantageous where a long tool 1018 is used to reach the tool receptacle 290. It may be preferable that the tool 1018 be a non-standard tool or that the tool receptacle 290 and tool 1018 are keyed. This may help in ensuring that only a controlled population of users may have access to a tool 1018.

Figure 25:
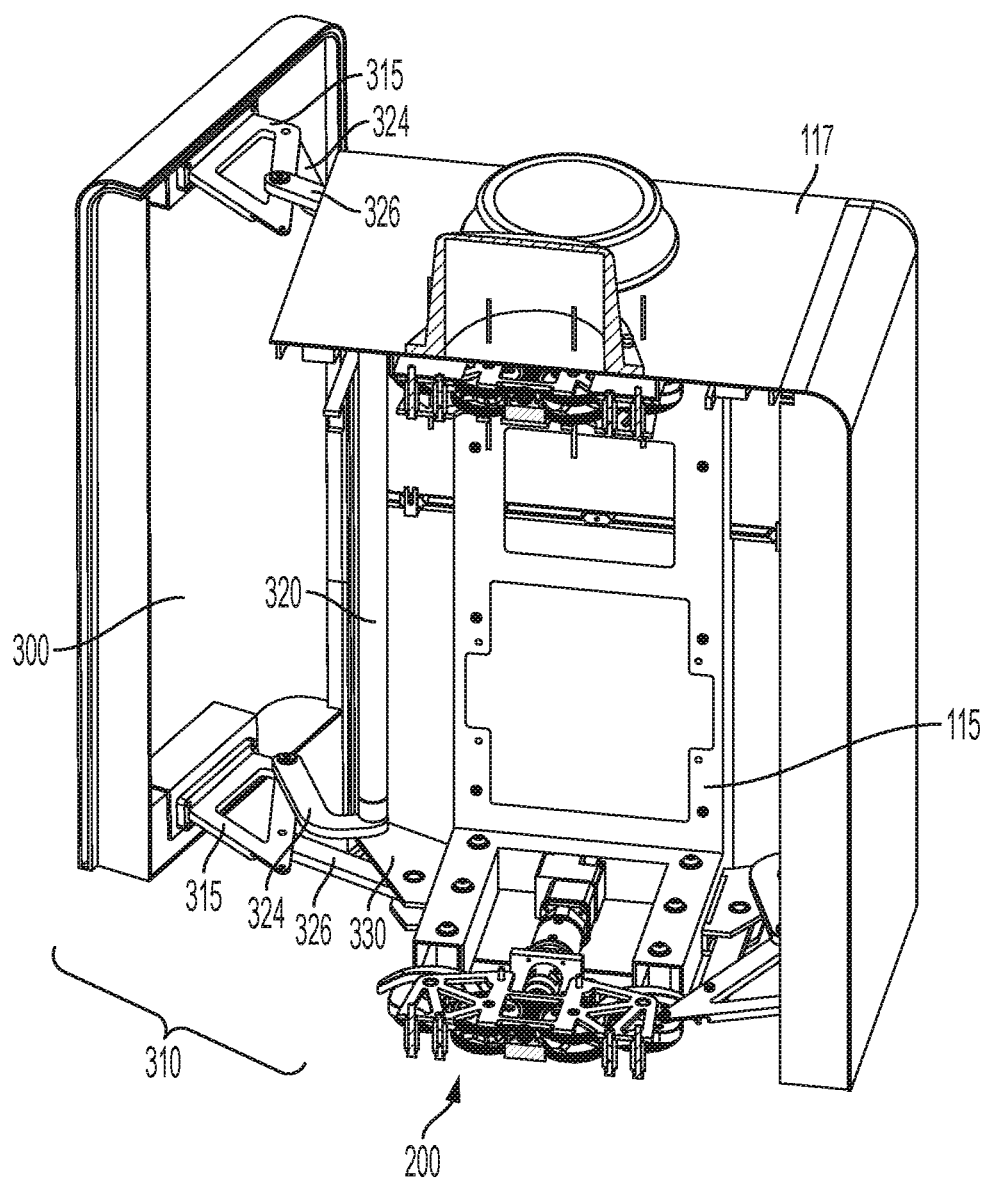
FIG. 25 is a perspective view of a cargo container including a four-bar linkage.
Figure 26:
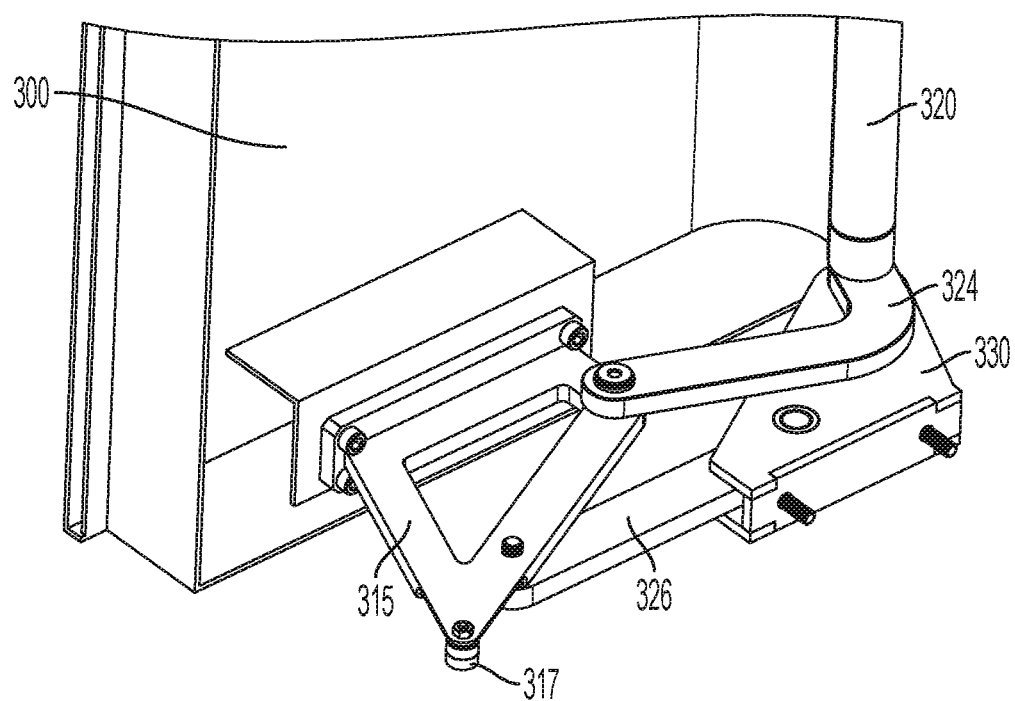
FIG. 26 is a perspective view of a four-bar linkage.
Figure 27:
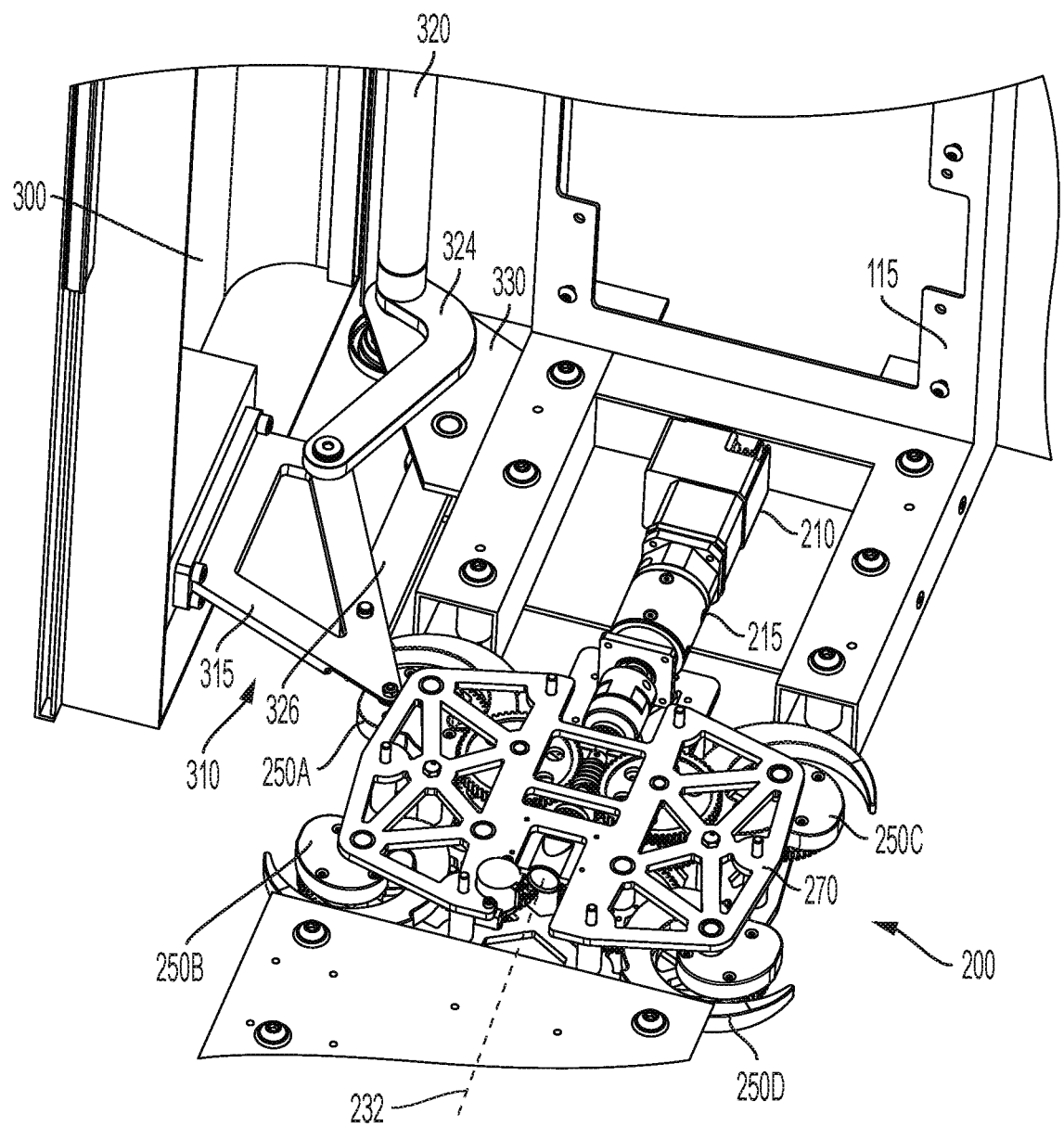
FIG. 27 is a perspective view of a four-bar linkage interacting with a latch apparatus.

Referring now to FIGS. 25-27, each door 300, 302 of the autonomous delivery vehicle 100 may be attached to the cargo container 110 via a linkage which constrains the door 300, 302 to open in a prescribed pathway. The prescribed pathway may be chosen to minimize the amount of space needed for the door to pass from a closed latched state to a fully open state. For example, the prescribed pathway may minimize the amount of open space in front of and beside the cargo container 110 that is needed to actuate the door 300, 302. In certain embodiments, a four bar linkage 310 may be used to constrain the door 300, 302 to open along a prescribed pathway. An example embodiment of a four-bar linkage 310 is shown in relation to one door 300, the frame 115, and the latch assembly 200 in FIGS. 25-27. Further description of additional example linkages is provided elsewhere in the specification (see, e.g. FIGS. 3-18). Any linkage disclosed herein may be used in place of that shown.

FIG. 25 depicts a cargo container 110 with a door 300 of the cargo container 110 partially opened. Door 302 (see, e.g. FIG. 19) and the front portion 132 (see, e.g., FIG. 2) have been removed for sake of illustration. The example four-bar linkage 310 comprises a first arm 324, a linkage frame 315, a second arm 326, and a linkage bracket 330. The linkage bracket 330 may be fixedly mounted to the frame 115. The linkage frame 315 may be fixedly mounted to the door 300.

FIG. 26 depicts a view of a portion of a door 300 and the example four-bar linkage 310. In some embodiments, and as shown in FIG. 26, the follower 317 can be disposed in or attached to a four-bar linkage 310. The linkage frame 315 may, for instance, include a follower 317 extending therefrom, thus the follower 317 may be indirectly attached to the door 300. As discussed above elsewhere, the follower 317 may alternatively be directly attached to the door 300. The follower 317 may be a pin type member as shown. The first arm 324 and the second arm 326 may be rotatably connected to the linkage frame 315 and the linkage bracket 330. The geometries of each of the shown first arm 324, linkage frame 315, second arm 326, and linkage bracket 330 can together facilitate generally sideways movement of the door 300 that requires minimal front space. In an embodiment, the size, relationship, and geometries of these components are shown to scale in at least FIG. 25 and/or FIG. 26. The size, relationship, and geometries of these components may of course differ in alternative embodiments.

FIG. 27 illustrates the operation of a four-bar linkage 310 during the actuation of a door 300. Rotation of the first arm 324 may effectively open and close the door 300. The first arm 324 may be coupled to and rotated by an electric door motor to control the opening and closing of the door 300. In an example with more than one door 300, each door 300 can be controlled independently by a separate electric door motor. Alternatively, a single door motor can control rotating of a plurality (e.g. all) of first arms 324 in linkages 310 for different respective doors 300. In operation, a door motor may rotate the proximal end (proximal and distal defined in relationship to the linkage bracket 330) of the first arm 324 about a first axis extending through the linkage bracket 330. The first axis may correspond with the longitudinal axis of the axel 320. The distal end of the first arm 324 may be rotatably coupled to linkage frame 315 such that rotation of first arm 324 causes a point on the linkage frame 315 to move in an angular manner about the first axis. The second arm 326 may be rotatably connected to the linkage frame 315 and to the linkage bracket 330. With reference now also to FIGS. 21A-C, movement of a door 300 toward the midline 232 occurs as the second arm 326 closes the gap between itself and frame member 152.

Referring to FIG. 27, the electric door motor (see, e.g., motor assembly 2310 of FIG. 14) may close the door 300 by rotating the first arm 324 until the follower 317 contacts the associated cam 250A-D. In one example, the follower 317 can be a fixed cylinder mounted to the linkage frame 315, a hardened steel cylinder, a rotating cylinder, wheel, or bearing. A rotating cylindrical follower 317 can provide a lower friction and more consistent interaction with its associated cam 250A-D.

The arrangement of the example four-bar linkage 310 controls the motion and opening path of the door 300 with respect to the frame 115 such that the door 300 compresses a first door gasket (if present) significantly uniformly against the frame 115 or a portion of the body 117 when the door 300 is closed. The first door gasket may be included on the door 300. Alternatively, this gasket may be included on a portion of the frame 115 or body 117 to against which the door 300 is to be closed. In some examples, a four-bar linkage 310 can constrain the movement of a door 300 to compress a second door gasket (if present) between door 300 and another door (e.g. door 302 of FIG. 19) at the same time that the first door gasket is compressed against the frame 115 or body 117. Alternatively, the four-bar linkage 310 may compress the door gaskets in sequence. For example, the second door gasket may be compressed against another door 302 and subsequently the first door gasket may be compressed against the frame 115.

In some embodiments, a latch assembly 200 may interact with the four-bar linkage 310 to close and secure the doors 300, 302 against the frame 115 or body 117. The latch assembly 200 may act to pull the doors 300, 302 toward the centerline 232 of the frame 115 or body 117 in order a compress a door gasket or weather seal between the edge of the body 117 and the doors 300, 302.

Through cooperated operation of the door motor, electric latch motor 210, follower 317, and cam 250A-D, the door 300 may be opened, closed, sealed tightly, locked, and/or unlocked. The positioning and latching of the one or more door (e.g. 300, 302) may be orchestrated by a controller that cooperatively directs electric power to one or more electric door motors and latch electric motor 210. During opening of the door, the controller may first unlatch the door 300 by powering the latch motor 210 to rotate one or more components of latch assembly 200 (e.g. a cam 250A-D). Second, the controller may power the door motor to actuate one or more components of the four-bar linkage 310 (e.g. first arm 324) to open the door 300. To close the door, the controller may first power the door motor to rotate one or more components of the four-bar linkage 310 (e.g. first arm 324) to close the door. Thereafter, the controller may power the latch motor 210 to latch and lock the door 300. During the latching and locking process, the door 300 can be pulled (substantially translationally displaced) against the cargo container body 117.

Embodiments that utilize a controller to open/close and/or latch/unlatch may be opened remotely, in response to user inputs, automatically, or manually to allow users to place or remove items in the cargo container 110. A connectivity agent (e.g. cellular modem) may be included to facilitate remote access. In some examples, an autonomous delivery vehicle 100 may latch one pair of doors 300, 302 at a time. One set of the cams 250A/250C or 250B/250D may be disabled by disengaging a clutch between gear 270A (see, e.g., FIG. 23) and intermediary gear 235A or by disengaging a clutch between a worm gear 230A, B and an intermediary gear 235A, B. An example clutch 232B is depicted in association with worm gear 230B in FIG. 23. The clutch 232B may be actuated electronically or mechanically with solenoid. In one example, clutch 232B may be an electric motor. The solenoid or electric motor may be commanded by a controller that responds to a remote signal, an automated command, or a user input. Similarly, a clutch can be utilized to open or close only one door 300, 302 or one pair of doors 330, 302 at a time.

Figure 28:
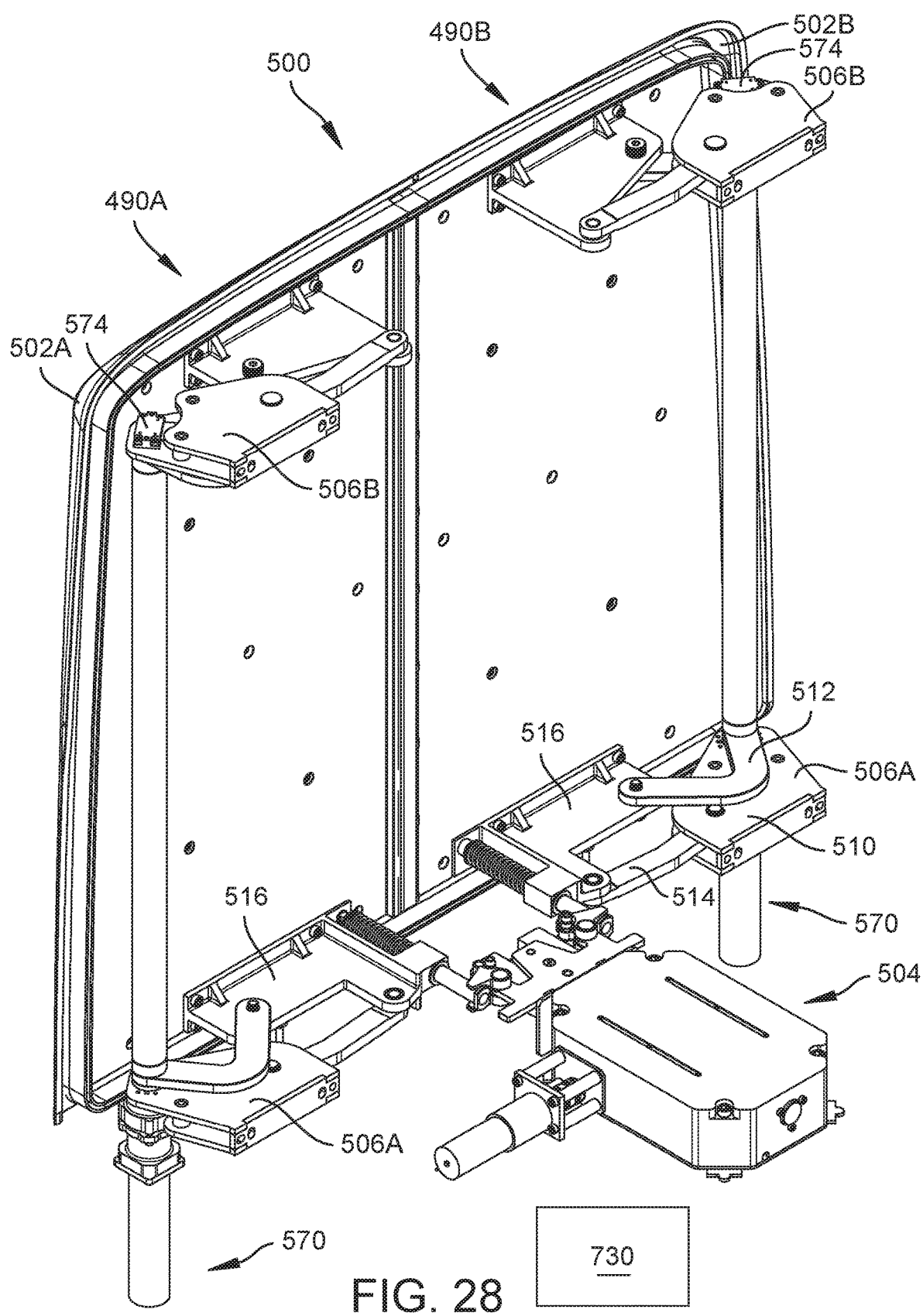
FIG. 28 depicts a perspective view of an example enclosure assembly.

Referring now to FIG. 28, a perspective view of a closure assembly 500 is depicted. The example closure assembly 500 includes a retention assembly 504 and a set of closure members which are shown as door assemblies 490A, B. Each of the door assemblies includes a door 502A, B. The closure assembly 500 may be included in a cargo container 110 (see, e.g. FIG. 2) which may be included as part of an autonomous delivery vehicle 100 (see, e.g., FIG. 2). The doors 502A, B may be coupled to the cargo container 110. In various embodiments, each of the doors 502A, B may be coupled to the cargo container 110 via one or more linkage. Any of the linkages 1100 (see, e.g. FIG. 4), 310 (see, e.g., FIG. 26) described above may be used. Alternatively, the linkages 506A, B shown in FIG. 28 may be used. These linkages 506A, B may constrain the doors 502A, B such that the doors 502A, B follow a prescribed displacement path when they are actuated from a closed position (shown in FIG. 28) to an open position. This displacement path may minimize clearance needed in front of and beside the doors 502A, B. The displacement path may also be defined so as to prohibit the doors 502A, B from covering or obscuring certain details of a cargo container 110 in which they are included. For example, the displacement paths may be constrained such that screens, indicia, logos, branding, etc. is not blocked by the doors 502A, B once the doors 502A, B have been transitioned to an open state.

Figure 29:
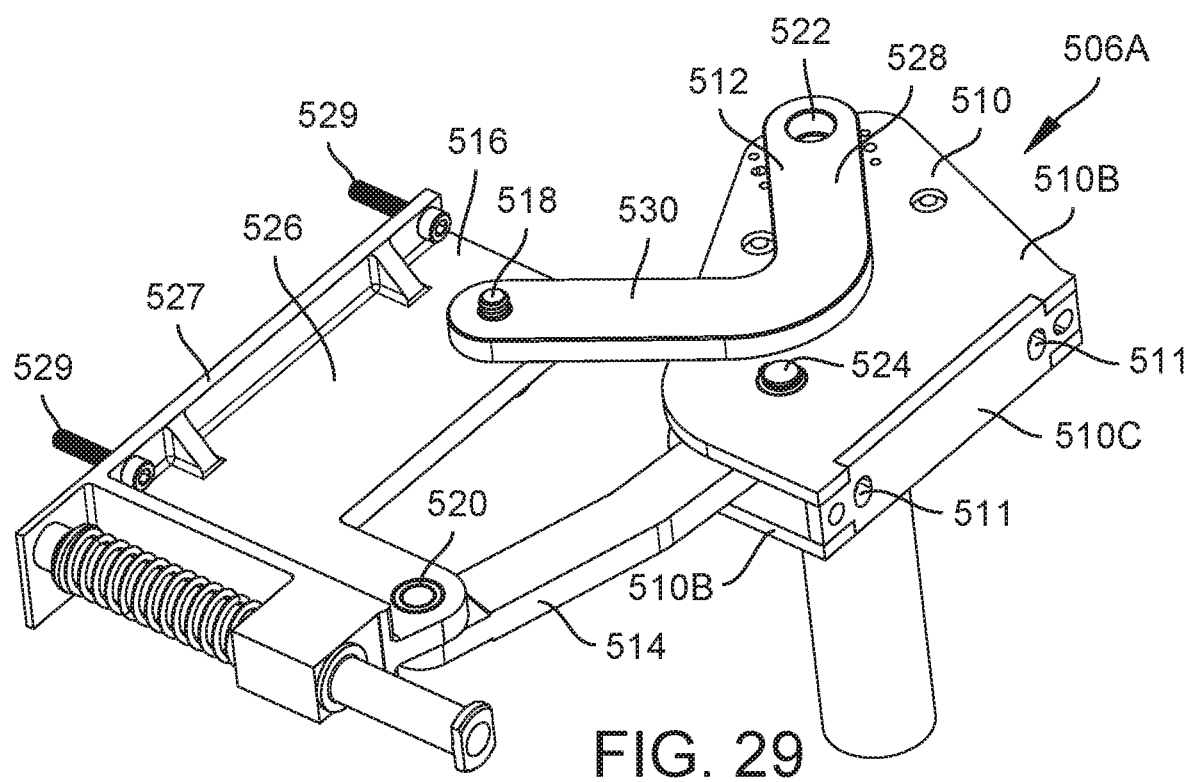
FIG. 29 depicts a perspective view of an example linkage.
Figure 30:
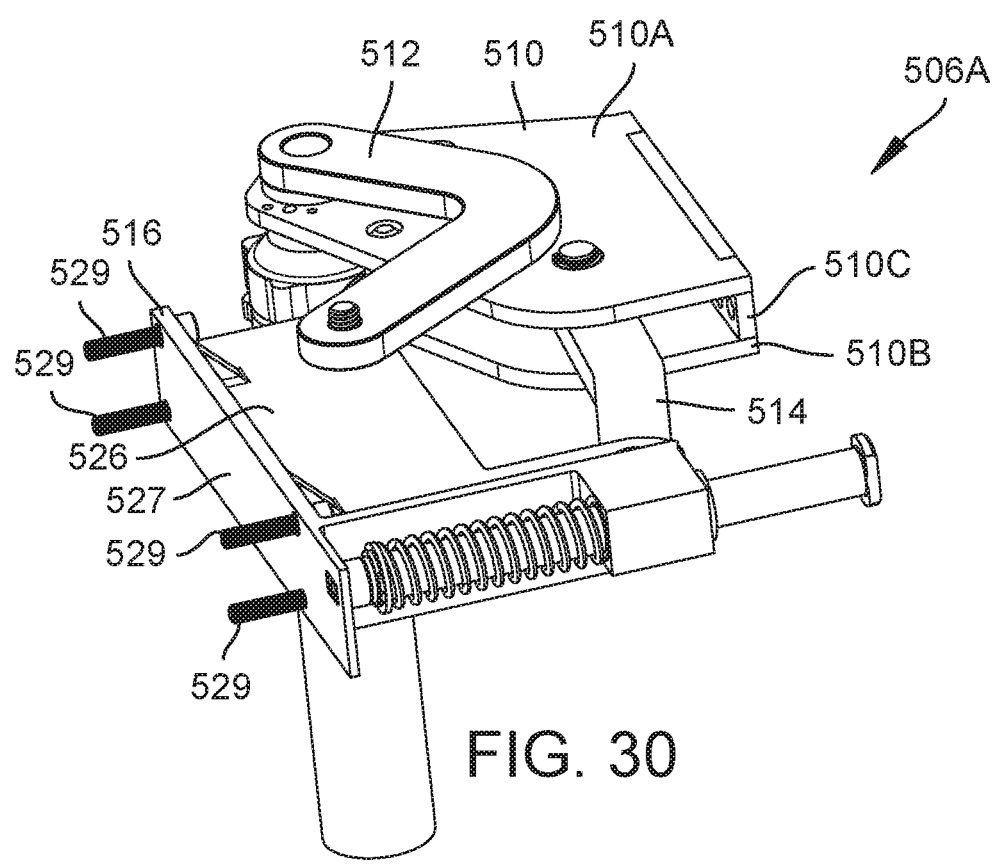
FIG. 30 depicts a perspective view of an example linkage.

Referring now also to FIGS. 29-30, an example of a first linkage 506A is shown. This linkage 506A may be referred to as a bottom linkage. As shown, in FIG. 28, a bottom linkage 506A may be coupled to each door 502A, B. FIGS. 29-30 depict the linkage 506A coupled to the right most door 502B. As the bottom linkages 506A are substantially mirror images of one another, description of only one bottom linkage 506A is provided.

The example linkage apparatus 506A may include four linkage members 510, 512, 514, 516 coupled together at four pivot points 518, 520, 522, 524. These four linkage members 510, 512, 514, 516 may be coupled together at pivot points 518, 520, 522, 524 via any suitable fastener. For example, the linkage members 510, 512, 514, 516 may be coupled via bolts, pins, bushings, and other means known in the field. Linkage member 510 may be fixed relative to the cargo container 110. Linkage member 516 may be fixed relative to the door 502B. The remaining linkage members 512, 514 may be rotating linkage members. In the embodiment depicted in FIGS. 29-30, these four linkage members 510, 512, 514, 516 may be referred to as: container linkage member 510, first rotating linkage member 512, second rotating linkage member 514, and door linkage member 516. Though the door linkage member 516 is described as coupled to a door 502B, any closure member (e.g. panel, cap, cover) may alternatively be used.

Still referring to FIGS. 29-30, the first rotating linkage member 512 may be coupled to the container linkage member 510 via pivot point 522 and coupled to the door linkage member 516 via pivot point 518. Similarly, the second rotating linkage member 514 may be coupled to the container linkage member 510 via pivot point 514 and coupled to the door linkage member 516 via pivot point 520. The exemplary rotating linkage members 512, 514, are shown each disposed on a separate parallel plane.

The door linkage member 516 may include a main portion 526 which may extend in a plane parallel to and between the planes of rotating linkage members 512, and 514. The main portion 526 may be shaped like the Latin character "L" with pivot points 518, 520 being located near the terminal ends of each arm of the "L". The door linkage member 516 may further include a flange 527 which may be included at an edge of the door linkage member 516 most proximal to the associated door 502A, B. The flange 527 may provide extra material through which fasteners 529 may be inserted to fix the door linkage member 516 to the door 502A, B. In other embodiments, the door linkage member 516 may be coupled to the door 502A, B in any other suitable manner. For example, the door linkage member 516 may be welded to the door 502A, B.

In the example embodiment, container linkage member 510 is divided into a plurality of sub-members 510A-C. Sub-members 510A, 510B are disposed on opposing sides of rotating linkage member 514 and extend in planes parallel to that of rotating linkage member 514. Thus, the end of rotating linkage member 514 coupled to the container linkage member 510 at pivot point 524 may be sandwiched between the sub-members 510A, B of the container linkage member 510. The main portion 526 of door linkage member 516 may be substantially coplanar with sub-member 510A. Sub-member 510C of the container linkage member 510 may include one or more orifice 511 therethrough. Fasteners may be inserted through these orifices 511 to fix the container linkage member 510 to a portion of the cargo container 110 such as the frame 115 (see, e.g. FIG. 19). In other embodiments, the container linkage member 510 may be coupled to the cargo container 110 in any other suitable manner. For example, the container linkage member 510 may be welded to the door 502A, B to a portion of the cargo container 110.

Figure 31:
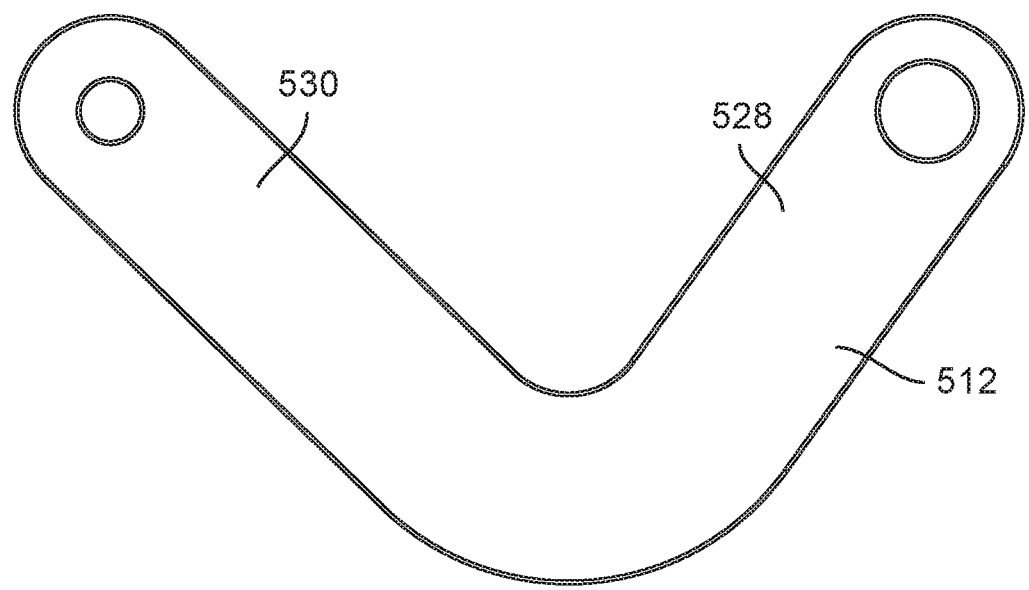
FIG. 31 depicts a plan view of an example linkage member.

Referring now to FIG. 31, a top plan view of one embodiment of a first rotating linkage member 512 is depicted. In this embodiment, the first rotating linkage member 512 may have a bent profile. The first rotating linkage member 512 may have a first portion 528 and a second portion 530. The two portions 528 and 530 may be arranged in relationship to one another so as to form an acute angle. In some embodiments, the acute angle may be approximately 80°. In the example embodiment, the first and second portions 528, 530 are sized differently with the first portion 528 being shorter than the second portion 530. As best shown in FIGS. 29-30, the first portion 528 may be coupled to the container linkage member 510 at pivot point 522, while second portion 530 may be coupled to the door linkage member 516 at pivot point 518.

Figure 32:
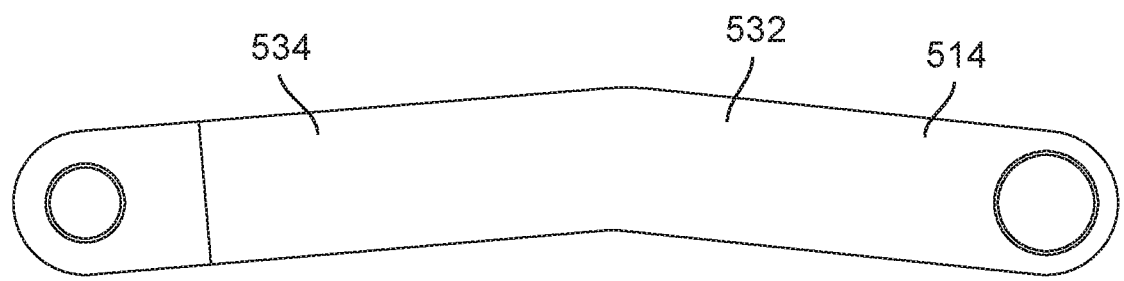
FIG. 32 depicts a plan view of an example linkage member.
Figure 33:
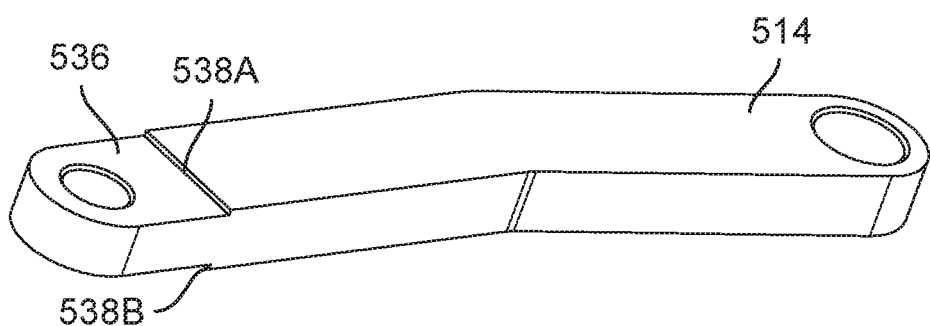
FIG. 33 depicts a perspective view of an example linkage member.

Referring now to FIGS. 32-33, a top plan view (FIG. 32) and a perspective view (FIG. 33) of one embodiment of a second rotating linkage member 514 are depicted. In this embodiment, the second rotating linkage member 514 may have a bent profile. For example, the second rotating linkage member 514 may have a first portion 532 and a second portion 534. The two portions 532, 534 may be arranged in relationship to one another such as to form an obtuse angle. The angle may be about double the angle between the first and second portion 528, 530 of the first rotating linkage member 512 (see FIG. 31). In some examples the angle between the first and second portion 532, 524 of the second rotating linkage 514 member may be approximately 170°. In the example, the first portion 532 and second portion 534 are sized differently. Specifically, the first portion 532 is smaller than the second portion 534. In certain examples, the thickness of the first and/or second portion 532, 534 may change over the extent of that portion 532, 534. This thickness change may be gradual and continuous or may be stepwise. As shown, the thickness of the end region 536 of the second portion 534 is thinner than the remainder of the second portion 534. In the example embodiment, the thickness change is stepwise and the second portion includes a step 538A, B on opposing faces of the second portion 534. As best shown in FIGS. 29-30, the first portion 532 may be coupled to the container linkage member 510 at pivot point 524, while second portion 534 may be coupled to the door linkage member 516 at pivot point 520. The steps 538A, B may be positioned to ensure that the rotating linkage member 514 has sufficient clearance around the door linkage member 516 to be displaced through the full desired rotational range of the rotating linkage member 514.

Figure 34:
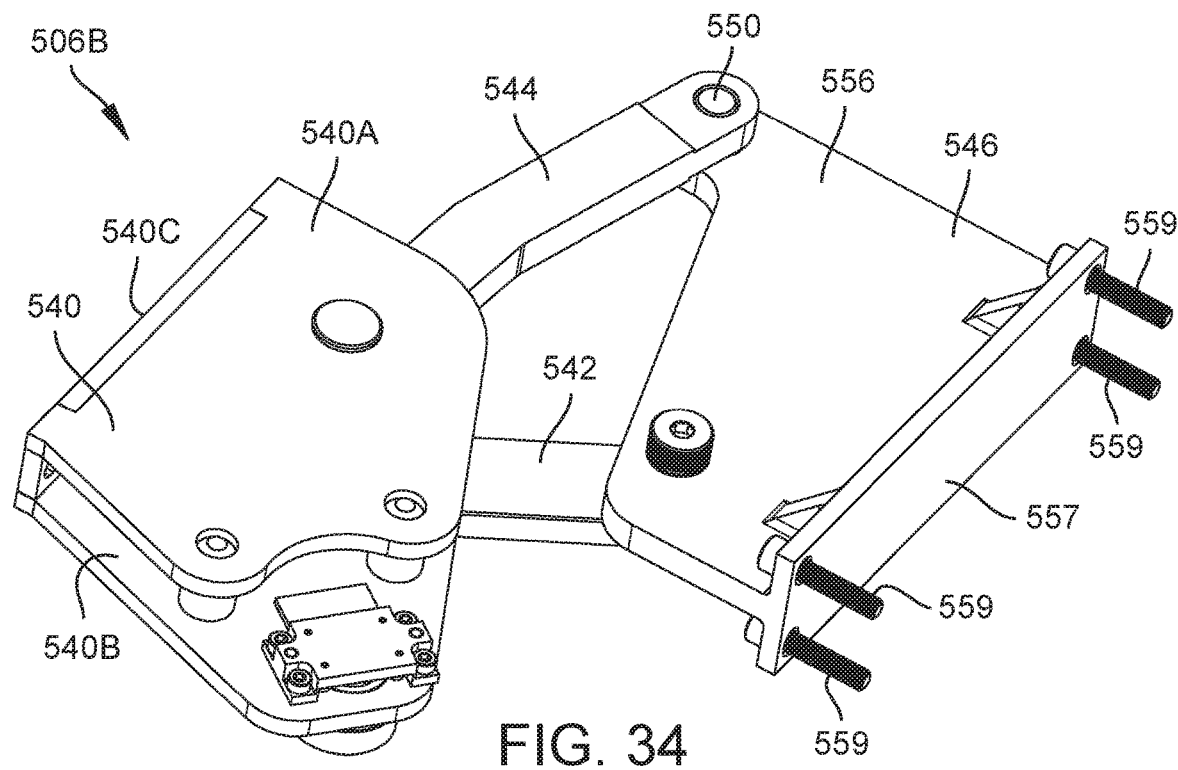
FIG. 34 depicts a perspective view of an example linkage.
Figure 35:
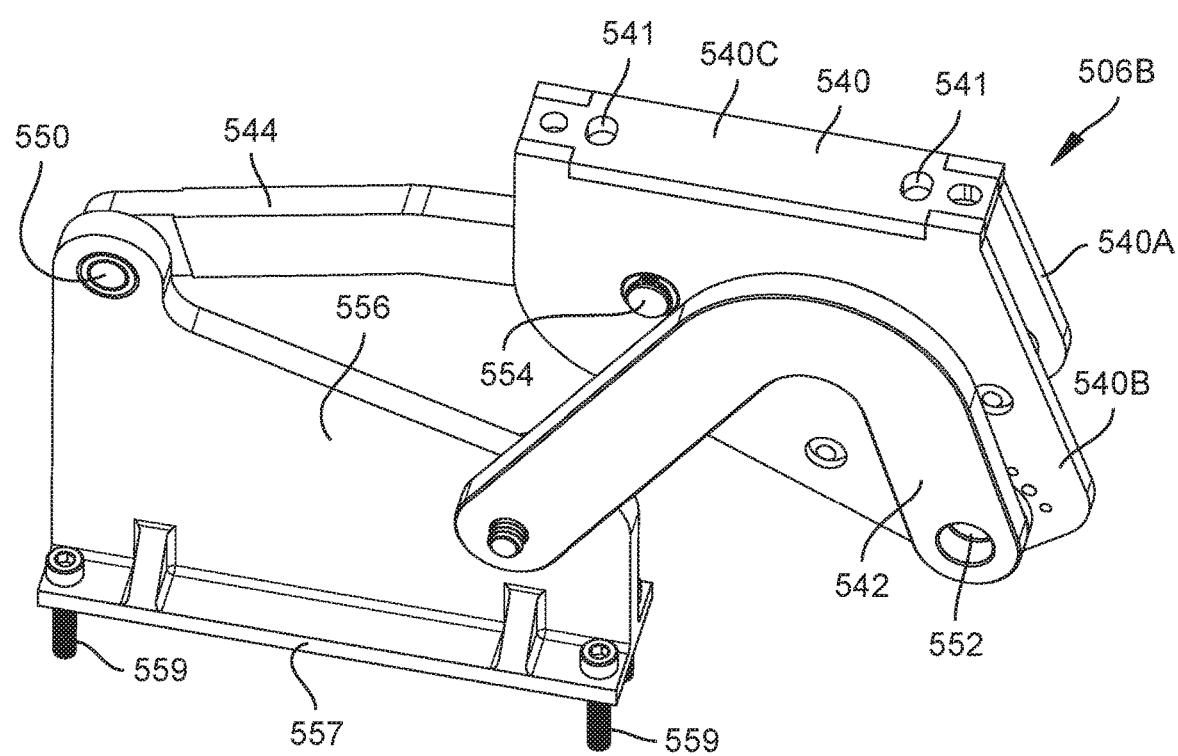
FIG. 35 depicts a perspective view of an example linkage.

Referring now to FIGS. 34-35, an example of a second linkage 506B is shown in two perspective views. This linkage 506B may be referred to as a top linkage. As shown, in FIG. 28, a top linkage 506B may be coupled to each door 502A, B. FIGS. 34-35 depict the linkage 506B coupled to the right most door 502B. As the top linkages 506B are substantially mirror images of one another, description of only one bottom linkage 506B is provided.

The example linkage apparatus 506B may include four linkage members 540, 542, 544, 546 coupled together at four pivot points 548, 550, 552, 554. These four linkage members 540, 542, 544, 546 may be coupled together at pivot points 548, 550, 552, 554 via any suitable fastener. For example, the linkage members 540, 552, 554, 556 may be coupled via bolts, pins, bushings, and other means known in the field. Linkage member 540 may be fixed relative to the cargo container 110 (see, e.g. FIG. 2). Linkage member 546 may be fixed relative to the door 502B. The remaining linkage members 542, 544 may be rotating linkage members. In the embodiment depicted in FIGS. 29-30, these four linkage members 540, 542, 544, 546 may be referred to as: container linkage member 540, first rotating linkage member 542, second rotating linkage member 544, and door linkage member 546. Though the door linkage member 546 is described as coupled to a door 502B, any closure member (e.g. panel, cap, cover) may alternatively be used.

Still referring to FIGS. 34-35, the first rotating linkage member 542 may be coupled to the container linkage member 540 via pivot point 552 and coupled to the door linkage member 546 via pivot point 548. Similarly, the second rotating linkage member 544 may be coupled to the container linkage member 540 via pivot point 554 and coupled to the door linkage member 546 via pivot point 550. The exemplary rotating linkage members 542, 544, are shown each disposed on a separate parallel plane.

The door linkage member 546 may include a main portion 556 which may extend in a plane parallel to and between the planes of rotating linkage members 542, and 544. The door linkage member 546 may further include a flange 557 which may be included at an edge of the door linkage member 546 most proximal to the associated door 502A, B. The flange 557 may provide extra material through which fasteners 559 may be inserted to fix the door linkage member 546 to the door 502A, B. Welding or another manner of attaching the door linkage member 546 to the door 502A, B may be used in alternative embodiments.

In the example embodiment, container linkage member 540 is divided into a plurality of sub-members 540A-C. Sub-members 540A, 540B are disposed on opposing sides of rotating linkage member 544 and extend in planes parallel to that of rotating linkage member 544. Thus, the end of rotating linkage member 544 coupled to the container linkage member 540 at pivot point 554 may be sandwiched between the sub-members 540A, B of the container linkage member 540. The main portion of door linkage member 546 may be substantially coplanar with sub-member 540B. Sub-member 540C of the container linkage member 540 may include one or more orifice 541 therethrough. Fasteners may be inserted through these orifices 541 to fix the container linkage member 540 to a portion of the cargo container 110 such as the frame 115 (see, e.g. FIG. 19). Welding or another manner of attaching the container linkage member 540 to the cargo container 110 may be used in alternative embodiments.

Figure 36:
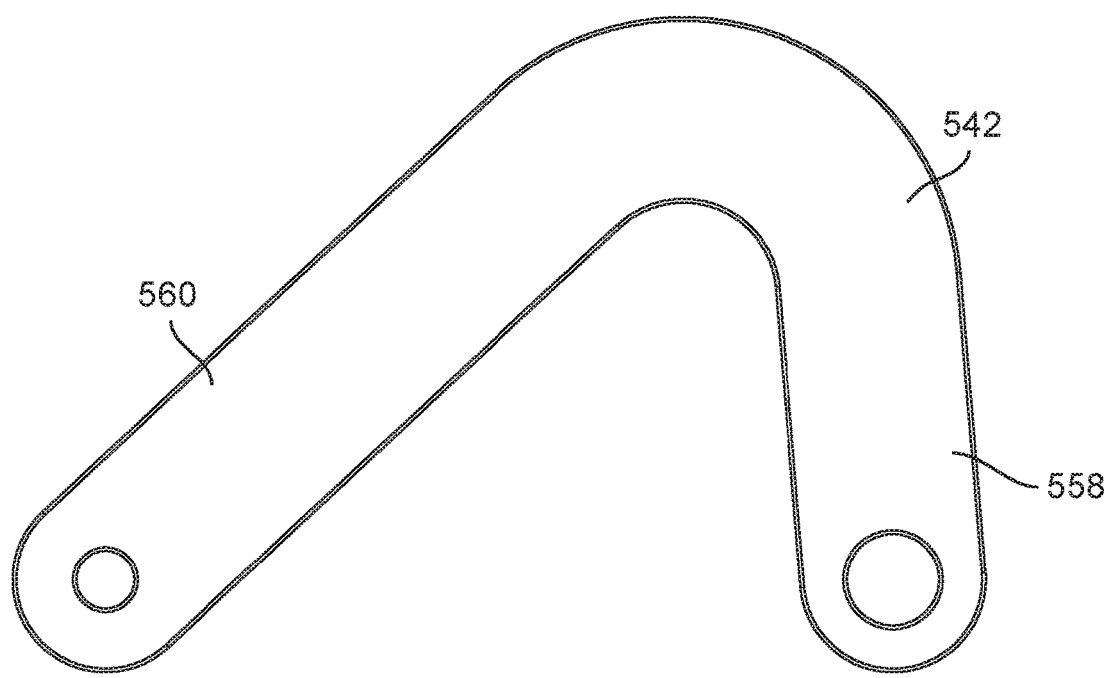
FIG. 36 depicts a plan view of an example linkage.

Referring now to FIG. 36, a top plan view of one embodiment of a first rotating linkage member 542 is depicted. In this embodiment, the first rotating linkage member 542 may have a bent profile. The first rotating linkage member 542 may have a first portion 558 and a second portion 560. The two portions 558 and 560 may be arranged in relationship to one another so as to form an acute angle. In some embodiments, the acute angle may be approximately 50°. In the example embodiment, the first and second portions 558, 560 are sized differently with the first portion 558 being shorter than the second portion 560. As best shown in FIGS. 34-35, the first portion 558 may be coupled to the container linkage member 540 at pivot point 552, while second portion 560 may be coupled to the door linkage member 546 at pivot point 548.

Figure 37:
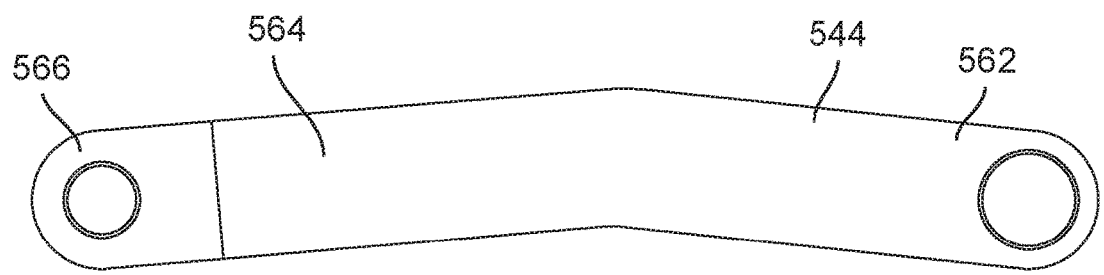
FIG. 37 depicts a plan view of an example linkage.
Figure 38:
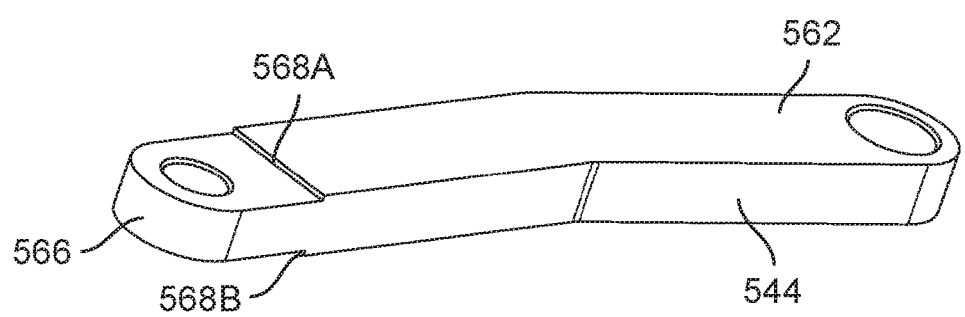
FIG. 38 depicts a perspective view of an example linkage.

Referring now to FIGS. 37-38, a top plan view (FIG. 37) and a perspective view (FIG. 38) of one embodiment of a second rotating linkage member 544 are depicted. In this embodiment, the second rotating linkage member 544 may have a bent profile. For example, the second rotating linkage member 544 may have a first portion 562 and a second portion 564. The two portions 562, 564 may be arranged in relationship to one another so as to form an obtuse angle. The angle may be about thrice the angle between the first and second portion 558, 560 of the first rotating linkage member 542 (see FIG. 36). In some examples the angle between the first and second portion 562, 564 of the second rotating linkage 544 member may be approximately 170°. In the example, the first portion 562 and second portion 564 are sized differently. Specifically, the first portion 562 is smaller than the second portion 564. In certain examples, the thickness of the first and/or second portion 562, 564 may change over the extent of that portion 562, 564. This thickness change may be gradual and continuous or may be stepwise. As shown, the thickness of the end region 566 of the second portion 564 is thinner than the remainder of the second portion 564. In the example embodiment, the thickness change is stepwise and the second portion includes a step 568A, B on opposing faces of the second portion 564. As best shown in FIGS. 34-35, the first portion 562 may be coupled to the container linkage member 540 at pivot point 554, while second portion 564 may be coupled to the door linkage member 546 at pivot point 550. The steps 568A, B may be positioned to ensure that the rotating linkage member 544 has sufficient clearance around the door linkage member 546 to be displaced through the full desired rotational range of the rotating linkage member 544.

Figure 39:
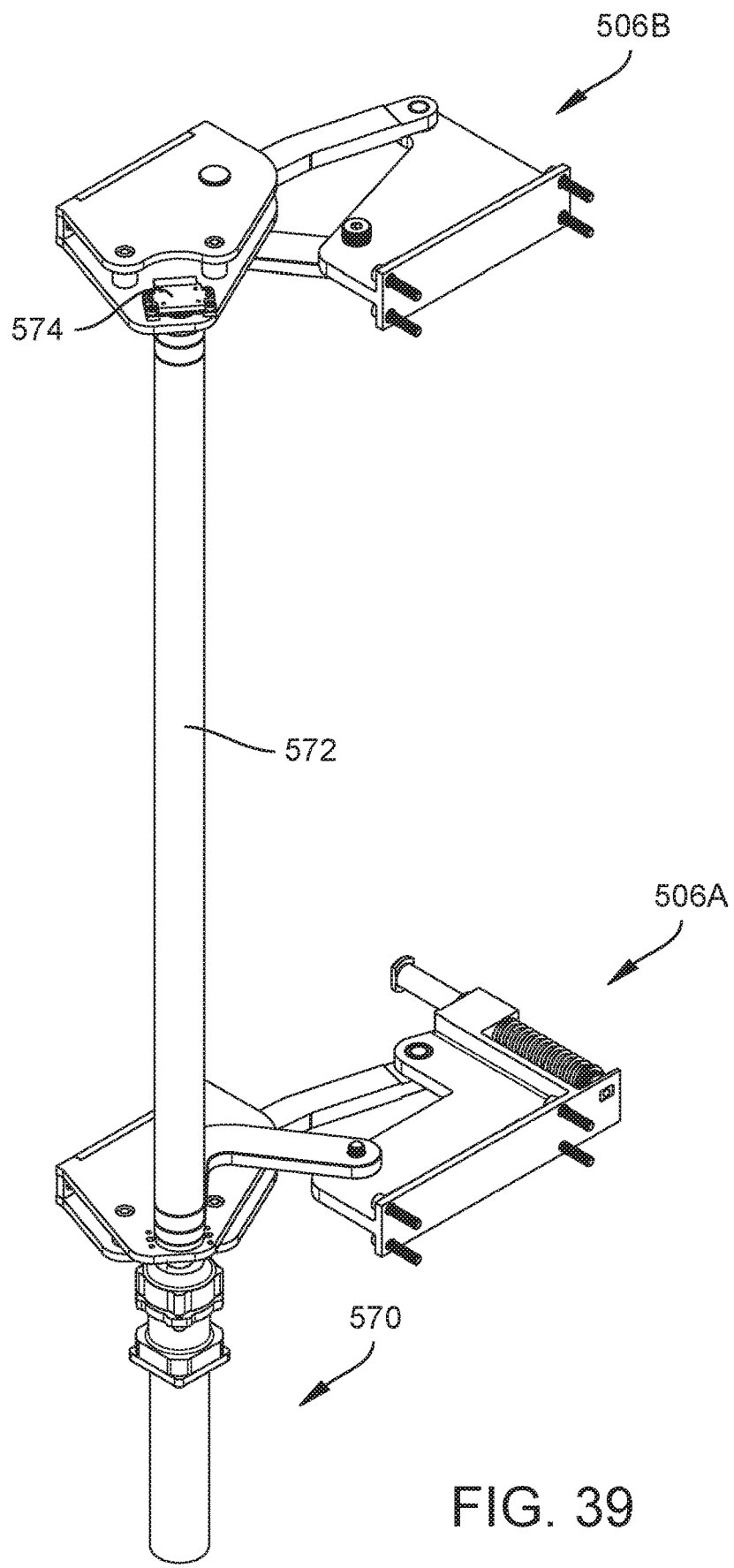
FIG. 39 depicts a perspective view of a set of linkages coupled to a motor assembly.

Referring now to FIG. 39, each of the linkages 506A, B associated with a closure member such as a door 502A, B (see, e.g., FIG. 28) may be actuated via a motor assembly 570. In the example embodiment, both of the linkages 506A, B are driven by a single motor assembly 570. In other embodiments, each linkage 506A, B may be driven by a dedicated motor assembly 570. As shown, the linkages 506A, B may be coupled together via a shaft 572. The shaft 572 may transmit rotation generated by the motor assembly 570 to a linkage 506A, B distal to the motor assembly 570. The shaft 572 may also ensure that the linkages 506A, B are actuated in coordination with one another. As shown, the shaft 572 may be monitored by one or more sensor assembly 574. The sensor assembly 574 may track rotation of the shaft 572 as the linkages 506A, B are actuated. Any suitable sensor assembly may be used. For example, the sensor assembly 574 may include any or some combination of a magnetic encoder, optical sensor, rotary potentiometer, and/or mechanical conductive encoder. The sensor assembly 574 may be in data communication with a controller 730 (see, e.g., FIG. 28) which may govern operation of the motor assembly 570. In certain embodiments, a sensor assembly in communication with the controller 730 (see, e.g. FIG. 28) may also be included as part of the motor assembly 570. It may be desirable, however, to monitor rotation of the shaft 572 as rotation of the shaft 572 should directly correlate to the actuation state of the linkages 506A, B. In the example embodiment, the shaft 572 couples the top linkage 506B to the bottom linkage 506A via the pivot point 522 of the bottom linkage 506A and the pivot point 552 of the top linkage 506B.

Referring back to FIG. 28, motor assemblies 570 may be included for the pairs of linkages 506A, B associated with each of the doors 502A, B. A controller 730 in data communication with each of the motor assemblies 570 may use data from the sensor assemblies 574 monitoring each set of linkages 506A, B to ensure that each of the doors 502A, B is actuated in a synchronous manner with the opposing door 502A, B (if this is desired). Thus, when commanding actuation of the doors 502A, B, the controller 730 may ensure one of the doors 502A, B does not lag behind the other more than an allowed threshold. Such lag may appear visually awkward to a user (e.g. a package recipient). In some embodiments, or in certain instances (e.g. where the cargo container 110 may include one or more interior partition), it may be desirable that only one door 502A, B be actuated at a time. Any suitable controller 730 may be used. For example, the controller may include a combination of or at least one of any of a microprocessor, PLC, PAC, and/or FPGA.

Figure 40:
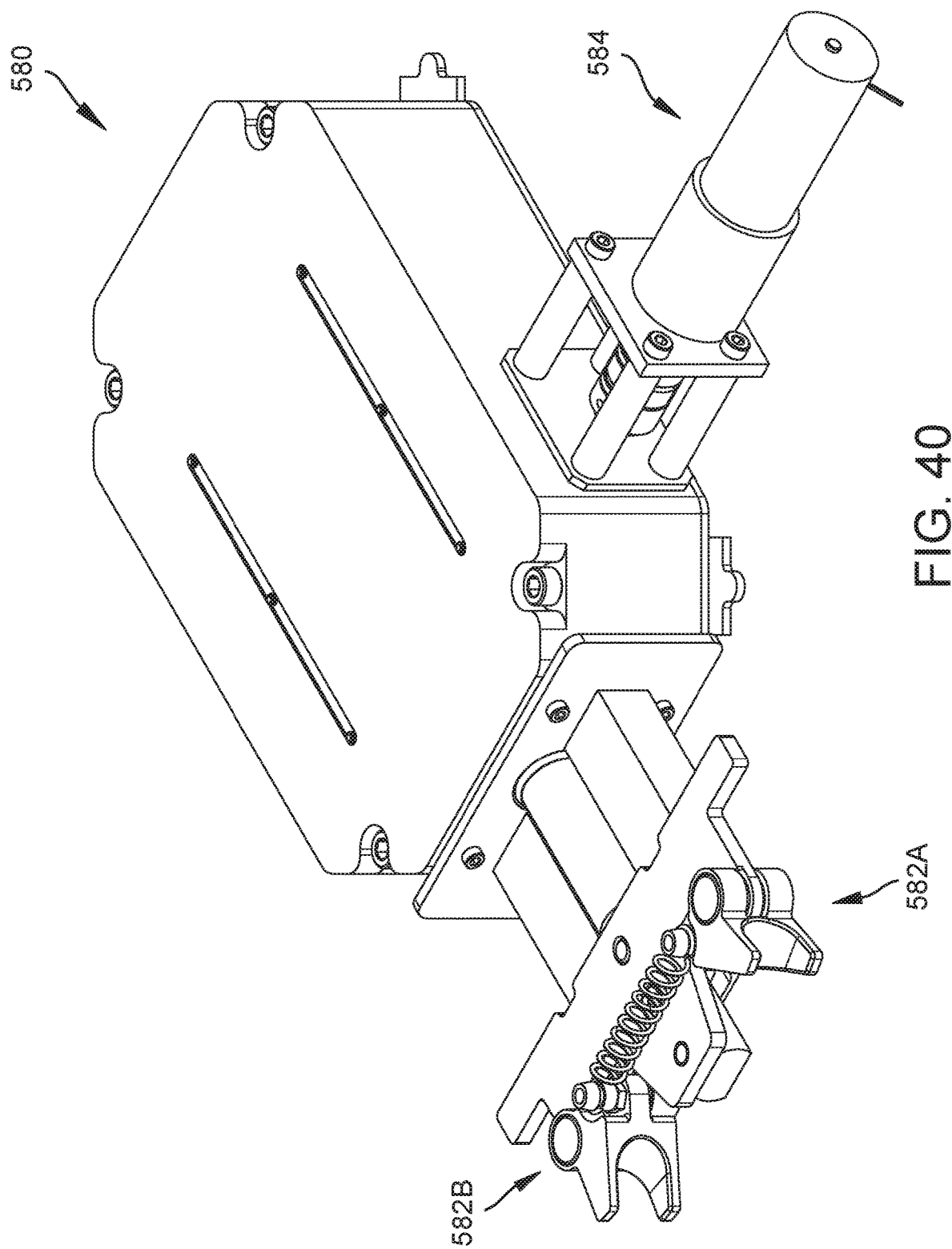
FIG. 40 depicts a perspective view of an example retention assembly.

Referring now to FIG. 40, an example retention assembly 580 is shown. A closure member (such as door assemblies 490A, B of FIG. 28) may be securely closed against the frame 115 and/or body 117 of a cargo container 110 via the example retention assembly 580. The retention assembly 580 may include one or more securement member assemblies 582A, B which may be actuated to capture a portion of a door assemblies 490A, B. With the portion of the associated door assembly 490A, B captured, the door assembly 490A, B may be held, and in some embodiments locked, in position by the retention assembly 580.

In some examples, the retention assembly 580 may displace the door assemblies 490A, B from a partially closed state to a fully closed state during actuation of the securement member assemblies 582A, B of the retention assembly 580. The retention assembly 580 may also establish one or more seal as it displaces the door assemblies 490A, B. For example, the retention assembly 490A, B may drive the door assemblies 490A, B into contact with one or more compliant member such as a gasket included on the frame 115 or body 117 of a cargo container 110 so as to compress the one or more compliant member against each of the door assemblies 490A, B. The door motor assemblies 570 may be selected so as to be back drivable. This may allow the doors 502A, B to be displaced via operation of the retention assembly 580.

One or more motor assembly 584 may be included and may be powered to actuate any of the one or retention assembly 580. The motor assembly 584 may, for example, be similar to the latch motor 210 and reduction gear set 215 described in relation to FIGS. 22-23. A transmission assembly 586 (see, e.g., FIG. 41-42) may be interposed between the motor assembly 584 and securement member assemblies 582A, B. As shown in FIG. 40, the transmission assembly 586 may be enclosed within a housing 588. Such a housing 588 may inhibit ingress of liquid or detritus into the transmission assembly 586 as well as prevent a user from contacting any moving components of the transmission assembly 586.

Figure 41:
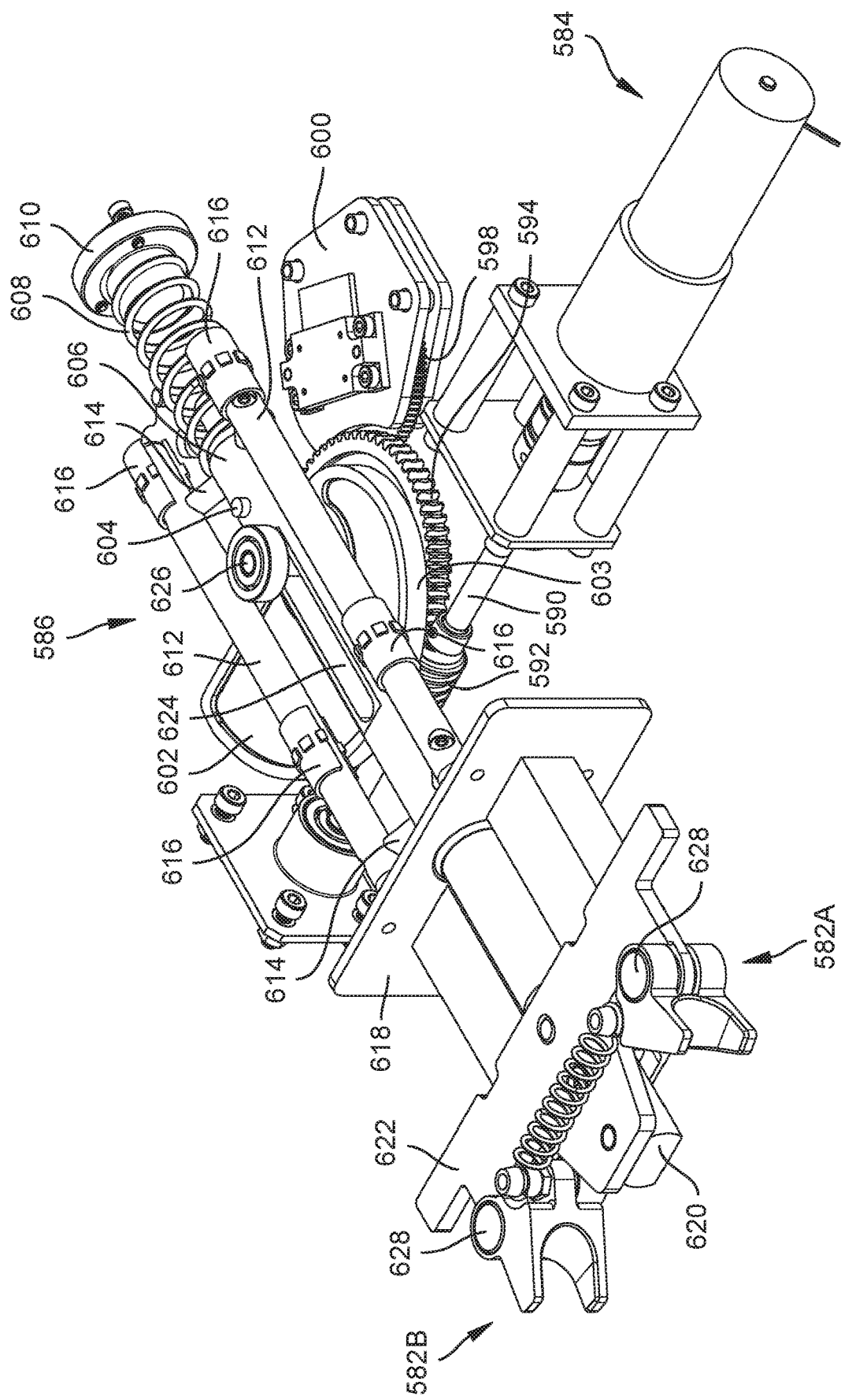
FIG. 41 depicts a perspective view of an example retention assembly with an exterior housing removed.
Figure 42:
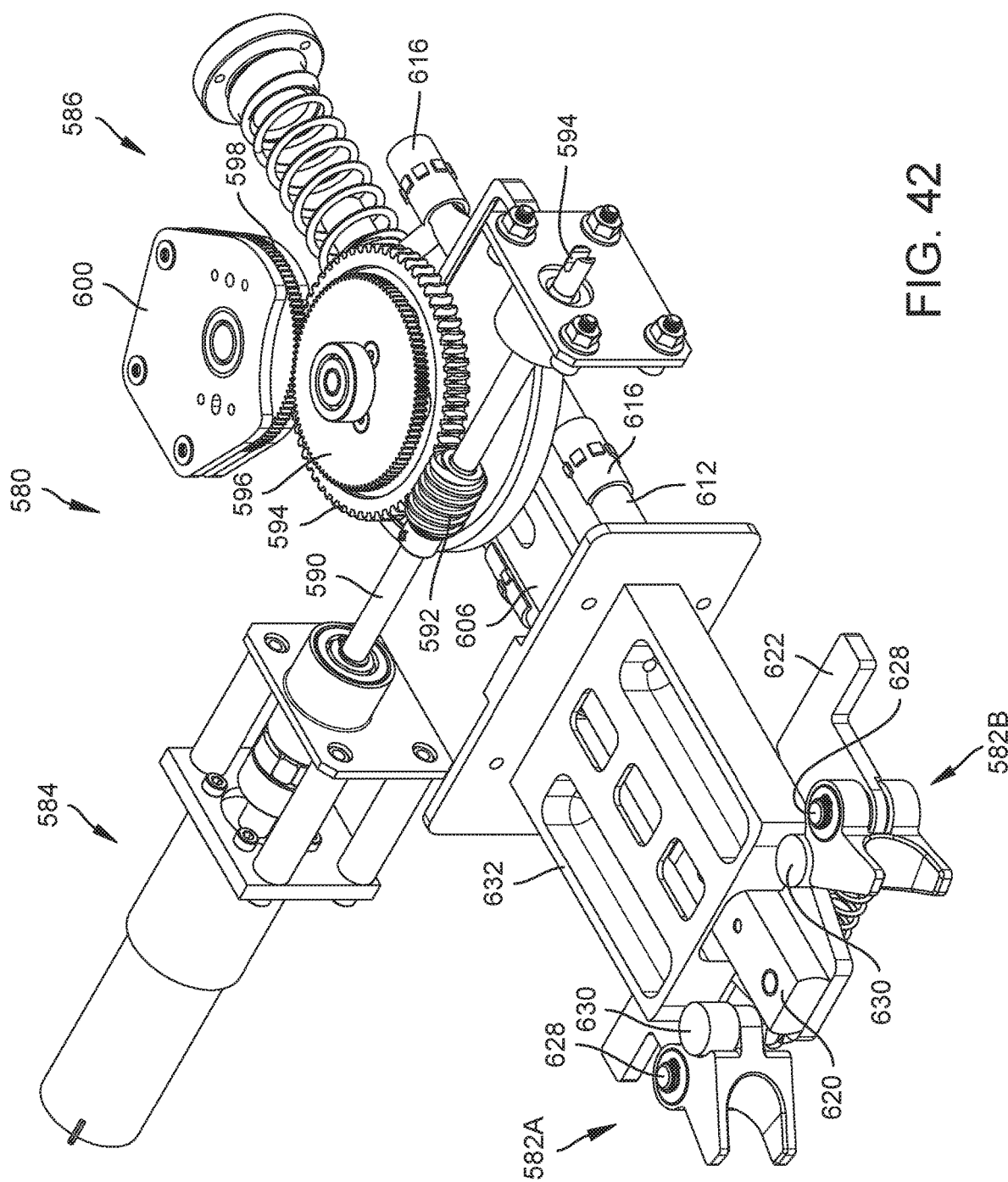
FIG. 42 depicts a perspective view of an example retention assembly with an exterior housing removed.

Referring now also to FIGS. 41-42, a top perspective view (FIG. 41) and bottom perspective view (FIG. 42) of an example retention assembly 580 are depicted with much of the housing 588 removed. As shown, the motor assembly 584 may be coupled to an output shaft 590. The output shaft 590 may include a worm 592 included thereon. In the example embodiment, the worm 592 is disposed in a central region of the exposed portion of the output shaft 590. The output shaft 590 may also include a tool interface 594. The tool interface 594 is located on an exposed end of the output shaft 590. This end of the output shaft 590 may extend outside of the housing 588 and may allow a user to manually mate a tool into the tool interface 594 and drive the transmission assembly 586 by hand.

The worm 592 on output shaft 590 may mesh with a worm gear 594. As the output shaft 590 is rotated about is longitudinal axis, the rotation of the worm 592 may generate rotation of the worm gear 594 mated therewith. The worm gear 594 may rotate about an axis perpendicular to that of the output shaft 590. As shown, the worm gear 594 may be fixedly coupled to a first gear 596. The first gear 596 may be coaxial with the worm gear 592. The first gear 596 may interdigitate with a second gear 598 which may be referred to herein as a sensor gear. The sensor gear 598 may be included as part of a sensor assembly. The sensor assembly 600 may monitor rotation of the sensor gear 598 and generate an output signal corresponding to the rotational position of the sensor gear 598. As the sensor gear is driven by the first gear 596 and the first gear 596 is fixed in relation to the worm gear 594, the output signal of the sensor assembly 600 may be utilized to determine the rotational position of the worm gear 594 and/or cam 602 (described in further detail below). Any suitable sensor assembly may be used. For example, the sensor assembly 600 may include any or some combination of a magnetic encoder, optical sensor, rotary potentiometer, and/or mechanical conductive encoder. By placing the sensor assembly 600 downstream of the worm 594, considerations related to the impact of backlash in the transmission assembly 586 may be mitigated. In certain embodiments, one or more rotation sensor may be included on as part of the motor assembly 584 instead or in addition to the sensor assembly 600 shown in FIGS. 41-42.

The transmission assembly 586 may also include a cam 602 which is fixedly coupled to the worm gear 594 such that the cam 602 rotates in tandem with the worm gear 594. The cam 602 may include a cam surface 603. A follower 604 included as part of an actuator shaft 606 may ride along the cam surface 603 and allow rotational motion of the cam 602 to be converted into translational motion of the actuator shaft 606. The transmission assembly 586 may include a bias member 608 which may be disposed between the actuator shaft 606 and a bias member receiver 610 included as part of the housing 588. The bias member 608 may spring load the actuator shaft 606 such that the follower 604 is maintained in intimate contact with the cam surface 603 of the cam 602. In the example embodiment, the bias member 608 is depicted as a compression spring. Other suitable bias members 608 may be used in alternative embodiments.

The actuator shaft 606 may include one or more outrigger 612 which may extend parallel to the actuator shaft 606 and be connected thereto by one or more boom 614. In the example embodiments, two outriggers 612 which extend along a plane parallel to and above the actuator shaft 606 are included. The outriggers 612 may slide along bearings 616 coupled to the housing 588 and may help guide displacement of the actuator shaft 606 such that the actuator shaft 606 displaces substantially along its longitudinal axis when the cam 602 is rotated. Rotation of the shaft 606 may be inhibited via the interaction of the outriggers 612 with the bearings 616. The actuator shaft 606 may also include a channel 624 cut therethrough. The channel 624 may accommodate the axle 626 for the worm gear 594, first gear 596, and cam 602. The channel 624 may also define the displacement range of the actuator shaft 606 as the axle 626 may present a mechanical interference to further displacement of the actuator shaft 606 once the axle 626 is disposed at an end of the channel 624.

The example transmission assembly 586 may provide a large mechanical advantage between the motor assembly 584 and any actuated doors (see, e.g. 502A, B of FIG. 29). In one embodiment, the large mechanical advantage can be greater than 400:1, 800:1 or 2500:1. In some embodiments, the mechanical advantage may be between 2700:1 and 2600:1. The large mechanical advantage allows a motor assembly 584 to apply a significant force on a door 502A, B and compress a gasket, if present. The large mechanical advantage also has the effect of making it very difficult to forcibly open a door 502A, B. The resistance caused by frictional forces between the components of the transmission assembly 586 as well as the electromagnetic holding forces in the motor assembly 584 are multiplied by the mechanical advantage. Thus, the retention assembly 580 may not be practicably overcome by an individual attempting to gain unwarranted access. Therefore, the retention assembly 580 may effectively lock the doors 502A, B and the retention assembly 580 may be referred to as a lock assembly. In addition, as explained elsewhere, worm drives such as that included in the transmission assembly 586 may be self-locking. Thus the worm drive of transmission assembly 586 may prevent the transmission assembly 586 from being back-driven via force applied to the doors 502A, B.

Still referring to FIGS. 41-42, in the example embodiment, the actuator shaft 606 may extend out of the housing 588. In the example embodiment, actuator shaft 606 extends through a front plate 618 of the housing 588. A sliding seal may be present between the actuator shaft 606 and the housing 588. As shown, the external end 620 of the actuator shaft 606 may be coupled to a mounting body 622 to which the securement member assemblies 582A, B of the retention assembly 580 may be mounted. As shown, the securement member assemblies 582A, B may be pivotally attached to the mounting body 622 via pivot pins 628.

Figure 43:
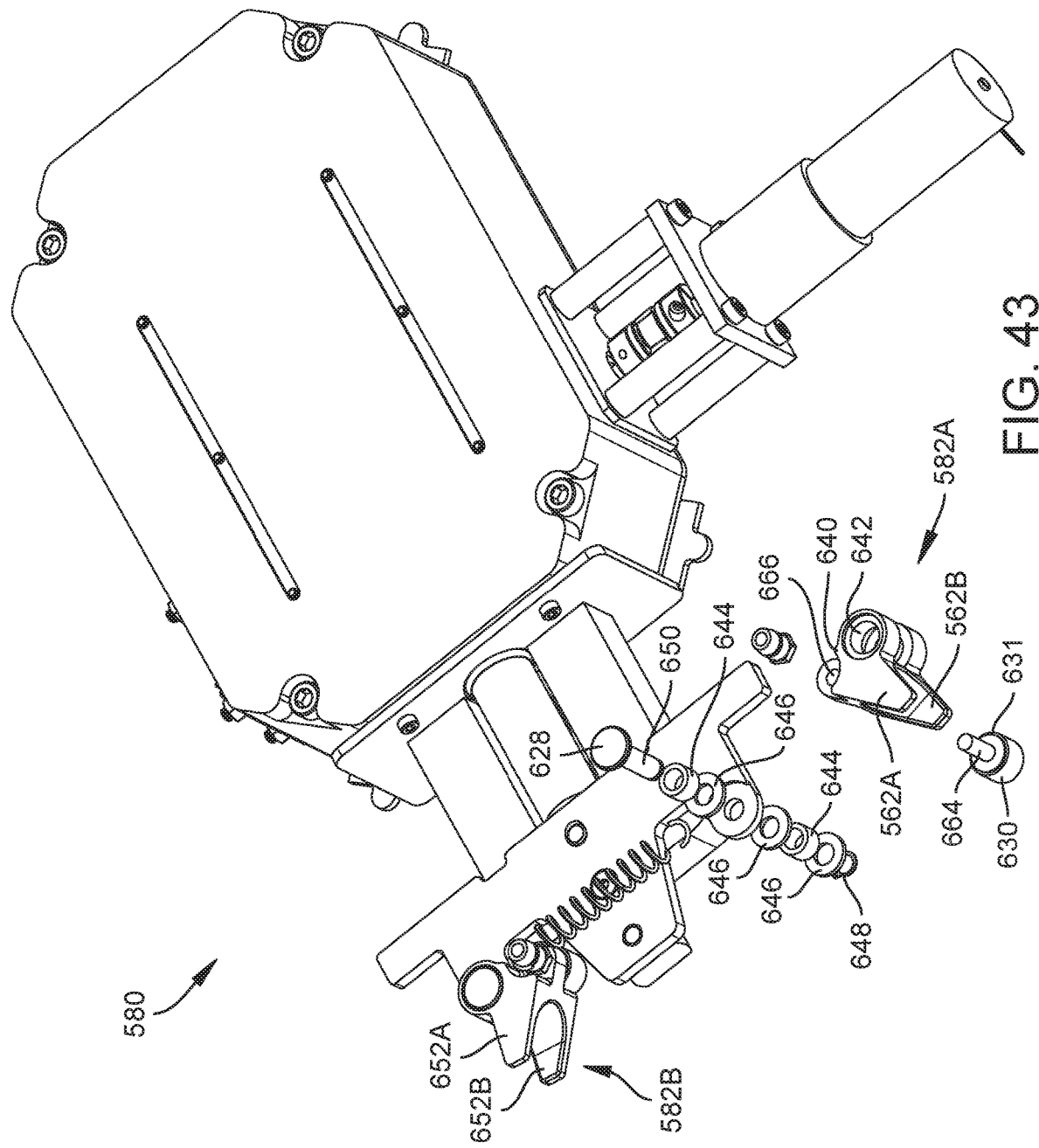
FIG. 43 depicts a partially exploded view of an example retention assembly.

Referring now to FIG. 43, a view of the exemplary retention assembly 580 with one of the securement member assemblies 582A exploded apart is depicted. As shown via the example of exploded securement member assembly 582A, each of the securement member assemblies 582A, B may include a securement member 640. Each securement member 640 may include a bore 642 through which the pivot pin 628 may be installed. Bushings 644 may also be placed with the bore 642. Thrust washers 646 may be disposed between the mounting body 622 and the securement member 640 on each opposing side of the mounting body 622. An additional thrust washer may be included between the securement member 640 and a retainer clip 648 which mates into a recess 650 of the pivot pin 628. Each securement member 640 may also include a pair of arms 652A, B. The arms 652A, B may be separated by a trough which has a shape of the Latin character "U". The each of the arms 652A, B may extend substantially parallel to one another. The arms 652A, B in the example embodiment may each be coplanar with a respective one of the top and bottom opposing faces of the securement member 640.

Still referring to FIG. 43, each of the securement member assemblies 582A, B may include a follower 630. The follower 630 may include a roller 631 which may rotate about the axis of a pivot shaft 664 and may be passed through an orifice 666 in a flange 668 of the securement member 640. A fastener may be included to retain the follower 630 in place on the securement member 640.

Figure 44:
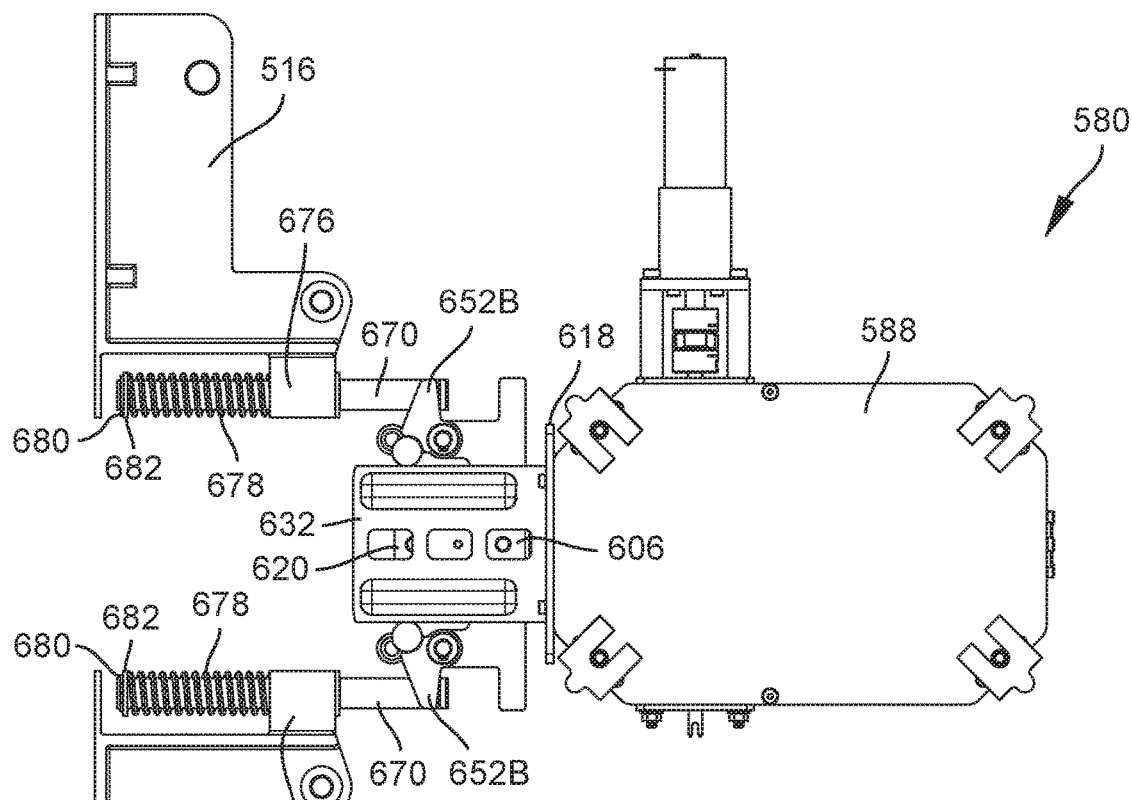
FIG. 44 depicts a plan view of an example retention assembly.

Referring now to FIGS. 44-45, as the actuator shaft 606 is displaced such that the external end 620 of the actuator shaft 606 is withdrawn into the housing 588, the followers 630 may travel along a cam plate 632 attached (e.g. integrally formed with or fastened to via screws or the like) to the front plate 618 of the housing 588. In turn, this may force the securement member assemblies 582A, B to pivot outwardly away from the axis of the actuator shaft 606. As shown, in certain embodiments, the door linkage members 516 may each include a latch pin 670. The latch pins 670 may extend through and translate along a guide bearing 672 included in a protuberance 676 of the door linkage member 516. The latch pins 670 may each include a terminal flange 674. The terminal flange 674 may be wider than the distance between the arms 652A, B of the associated securement member 640.

As the actuator shaft 606 is driven into the housing 588, the securement members 640 in the example embodiment may be swung outward such that a portion of the latch pins 670 are disposed within the troughs between the arms 652A, B of each securement member 640. Upon further retraction of the actuator shaft 606, the flanges 674 of the latch pins 670 may catch on the sides of the arms 652A, B most proximal to the housing 588. As the terminal flanges 674 are too big to fit through the arms 652A, B the securement members 640 may capture the latch pins 670 when the securement members 640 are rotated outward.

Additional displacement of the actuator shaft 606 into the housing 588 may begin to engender translational displacement of the doors 502A, B (see, e.g., FIG. 28) attached to the door linkages members 516 toward the housing 588. This translational displacement may, inter alia, compress the doors 502A, B against a complaint member of a cargo container 110 in certain embodiments. Alternatively, the compliant member may be included on each door 502A, B and may these compliant members may be compressed against the cargo contain 110 as this translational displacement occurs. Thus, the retention assembly 580 generate an environmental seal which protects the contents of the cargo container 110 from the elements when the retention assembly 580 is operated to retain the doors 502A, B. Once this translational displacement has been completed, the doors 502A, B may be considered in a fully closed state.

Still referring to FIGS. 44-45, in some examples, a bias member 678 may be included for each of the latch pins 670. In the example embodiment, the bias members 678 are depicted as compression springs which surround the latch pins 670. The bias members 678 may be captured between the protuberance 676 and a washer 682 held in place by a retainer clip 680 which is coupled into a groove on an end of the latch pin 670 opposite the flange 674. The bias members 678 may be selected so as to resist compression during translational displacement of the doors 502A, B to the fully closed state. In certain scenarios, however, the bias member 678 may allow for the latch pins 670 to be displaced relative to the door linkage members 516. For example, in the event that something is caught between the doors 502A, B, the latch pins 670 and bias members 678 may act as a force limiting assembly which prevents a force above a predefined threshold from being exerted against whatever is caught between the doors 502A, B. This may protect against items being crushed as the doors 502A, B are closed. The faces of the doors 502A, B which are disposed adjacent one another may also be made as wide as practicable to spread any force exerted against a caught object over a large area.

As best shown in FIG. 45, the terminal flange 674 of each latch pin 670 may not be provided about the entire circumference of the latch pin 670. In the example embodiment, the flange 674 has an obround shape. Alternatively, the terminal flange 674 may only extend outward from a single portion of the latch pin 670. For example, the flange 674 may extend upward from the terminal portion of the latch pin 670. In certain examples, at least one of the latch pins 670 may be coupled to a tool interface (not shown). Upon introduction of the tool, the latch pin 670 may be manual rotated about its longitudinal axis by manual manipulation of the tool. Consequentially, the flange 674 may be rotated (e.g. 90° in the example embodiment) such that it may pass through the trough between the arms 652A, B of the associated securement member 640. This may be desirable in the event of a malfunction of the retention assembly 580 and may allow for a technician to gain entry to a cargo container 110 in such scenarios.

Figure 46A:
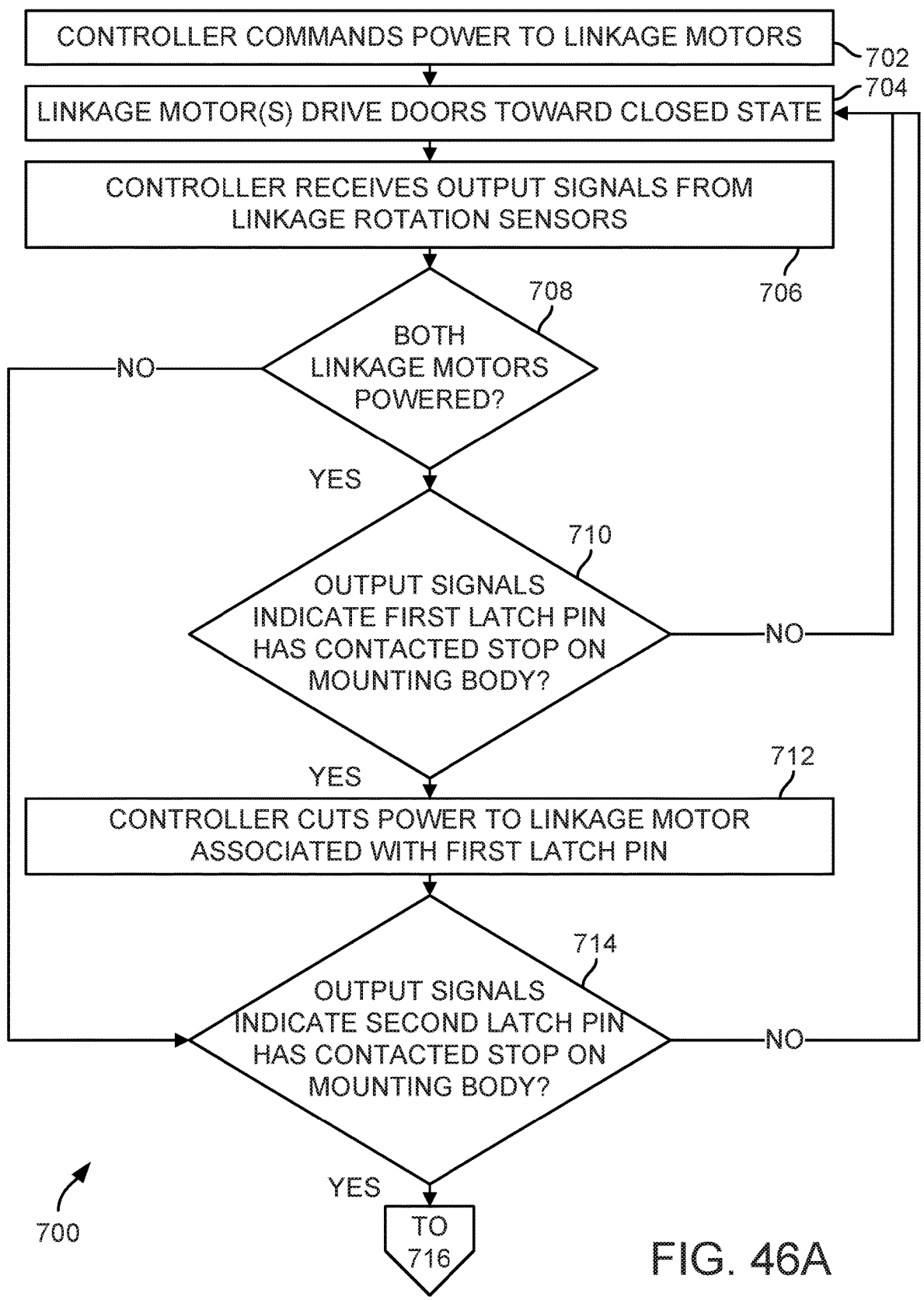
FIG. 46A-B depicts a flowchart detailing a number of example actions which may be executed to close and latch doors of a container.
Figure 46B:
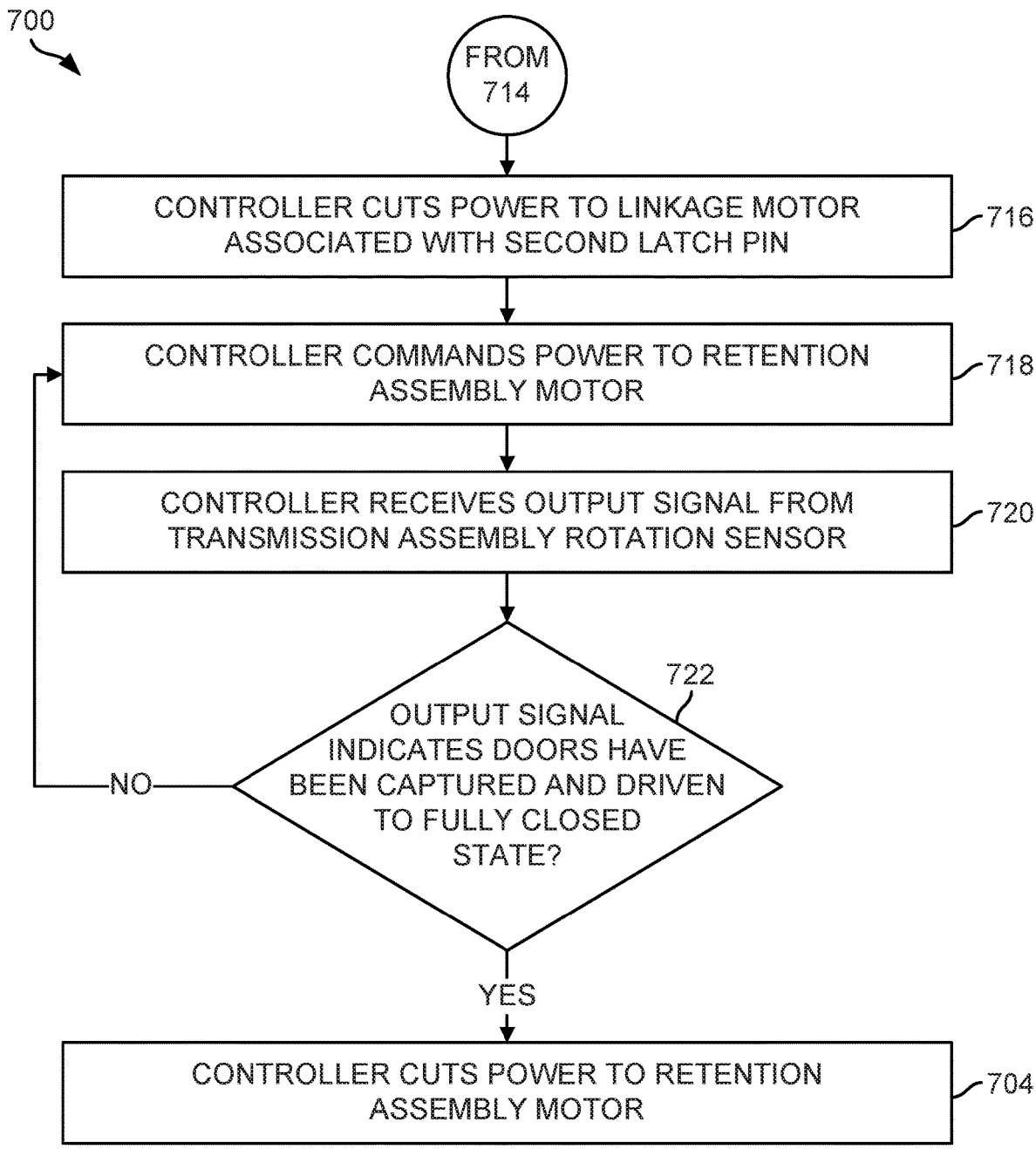

Referring now to FIG. 46A-B, a flowchart 700 detailing a number of example actions which may be executed to close and latch doors 502A, B of a cargo container 110 is shown. As shown, in block 702, a controller 730 may command power to linkage motors 570 of the cargo container 110. The linkage motors 570 may drive the doors 502A, B towards the closed state in block 704. In block 706, the controller 730 may receive output signals from the linkage rotation sensor assemblies 574. If, in block 708, both linkage motors 570 are receiving power and if, in block 710, neither of the output signals indicate that a first latch pin 670 has contacted a stop, the linkage motors 570 may continue to drive the doors 502A, B toward the closed state in block 704. If, in block 710, the output signals indicate a first latch pin 670 has contacted a stop on the mounting body 622, the controller 730 may cut power to the linkage motor 570 associated with the first latch pin 670 in block 712. The controller 730 may continue to power the remaining linkage motor 570 until the output signal for that linkage motor 570 indicates a second latch pin 670 associated with the linkage motor 570 has contacted a stop of the mounting body 622. If, in block 714, the output signal for the remaining linkage motor 570 indicates the second latch pin 670 has contacted a stop of the mounting body 622, the controller 730 may cut power to that linkage motor in block 716. The controller 730 may command power to the retention assembly 584 motor in block 718. In block 720, the controller 730 may receive an output signal from the transmission assembly rotation sensor assembly 600. The controller 730 may continue to power the retention assembly motor 584 until the output signal from the transmission assembly rotation sensor assembly 600 indicates that the latch pins 670 have been captured and the doors 502A, B have been displaced to the fully closed state. Once, in block 722, the output signal from the transmission assembly rotation sensor assembly 600 indicates that the latch pins 670 have been captured and the doors 502A, B have been displaced to the fully closed state, the controller 730 may cut power to the retention assembly motor 584 in block 724.

Figure 47:
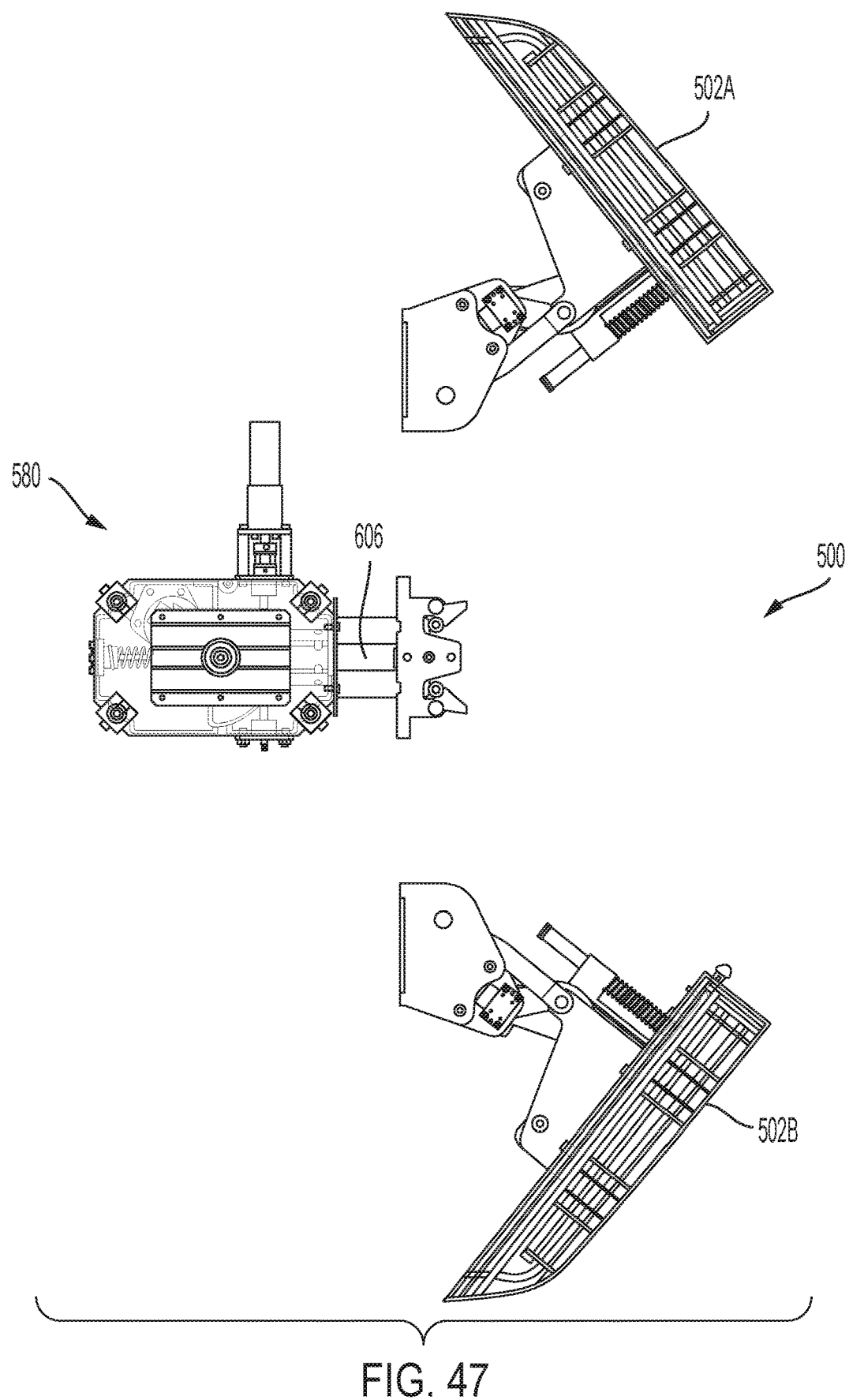
FIGS. 47-49 depict an example closure assembly with its closure members progressing through various positions as the closure members are transitioned to a closed state.
Figure 48:
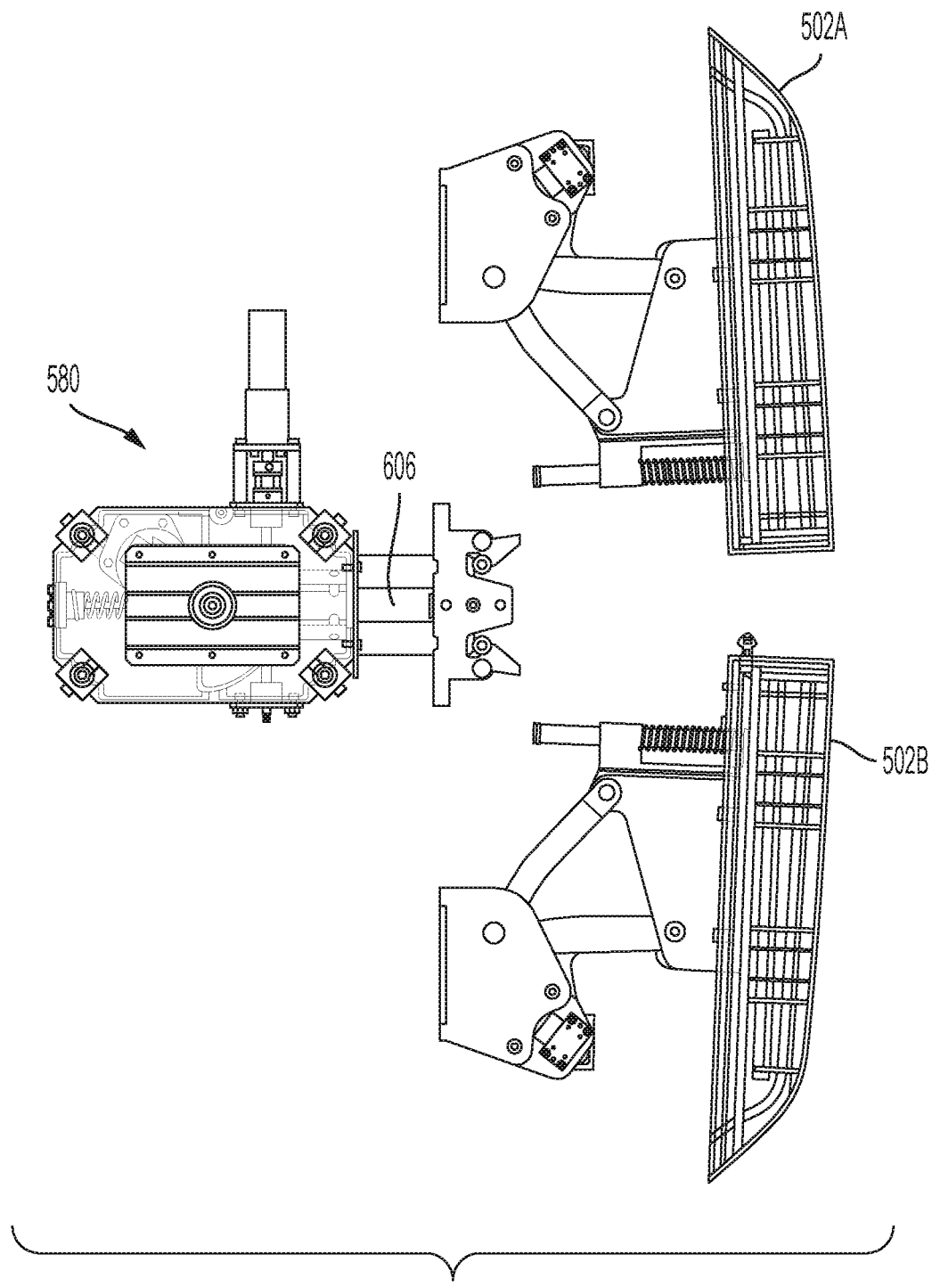
Figure 49:
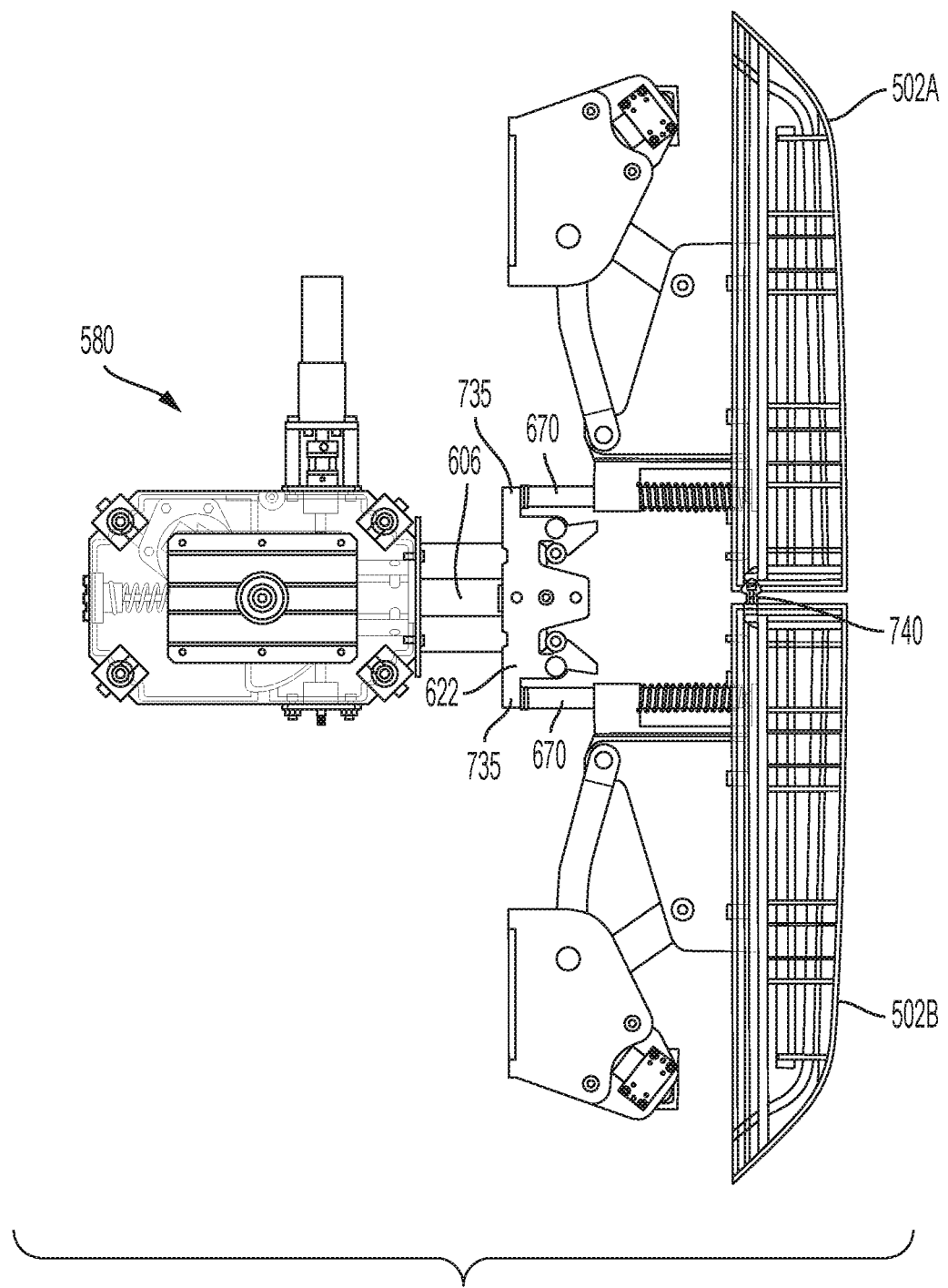

Referring now to FIGS. 47-49, an example closure assembly 500 is depicted with the closure members (in this case doors 502A, B) being progressed toward a closed state. As shown in FIG. 47, the doors 502A, B are in an open state. As mentioned elsewhere herein, opening and closing of the doors 502A, B may be divided into a first phase and a second phase. During a first phase of closure, the doors 502A, B may displace in a primarily rotational or both a rotational and translational fashion. As shown in FIG. 48, during closure of the doors 502A, B, the doors 502A, B may be swung inward toward the axis of the actuator shaft 606 of the retention assembly 580. Displacement of each door 502A, B may be governed by a motor assembly 570 as described elsewhere herein. As the doors 502A, B are further displaced toward a closed state, the doors 502A, B may reach a partially closed state as shown in FIG. 49. The doors 502A, B may reach the partially closed state when latch pins 670 contact stop projections 735 on the mounting body 622.

As shown in FIG. 49, the position of the stop projections 735 may be selected such that the latch pins 670 contact the stop projections 735 at a point when a sealing member 740 on one of the doors 502A, B contacts or is compressed against the opposing door 502A, B. Thus, the output from any sensor assemblies 574 monitoring the position of the doors 502A, B may be used indicate that a door-to-door seal has been established. When, for example, the sensor assemblies 574 register both doors 502A, B have ceased displacement due to their latch pins 670 contacting the stop projections 735, the controller 730 may determine that a door-to-door seal has been established. The controller 730 may then power the retention assembly 580 to drive the doors 502A, B to a fully closed state. In some examples, the controller 730 may also verify that the doors 502A, B have displaced more than a predefined amount before powering the retention assembly 580. This may ensure that the controller 730 may discern when the doors 502A, B are in the partially closed state and a state in which a box or the like is caught between the doors 502A, B preventing displacement of the door 502A, B. In some embodiments, the stop projections 735 or another portion of the retention assembly 580 may include a sensor (e.g. microswitch, magnetic sensor, optical sensor or the like) which may further provide indication that the latch pins 670 have contacted the stop projections 735.

Once the doors 502A, B have reached the partially closed state, the controller 730 may power the retention assembly 580 such that the doors 502A, B are displaced to a fully closed state. As described above in relation to FIGS. 44-45, displacement in this second phase of closure may be substantially translational in the direction of the cargo container 110. As this displacement occurs, a seal between the doors 502A, B and the cargo container 110 (e.g. the frame 117 of the cargo container 110) may be created. The doors 502A, B or cargo container 110 may include a sealing member which is compressed as the doors 502A, B are driven against the cargo container 110 via the retention assembly 580.

Figure 50:
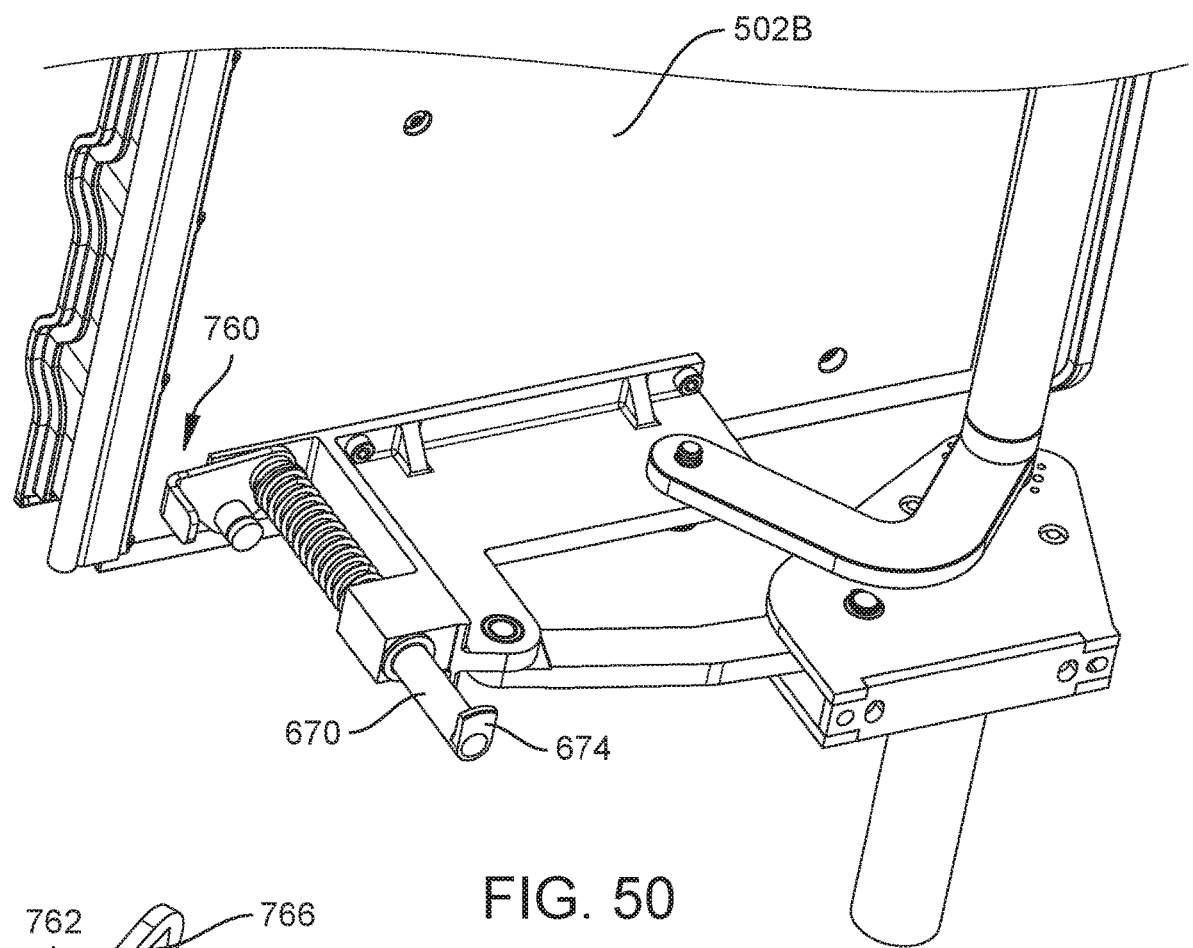
FIG. 50 depicts a perspective view of a portion of a door and an example actuator for manually freeing the latch pin of that door from a retention assembly.
Figure 51:
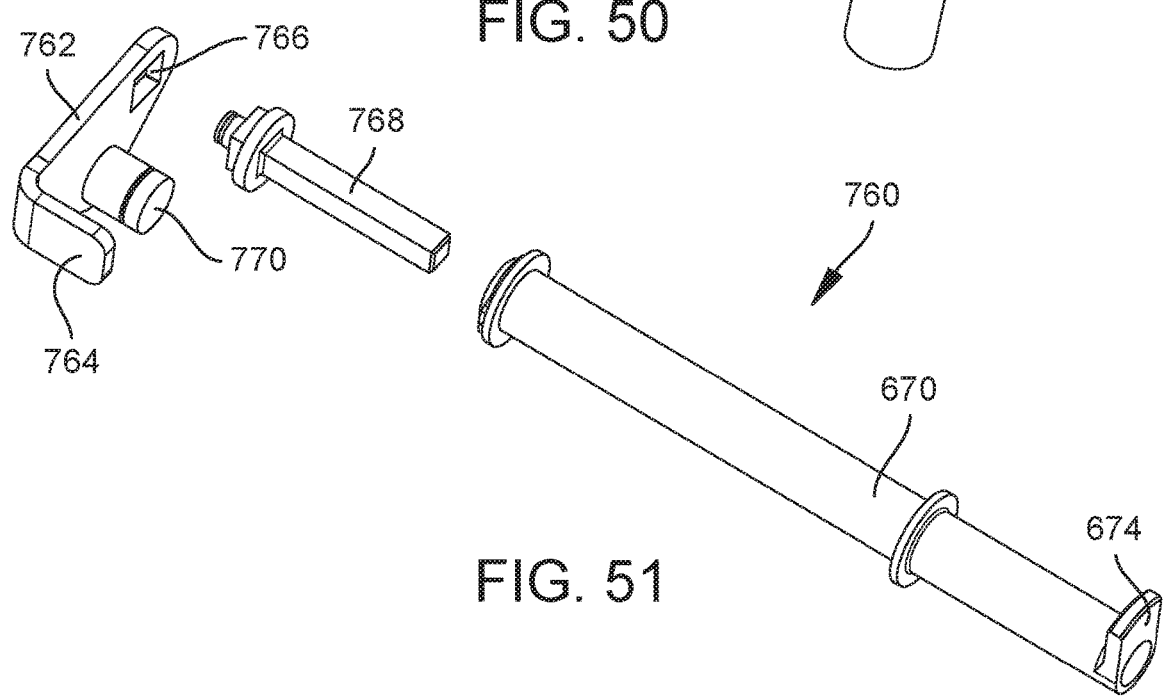
FIG. 51 depicts an exploded view of an example actuator and a latch pin.

Referring now to FIGS. 50 and 51, in some embodiments at least one of the doors 502A, B may be associated with an actuator 760 which may be operated to free that door 502A, B from a retention assembly 580. The actuator 760 may be manually operable or powered by a motor assembly (e.g. upon receipt of a remote command by a controller 730). In the example embodiment, the actuator 760 may only be accessible from the interior of the cargo container 110. One of the doors 502A, B may be configured to accept a tool or key (see e.g. discussion of FIG. 45). This tool may be used to rotate the latch pin 670 associated with that door 502A, B such that the latch pin 670 can pass out of the securement member assembly 582A. This may allow a technician to open the door. With that door 502A, B open, the actuator 760 for the other door 502A, B may then be accessed from the interior of the cargo container 110. The actuator 760 may then, for example, be manually driven to rotate the latch pin 670 of the remaining closed door 502A, B such that the terminal flange of the that latch pin 670 will not catch on the securement member assembly 582A, B if an attempt to open the door 502A, B is made.

As shown, the actuator 760 may include a manually actuated handle 762. The handle 762 may include a gripping projection 764 which may provide a grasping surface for a user. The handle may also include an aperture 766. The aperture 766 may accept a shaft 768. When the door 502A, B is fully assembled, the shaft 768 may be coupled in place within the aperture 766. The handle 762 may be rotatable about the axis of the shaft 768. The aperture 766 may act as a keyway and the shaft 766 may be keyed. This may ensure that any rotation of the handle 762 also generates rotation in the shaft 768. In the example embodiment, the shaft 768 has a polygonal (e.g. rectangular or square) cross-sectional shape though any suitable shape (e.g. cross-section with shape of Latin character "D") which results in a keyed joint may be used. A portion of the shaft 768 may also be housed within a recess of the latch pin 670. The recess may also act as a keyway such that the latch pin 670 rotates in tandem with the shaft 768 and the handle 762. As the handle 762 is rotated, the latch pin 670 may be caused to rotate about its axis. This may displace the terminal flange 674 to a position in which it will not be obstructed by the arms or fingers 652A, B of the securement member assembly 582A, B (see e.g. FIG. 43) when an attempt to displace the door 502A, B is made. Thus, after opening one door 502A, B with a tool or key, a technician may release the other door 502A, from the retention assembly 580. This may allow full access to the interior of the cargo container 110 in the event of a component failure or other malfunction.

In some embodiments, the actuator 760 may also include a spring loaded pin 770. The spring loaded pin 770 may be displaced from a first state (shown) to a retracted state in which it is pulled away from the handle 762. In the first state, a portion of the spring loaded pin 770 may extend into detent in the door 502A, B. With the spring loaded pin 770 partially disposed within the detent, the handle 762 may be inhibited from rotating. Thus, the spring loaded pin 770 may lock the handle in place when in the detent. Once the pin 770 is pulled to the retracted state, the pin 770 may be completely withdrawn from the detent and the handle 762 may be free to rotationally displace. As the spring loaded pin 770 may be spring loaded to the first state, the pin 770 may automatically restore toward the first state when released by the user. This may help prevent a user from forgetting to lock the handle 762 in place after use as the spring loaded pin 770 should automatically do so after the handle 762 has been displaced back to a position in which the terminal flange 674 is captured by the securement member assembly 582A, B.

Various alternatives and modifications can be devised by those skilled in the art without departing from the disclosure. Accordingly, the present disclosure is intended to embrace all such alternatives, modifications and variances. Additionally, while several embodiments of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. And, those skilled in the art will envision other modifications within the scope and spirit of the claims appended hereto. Other elements, steps, methods and techniques that are insubstantially different from those described above and/or in the appended claims are also intended to be within the scope of the disclosure.

The embodiments shown in drawings are presented only to demonstrate certain examples of the disclosure and the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third" and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the embodiments of the disclosure described herein are capable of operation in other sequences and/or arrangements than are described or illustrated herein.

What is claimed is:

1. A container system comprising:
a frame defining a part of an enclosure;
at least one door coupled to the frame with a four-bar linkage that includes a follower;
a weather seal coupled to the at least one door; and
a latch assembly comprising:
a cam for each of the at least one door, the cam for each of the at least one door being pivotably coupled within the latch assembly and being fixedly attached to a respective gear;
a self-locking worm drive coupled to each gear; and
a motor assembly including an output shaft, a worm of the worm drive being disposed upon the output shaft,
wherein pivotal displacement of the cam for each of the at least one door pulls an associated door of the at least one door toward the frame, via the follower of the four-bar linkage coupled to that door, compressing the weather seal against the frame.

2. The system of claim 1, wherein a mechanical advantage between the motor assembly and each follower is at least 400:1.

3. The system of claim 1, wherein a mechanical advantage between the motor assembly and each follower is at least 800:1.

4. The system of claim 1, wherein the cam for each of the at least one door and the follower of the four-bar linkage coupled to the associated door form a pressure angle no greater than 15°.

5. The system of claim 1, wherein the cam for each of the at least one door and the follower of the four-bar linkage coupled to the associated door form a pressure angle no greater than 30°.

6. The system of claim 1, wherein the cam for each of the at least one door includes
a rotation axis; and
a channel extending therethrough, the channel having a length, the channel being spaced from the rotation axis by a distance, the distance varying over the length of the channel.

7. The system of claim 6, wherein the channel has an open end.

8. The system of claim 6, wherein the distance is greatest at an open end of the channel and smallest at an interior terminus of the channel.

9. The system of claim 1, further comprising a rotary position sensor mechanically coupled into the latch assembly at a point downstream of the worm drive.

10. The system of claim 1, wherein the frame comprises at least one rigid projection, each of the at least one rigid projection positioned to limit the pivotal displacement of a cam.

11. The system of the claim 1, wherein the frame is stationary relative to the enclosure.

12. An enclosure comprising:
a frame;
a first door and a second door, the first and second door respectively coupled to the frame via a first four-bar linkage and a second four-bar linkage;
a latch pin coupled to each of the first and second four-bar linkage, each latch pin including a terminal flange;
a retention assembly comprising:
a motor assembly;
a first securement member and second securement member;
a transmission assembly intermediate the motor assembly and the securement members; and
a mounting body, the securement members coupled to the mounting body, the mounting body including first and second latch pin stop projections on opposing sides of the mounting body,
wherein the retention assembly is configured to displace the securement members from an open position to a retaining position, the terminal flange of each latch pin being captured by a portion of a respective securement member in the retaining position.

13. The enclosure of claim 12, wherein the transmission assembly comprises a worm drive.

14. The enclosure of claim 12, wherein the transmission assembly is self-locking.

15. The enclosure of claim 12, wherein the retention assembly includes a sensor configured to generate an output signal indicative of the position of the securement members.

16. The enclosure of claim 12, wherein the enclosure further comprises a first door motor assembly and a second door motor assembly.

17. The enclosure of claim 16, wherein the enclosure further comprises a first door position sensor and a second door position sensor.

18. The enclosure of claim 17, wherein the enclosure further comprises a controller, the controller configured to power the first and second door motor assembly to displace the doors from an open state toward a closed state, the controller configured to cut power to the first and second door motor upon an output signal from each door position sensor indicating that the latch pin associated with each door has contacted the respective latch pin stop projection of the mounting body.

19. The enclosure of claim 12, wherein each securement member includes a first arm and a second arm separated by a trough.

20. The enclosure of claim 19, wherein the first arm of each securement member extends from a first face of that securement member and the second arm of each securement member extend from a second opposing face of that securement member.

21. The enclosure of claim 12, wherein each latch pin is disposed in a guide bearing of its respective four-bar linkage and is partially surrounded by a bias member positioned between a face of a protuberance that the guide bearing is disposed in and a retainer clip coupled to the latch pin.

22. The enclosure of claim 12, wherein the retention assembly further comprises a housing, the securement members configured to translationally displace from a distal position with respect to the housing to a position proximal with respect to the housing when in the retaining position.

23. The enclosure of claim 22, wherein a first complaint member and second compliant member coupled respectively to the first and second door are compressed against the frame upon displacement of the securement members from the distal position to the proximal position.

24. The enclosure of claim 12, wherein a weather seal is coupled to at least one of the first door and the second door.

25. An enclosure comprising:
a frame;

a first closure member and a second closure member, the first and second closure member coupled to the frame;

a latch pin coupled to each of the first and second closure member, each latch pin including a terminal flange;

a retention assembly comprising:
- a drive;
- a first securement member and second securement member;
- a transmission intermediate the drive and the securement members; and
- a mounting body, the securement members coupled to the mounting body;

wherein the retention assembly is configured to displace the securement members from an open position to a retaining position, the terminal flange of each latch pin being captured by a portion of a respective securement member in the retaining position.

26. The enclosure of claim 25, wherein a first complaint member and second compliant member coupled respectively to the first and second closure member are compressed against the frame upon displacement of the securement members from the distal position to the proximal position.

27. The enclosure of claim 25, wherein the enclosure further comprises a controller, the controller configured to power a first and second closure member drive assembly to displace the closure members from an open state toward a closed state, the controller configured to cut power to the first and second closure member drive assembly upon an output signal from a position sensor indicating that the latch pin associated with each closure member has contacted a respective latch pin stop projection of the mounting body.

28. The enclosure of claim 25, wherein each latch pin is spring biased.

29. The enclosure of claim 25, wherein the retention assembly further comprises a housing, the securement members configured to translationally displace from a distal position with respect to the housing to a position proximal with respect to the housing when in the retaining position.

30. The enclosure of claim 25, wherein each securement member includes a first arm spaced apart from an opposing second arm.

* * * * *